US009618533B2

(12) United States Patent
Waters et al.

(10) Patent No.: US 9,618,533 B2
(45) Date of Patent: Apr. 11, 2017

(54) SYSTEMS AND METHODS FOR DETERMINING ROTATION FROM NONLINEAR PERIODIC SIGNALS

(71) Applicant: Lumedyne Technologies Incorporated, San Diego, CA (US)

(72) Inventors: Richard Lee Waters, San Diego, CA (US); Xiaojun Huang, San Diego, CA (US); Charles Harold Tally, IV, Carlsbad, CA (US); Yanting Zhang, San Diego, CA (US); John David Jacobs, San Diego, CA (US); Mark Steven Fralick, San Diego, CA (US)

(73) Assignee: Lumedyne Technologies Incorporated, San Diego, CA (US)

( * ) Notice: Subject to any disclaimer, the term of this patent is extended or adjusted under 35 U.S.C. 154(b) by 0 days.

(21) Appl. No.: 14/751,745

(22) Filed: Jun. 26, 2015

(65) Prior Publication Data
US 2015/0377623 A1 Dec. 31, 2015

Related U.S. Application Data

(60) Provisional application No. 62/035,237, filed on Aug. 8, 2014, provisional application No. 62/023,138, filed on
(Continued)

(51) Int. Cl.
*G01C 19/56* (2012.01)
*G01P 15/125* (2006.01)
(Continued)

(52) U.S. Cl.
CPC ........ *G01P 15/125* (2013.01); *G01C 19/5705* (2013.01); *G01C 19/5726* (2013.01); *G01C 19/5747* (2013.01); *G01P 15/0802* (2013.01)

(58) Field of Classification Search
CPC ............ G01C 19/5705; G01C 19/5712; G01C 19/5719; G01C 19/5726; G01C 19/5747; G01C 19/5755; G01C 19/5762
(Continued)

(56) References Cited

U.S. PATENT DOCUMENTS 4,930,351 A * 6/1990 Macy ................. G01C 19/5607
73/504.04
5,635,638 A 6/1997 Green
(Continued)

FOREIGN PATENT DOCUMENTS

EP 2259019 12/2010
GB 947310 1/1964
(Continued)

OTHER PUBLICATIONS

International Search Report and Written Opinion dated Jan. 26, 2016 in PCT/US2015/038100, filed Jun. 26, 2015 (26 pages).
(Continued)

*Primary Examiner* — Helen Kwok
(74) *Attorney, Agent, or Firm* — Ropes & Gray LLP

(57) ABSTRACT

Systems and methods are disclosed herein for determining rotation. A gyroscope includes a drive frame and a base, the drive frame springedly coupled to the base. The gyroscope includes a drive structure configured for causing a drive frame to oscillate along a first axis. The gyroscope includes a sense mass springedly coupled to the drive frame. The gyroscope includes a sense mass sense structure configured for measuring a displacement of the sense mass along a second axis orthogonal to the first axis. The gyroscope includes measurement circuitry configured for determining a velocity of the drive frame, extracting a Coriolis component from the measured displacement, and determining, based on
(Continued)

the determined velocity and extracted Coriolis component, a rotation rate of the gyroscope.

28 Claims, 51 Drawing Sheets

Related U.S. Application Data on Jul. 10, 2014, provisional application No. 62/023,107, filed on Jul. 10, 2014, provisional application No. 62/017,782, filed on Jun. 26, 2014.

(51) Int. Cl.
*G01C 19/5705* (2012.01)
*G01P 15/08* (2006.01)
*G01C 19/5726* (2012.01)
*G01C 19/5747* (2012.01)

(58) Field of Classification Search
USPC ............... 73/504.12, 504.14, 504.02, 504.04
See application file for complete search history.

(56) References Cited

U.S. PATENT DOCUMENTS

| | | | |
|---|---|---|---|
| 5,703,292 A | 12/1997 | Ward | |
| 5,747,690 A | 5/1998 | Park et al. | |
| 5,955,668 A * | 9/1999 | Hsu | G01C 19/5719 73/1.37 |
| 6,044,707 A | 4/2000 | Kato | |
| 6,067,858 A * | 5/2000 | Clark | G01C 19/5719 73/504.16 |
| 6,122,962 A | 9/2000 | Yoshino et al. | |
| 6,259,999 B1 | 7/2001 | Pantle | |
| 6,526,826 B2 | 3/2003 | Kurachi et al. | |
| 6,715,353 B2 | 4/2004 | Johnson | |
| 6,796,178 B2 | 9/2004 | Jeong | |
| 7,107,841 B2 | 9/2006 | Mori | |
| 7,302,848 B2 * | 12/2007 | Kourepenis | G01C 19/5719 73/504.16 |
| 7,444,868 B2 * | 11/2008 | Johnson | G01C 19/5719 73/504.12 |
| 7,481,110 B2 * | 1/2009 | Handrich | G01C 19/5726 73/504.12 |
| 7,505,865 B2 | 3/2009 | Ohkubo et al. | |
| 8,061,201 B2 * | 11/2011 | Ayazi | G01C 19/5719 73/504.12 |
| 8,141,426 B2 | 3/2012 | Ikeuchi | |
| 8,375,791 B2 | 2/2013 | Huang | |
| 8,378,756 B2 | 2/2013 | Huang | |
| 8,427,249 B1 | 4/2013 | Swanson et al. | |
| 8,453,504 B1 * | 6/2013 | Mao | G01C 19/56 73/504.14 |
| 8,650,955 B2 | 2/2014 | Swanson et al. | |
| 8,875,576 B2 | 11/2014 | Swanson et al. | |
| 8,952,838 B2 | 2/2015 | Waters et al. | |
| 8,981,834 B2 | 3/2015 | Spinella et al. | |
| 8,991,250 B2 | 3/2015 | Waters et al. | |
| 9,157,814 B2 | 10/2015 | Swanson et al. | |
| 9,423,254 B2 | 8/2016 | Waters et al. | |
| 2001/0022107 A1 * | 9/2001 | Kato | G01C 19/5719 73/504.12 |
| 2001/0029784 A1 | 10/2001 | Kurachi et al. | |
| 2001/0039834 A1 * | 11/2001 | Hsu | G01C 19/5719 73/504.02 |
| 2002/0020219 A1 * | 2/2002 | DeRoo | G01C 19/5719 73/504.12 |
| 2003/0173981 A1 | 9/2003 | Fasen et al. | |
| 2005/0091006 A1 | 4/2005 | Rober | |
| 2006/0162450 A1 | 7/2006 | Harada et al. | |
| 2006/0201250 A1 * | 9/2006 | Kourepenis | G01C 19/5719 73/504.16 |
| 2007/0032748 A1 | 2/2007 | McNeil et al. | |
| 2008/0275664 A1 | 11/2008 | Schmid et al. | |
| 2010/0107758 A1 | 5/2010 | Kandori et al. | |
| 2010/0107759 A1 * | 5/2010 | Kato | G01C 19/5719 73/504.12 |
| 2010/0319451 A1 * | 12/2010 | Trusov | G01C 19/5719 73/504.12 |
| 2011/0016973 A1 * | 1/2011 | Hamatani | G01P 15/125 73/514.29 |
| 2012/0065524 A1 | 3/2012 | Morren et al. | |
| 2012/0096943 A1 * | 4/2012 | Potasek | G01C 19/56 73/504.14 |
| 2012/0272732 A1 * | 11/2012 | Leverrier | G01C 19/5747 73/504.12 |
| 2012/0326700 A1 | 12/2012 | Swanson et al. | |
| 2013/0061675 A1 | 3/2013 | Kim et al. | |
| 2013/0111990 A1 | 5/2013 | Wang et al. | |
| 2013/0283908 A1 * | 10/2013 | Geen | G01C 19/574 73/504.12 |
| 2013/0298670 A1 * | 11/2013 | Tsugai | G01C 19/56 73/504.12 |
| 2014/0007681 A1 * | 1/2014 | Lin | G01C 19/5719 73/504.12 |
| 2014/0047918 A1 * | 2/2014 | Swanson | G01C 19/56 73/504.12 |
| 2014/0144230 A1 * | 5/2014 | Magnoni | G01C 19/56 73/504.12 |
| 2014/0144232 A1 * | 5/2014 | Lin | B81B 3/0051 73/504.12 |
| 2014/0300425 A1 * | 10/2014 | Cazzaniga | G01C 19/5776 331/154 |
| 2014/0361348 A1 * | 12/2014 | Yoneoka | G01C 19/5762 257/254 |
| 2015/0377622 A1 * | 12/2015 | Waters | G01C 19/5705 73/504.12 |
| 2015/0377916 A1 * | 12/2015 | Waters | G01C 19/5705 73/514.32 |
| 2015/0377917 A1 * | 12/2015 | Waters | G01C 19/5705 73/514.32 |
| 2015/0377918 A1 * | 12/2015 | Waters | G01C 19/5705 73/514.32 |
| 2016/0126890 A1 | 5/2016 | Swanson et al. | |

FOREIGN PATENT DOCUMENTS

| | | |
|---|---|---|
| GB | 2529277 | 2/2016 |
| WO | WO-00/05552 | 2/2000 |
| WO | WO 01/69266 | 9/2001 |

OTHER PUBLICATIONS

Invitation to Pay Additional Fees dated Oct. 23, 2015 in PCT/US2015/038107 filed Jun. 26, 2015 (8 pages).
Invitation to Pay Additional Fees dated Nov. 5, 2015 in PCT/US2015/038100, filed Jun. 26, 2015 (8 pages).
International Search Report and Written Opinion dated Mar. 24, 2016 in PCT/US2015/038107, filed Jun. 26, 2015 (23 pages).
Kuijpers, "Micromachined Capacitive Long-Range Displacement Sensor for Nano-Positioning of Microactuator Systems", ISBN 90-365-2119-X, Dec. 8, 2004, 208 pages.
Office Action dated Oct. 13, 2016 in U.S. Appl. No. 14/751,727, (17 pages).

* cited by examiner

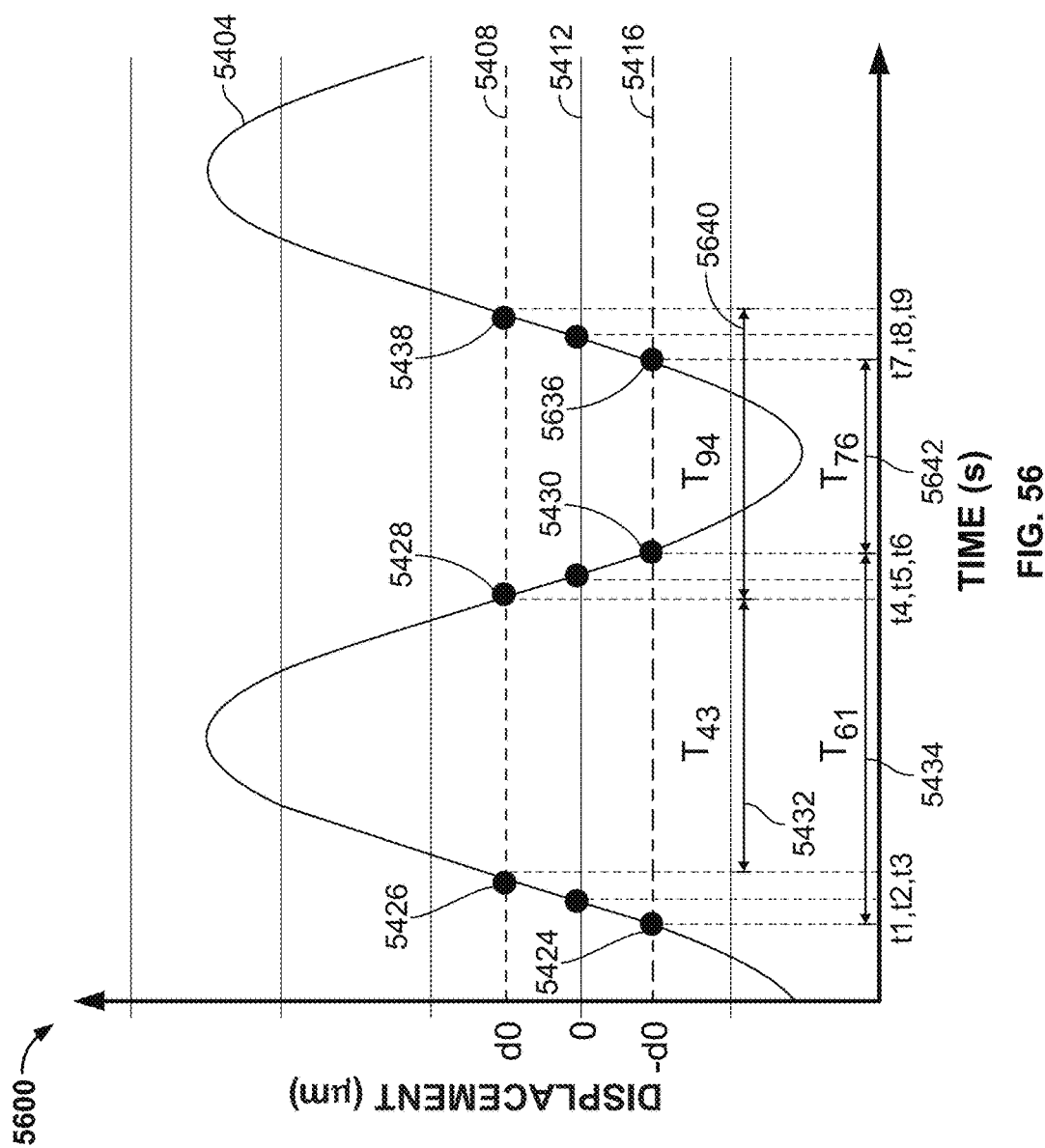

SYSTEMS AND METHODS FOR DETERMINING ROTATION FROM NONLINEAR PERIODIC SIGNALS

CROSS REFERENCE TO RELATED APPLICATIONS

This application claims priority to U.S. Provisional Application Ser. No. 62/017,782, filed Jun. 26, 2014, Ser. No. 62/023,138, filed Jul. 10, 2014, Ser. No. 62/023,107, filed Jul. 10, 2014, and Ser. No. 62/035,237, filed Aug. 8, 2014, of which the entire contents of each are hereby incorporated by reference.

FIELD OF THE INVENTION

In general, this disclosure relates to inertial sensors used to sense external perturbations such as acceleration and rotation.

BACKGROUND

Vibratory gyroscopes can measure rotation rate by sensing the motion of a moving proof mass. A Coriolis component of the motion of the moving proof mass is caused by a Coriolis force. The Coriolis force exists only when the gyroscope experiences an external rotation and is due to the Coriolis effect. The Coriolis force can be defined in vector notation by Equation 1, where i, j, and k represent the first, second, and third axes, respectively.

$$\vec{F}_{C_j} = -2m[\vec{\Omega}_k \times \vec{v}_i] \quad (1)$$

The Coriolis component is proportional to drive velocity as shown in Equations 2 and 3, where SF represents a constant scale factor that includes the mass of the proof mass as well as other constants related to the governing physics, electronics parameters, and the chosen sensor method employed to convert proof mass displacements to an output signal.

$$|S^C_{OUT}| \propto |\vec{F}_C| \propto -2\ m|\vec{\Omega}||\vec{v}| \quad (2)$$

$$|\vec{\Omega}| = SF \frac{|S^C_{OUT}|}{|\vec{v}|} \quad (3)$$

Thus, if the drive velocity varies, the measurement of the rotation rate will also vary by a proportional amount. Systems and methods which do not take drift in drive velocity into account will be susceptible to reduced accuracy. These variations in drive velocity can be caused by degradation of springs, fluctuations in temperature, variations in device pressure, change in performance of closed-loop-drive analog electronics, changes in resonant frequency, changes in oscillator drive amplitude, applied inertial accelerations normal to the drive direction, changes in electronic loop gain, and acoustic signals applied to normal to the drive axis.

SUMMARY

Accordingly, systems and methods are described herein for determining rotation from nonlinear periodic signals. A gyroscope for determining a rotation rate can include a drive frame springedly coupled to a base of the gyroscope and a drive structure configured for causing a drive frame to oscillate with respect to a first axis. The gyroscope can also include a sense mass springedly coupled to the drive frame and a sense mass sense structure configured for measuring a displacement of the sense mass along a second axis orthogonal to the first axis. The gyroscope can also include measurement circuitry configured for determining a velocity of the drive frame, extracting a Coriolis component from the measured displacement, and determining, based on the determined velocity and extracted Coriolis component, the rotation rate.

In some examples, the drive frame oscillates along the first axis, and in some examples, the drive frame oscillates rotationally with respect to the first axis. In some examples, the sense mass is springedly coupled to the base of the gyroscope.

In some examples, the measurement circuitry is further configured for extracting a quadrature component from the measured displacement. The measurement circuitry can be further configured for extracting the Coriolis component based on the extracted quadrature. The measurement circuitry can be configured for extracting the Coriolis component based on a phase of the measured displacement with respect to the velocity of the drive frame. The measurement circuitry can be further configured for adjusting the measuring of displacement based on the extracted quadrature.

In some examples, the measurement circuitry is further configured for adjusting the measuring of displacement by measuring an analog signal corresponding to the displacement of the sense mass, determining a quadrature component based on the extracted quadrature, and combining the analog signal with the extracted quadrature to generate the measured displacement.

In some examples, the measurement circuitry is further configured for adjusting the measuring of displacement by adjusting, based on the extracted quadrature, a bias voltage of a capacitor coupled to the sense mass.

In some examples, the measurement circuitry is further configured for measuring the displacement by receiving a signal from the sense mass, converting the received signal to a voltage, comparing the voltage to a threshold, determining times at which the voltage crosses the threshold, and determining, based on the times, an amplitude and a frequency of oscillation of the sense mass.

In some examples, the measurement circuitry is further configured for extracting the Coriolis component by determining, based on the amplitude and frequency, a quadrature component, and determining, based on the frequency and the quadrature component, the Coriolis component. The received signal can be a capacitive signal.

In some examples, the measurement circuitry is further configured for extracting the Coriolis component by determining a phase of the measured displacement with respect to the velocity of the drive frame and determining, based on the frequency, the quadrature component, and the phase, the Coriolis component.

In some examples, the measurement circuitry is further configured for determining the velocity by measuring an analog signal corresponding to displacement of the drive frame, converting the analog signal to a voltage, determining times at which the voltage crosses a threshold, and determining, based on the times, the velocity.

In some examples, the measurement circuitry is further configured for determining, based on the times, the velocity by determining, based on the times, amplitude and frequency of the drive frame, and determining, based on the amplitude and frequency, the velocity.

In some examples, a method for determining a rotation rate of an inertial sensor includes measuring a displacement of the a sense mass by receiving a capacitive signal from the sense mass, converting the received signal to a voltage, comparing the voltage to a threshold, determining times at which the voltage crosses the threshold, and determining, based on the times, an amplitude and a frequency of oscillation of the sense mass.

In some examples, the method includes adjusting the measuring of the displacement of the sense mass by adjusting, based on an extracted quadrature, a bias voltage of a capacitor coupled to the sense mass.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 56 depicts a graph which illustrates additional time intervals of a displacement curve, according to an illustrative implementation.

DETAILED DESCRIPTION

To provide an overall understanding of the disclosure, certain illustrative implementations will now be described, including systems and methods for determining rotation from nonlinear periodic signals. A vibratory gyroscope can be operated by driving a sense mass into motion along a first axis and then measuring motion of the sense mass due to a Coriolis force along a second axis orthogonal to the first axis. The Coriolis force along the second axis is generated when the gyroscope undergoes an external rotation about a third axis orthogonal to both of the first and second axes.

The vibratory gyroscope can exhibit quadrature motion along the sensing direction of (the second axis) caused by imperfect drive mode motion. This imperfect drive mode motion, while intended to be solely along the first axis, can include a component along other axes, such as the second axis. This quadrature force axe along the sensing axis but is proportional to both the position of the oscillator along the first axis, x, and a quadrature coupling constant $k_{xy}$ as defined in Equation 4.

$$\vec{F_{Qj}} = -k_{xy}\vec{x_i} \tag{4}$$

The vibratory gyroscope can also exhibit motion along the sensing direction caused by inertial forces acting along the sensing direction. As shown in Equation 5, the inertial force F axe along the sensing axis and is proportional to the sense mass as well as an inertial acceleration acting along the sensing axis.

$$\vec{F_{Qj}} = m\vec{a_{Ij}} \tag{5}$$

The total output signal of the system is proportional to the sum of sense mass displacements caused by Coriolis, quadrature, and inertial forces described in Equations 1-5. To determine rotation, the sensor output must be analyzed and processed to remove components due to quadrature and inertial forces so that the portion of the signal caused by Coriolis forces can be recovered. Typically, the proof mass is oscillated sinusoidally at its resonant frequency and the quadrature and Coriolis forces are 90° offset in phase. Accordingly, the components of proof mass motion caused by the Coriolis and quadrature forces are also offset in phase by 90°. Demodulation techniques can be used to separate the quadrature and Coriolis signals. Typical demodulation requires accurately selecting a demodulation phase to be exactly in-phase with either Coriolis or quadrature components of the signal. However, this phase can drift in time due to fluctuation and system and environmental variables, causing drift in the performance of the demodulation electronics.

The inertial component of the signal typically exists at a lower frequency than the drive resonant frequency (and thus the Coriolis and quadrature components), enabling a removal of the inertial component using a low pass filter.

Figure 1:
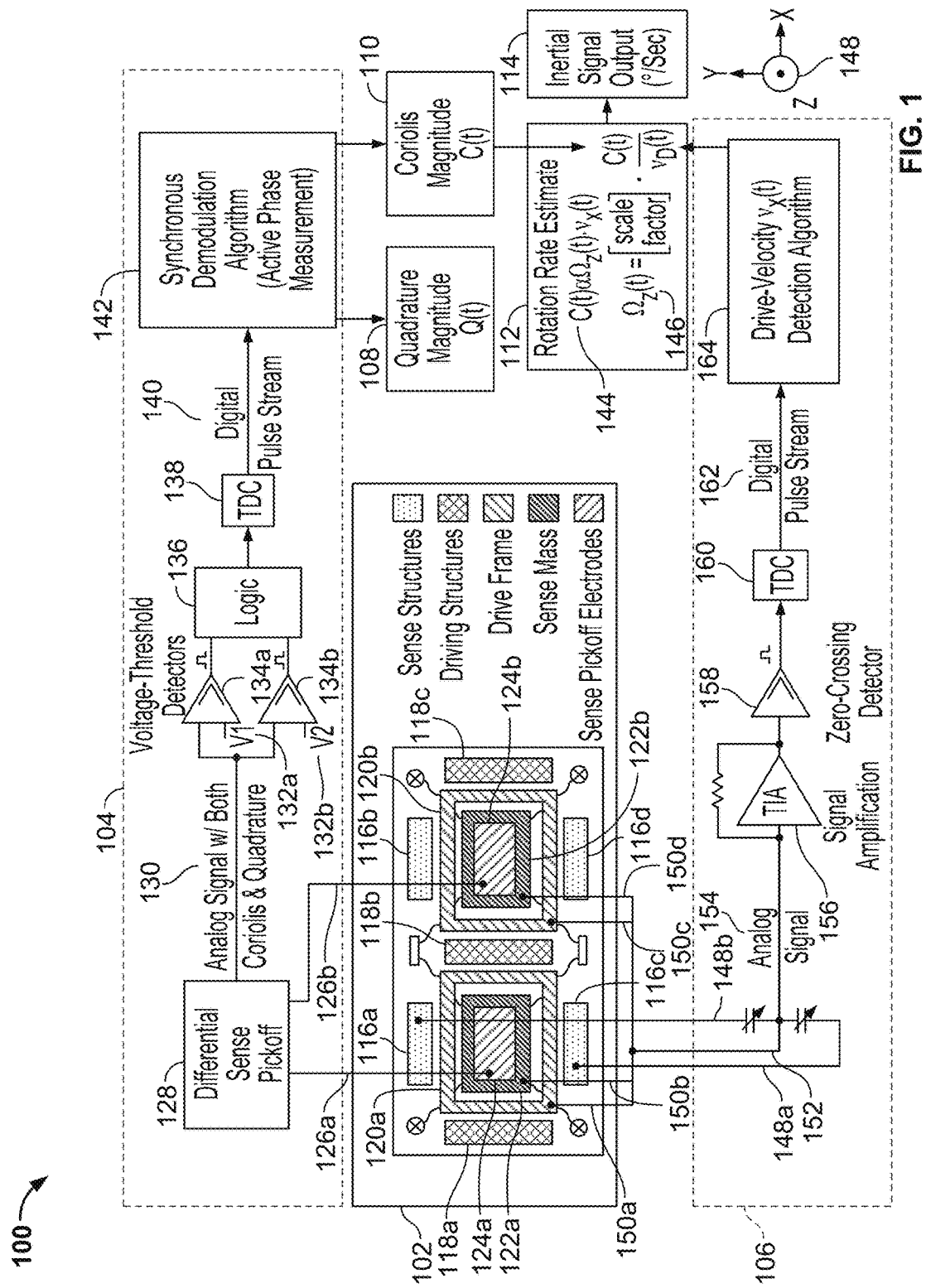
FIG. 1 depicts a system for determining rotation rates using a real-time velocity measurement, according to an illustrative implementation.

FIG. 1 depicts a system 100 for determining rotation rates using a real-time velocity measurement. The system 100 includes a micro-electromechanical system (MEMS) subsystem 102, a demodulation subsystem 104, and a drive velocity subsystem 106. The MEMS subsystem 102 provides analog outputs 126a and 126b (collectively, analog outputs 126) to the demodulation subsystem 104 in response to oscillation, excitation, or perturbation of the MEMS subsystem 102. The demodulation subsystem 104 determines a quadrature component 108 and a Coriolis component 110 based on the analog signals 126. The MEMS subsystem 102 provides analog signals 150a, 150b, 150c, and 150d (collectively, analog signals 150), and analog signals 148a and 148b (collectively, analog signals 148) as outputs to the drive velocity subsystem 106. The system 100 includes a rotation rate estimation subsystem 112 which uses the Coriolis component 110 and a real-time estimate of drive velocity produced by the drive velocity subsystem 106 to produce an inertial signal output 114. The inertial signal output 114 reflects a rotation rate of an external rotation applied to the system 100. In some examples, the external rotation is only applied to the MEMS subsystem 102.

The MEMS subsystem 102 includes driving structures 118a, 118b, and 118c (collectively, driving structures 118) which cause drive frames 120a and 120b (collectively, drive frames 120) to oscillate. The drive frames 120 are springedly coupled to a substrate of the MEMS subsystem 102. FIG. 1 depicts a coordinate system 148 having x and y axes in a primary plane of the MEMS subsystem 102 and a z axis orthogonal to the x and y axes and according to a conventional right-hand coordinate system. As depicted in FIG. 1, the driving structures 118 cause the drive frames 120 to oscillate along the x axis. The MEMS subsystem 102 includes sense masses 122a and 122b (collectively, sense masses 122) that are springedly coupled to drive frames 120. The sense masses 122 move largely with the drive frames 120. However, external perturbations can cause the sense masses 122 to move differently than the drive frames 120.

The MEMS subsystem 102 includes sense structures 116a, 116b, 116c, and 116d (collectively, sense structures 116. The sense structures 116a and 116c sense motion of the drive frame 120a along x axis. The sense structures 116b and 116d sense motion of the drive frame 120b along the x axis. Thus, the sense structures 116 measure the drive velocity at which the drive structures 118 cause the drive frames 120 to oscillate along the x axis. In some examples, the sense structures 116 include nonlinear capacitive structures which experience a non-monotonic change in capacitance based on monotonic motion of the drive frames 120. In some examples, moveable elements of the sense structures 116 are disposed on the drive frames 120 and move with the drive frames 120. Fixed elements of the sense structures 116 are disposed on a portion of the MEMS structure 102 that does not move with the drive frames 102. In these examples, relative motion is detected between parts of the sense structures 116.

The MEMS subsystem 102 includes sense pickoff electrodes 124a and 124b (collectively, sense pickoff electrodes 124). The sense pickoff electrodes 124 are disposed in a plane that is parallel to the x-y plane and separated from the sense masses 122 in the z direction by a gap. As depicted FIG. 1, when an external perturbation causes the MEMS subsystem 102 to rotate about they axis, the sense masses 122 are deflected in the z direction by the Coriolis effect. As the sense masses 122 are deflected in the z direction, the gap between the sense masses 122 and the sense pickoff electrodes 124 changes, causing a change in capacitance between the sense masses 122 and the sense pickoff electrodes 124. The analog signal 126a is a capacitive signal from the sense pickoff electrode 124a, and the analog signal 126b is a capacitive signal from the sense pickoff electrode 124b. Manufacturing imperfections and spring imperfections cause the drive frames 120 to move along axes other than the x axis, in addition to motion along the x axis. Thus, even in the absence of external perturbations, the drive frames 120, and thus the sense masses 122, can have motion in the z direction that is linked to the drive forces exerted by the driving structures 118. This motion in the z direction linked to the drive motion is called quadrature.

The demodulation subsystem 104 includes a differential sense pickoff module 128 that receives the analog signals 126. The differential sense pickoff module 128 outputs an analog signal 130 that reflects a difference between the two analog signals 126. By using a difference between the two analog signals 126, common mode noise is suppressed. The analog signal 130 contains both Coriolis and quadrature information.

The demodulation subsystem 104 includes voltage threshold detectors 134a and 134b (collectively, threshold detectors 134). The threshold detectors 134 compare the analog signal 130 to a voltage threshold V1 132a and a voltage threshold V2 132b (collective, voltage thresholds 132). The threshold detector 134a compares the analog signal 130 to the voltage threshold V1 132a. The threshold detector 134b compares the analog signal 130 to the voltage threshold V2 132b. In general, the voltage threshold V1 132a is different than the voltage threshold V2 132b, although in some examples, the voltage thresholds 132 can be the same. In some examples, the threshold detectors 134 are implemented by comparators. The threshold detectors 134 produce a two-valued signal based on comparison to the voltage thresholds 132. The threshold detectors 134 output a first value of the two-valued signal if the analog signal 130 is above the threshold, and a second value of the two-valued signal if the analog signal 130 is below the threshold.

The demodulation subsystem 104 includes a logic module 136 that receives the two-valued signals from the threshold detectors 134. The logic module 136 combines the two-valued signals from the threshold detectors 134. The demodulation subsystem 104 includes a time-to-digital converter (TDC) 138 that receives an output of the logic module 136. The TDC 138 produces a digital pulse stream 140 corresponding to times at which the analog signal 130 crossed the thresholds 132. The demodulation subsystem 104 includes a synchronous demodulation algorithm 142 that receives the digital pulse stream 140 and outputs the quadrature magnitude 108 and the Coriolis magnitude 110.

The drive velocity subsystem 106 receives as inputs the analog signals 148 and 150. The analog signals 150 are combined into an analog signal 152. The analog signals 148a and 148b are capacitive signals from the sense structures 116a and 116c, respectively. The capacitive analog signals 148 vary according to capacitance of the sense structures 116. The analog signals 148 and 152 are combined into an analog signal 154. The analog signal 154 is measured by a transimpedance amplifier 156. In some examples, the analog signal 154 is measured by an analog front end that converts a capacitance to a voltage, such as a charge amplifier or a switched capacitor.

The drive velocity subsystem 106 also includes a zero-crossing detector 158, a TDC 160, and a drive velocity detection module 164. The zero-crossing detector 158 receives an output from the amplifier 156 that is proportional to the analog signal 154. The zero-crossing detector produces a two-valued output signal that toggles between output values when the output of the amplifier 156 crosses zero. The TDC 160 produces a digital pulse stream 162 with times corresponding to times at which the output the zero-crossing detector is toggled. The drive velocity detection module 164 determines a velocity of the drive frame 128a based on the digital pulse stream 162. In some examples, the drive velocity detection module 164 employs a cosine algorithm to determine drive velocity. The drive velocity detection algorithm 164 provides the drive velocity to the rotation rate estimation module 112.

The rotation rate estimation module 112 determines the rotation rate of the MEMS subsystem 102 based on the Coriolis magnitude 110 and the drive velocity from the drive velocity detection module 164. The rotation rate estimation module 112 employs a proportionality relationship 144 to determine the rotation rate. Since the Coriolis magnitude is proportional to a product of the rotation rate and the drive velocity, the rotation rate is determined by employing a relationship 146. The rotation rate estimation module 112 determines a quotient of the Coriolis magnitude 110 and the drive velocity provided by the drive velocity subsystem 106. The rotation rate estimation module 112 then determines a product of the quotient and a scale factor. The rotation rate corresponds to this product and is provided as the inertial signal output 114. By performing real-time measurement of the drive velocity, the rotation rate can be accurately determined.

Figure 2:
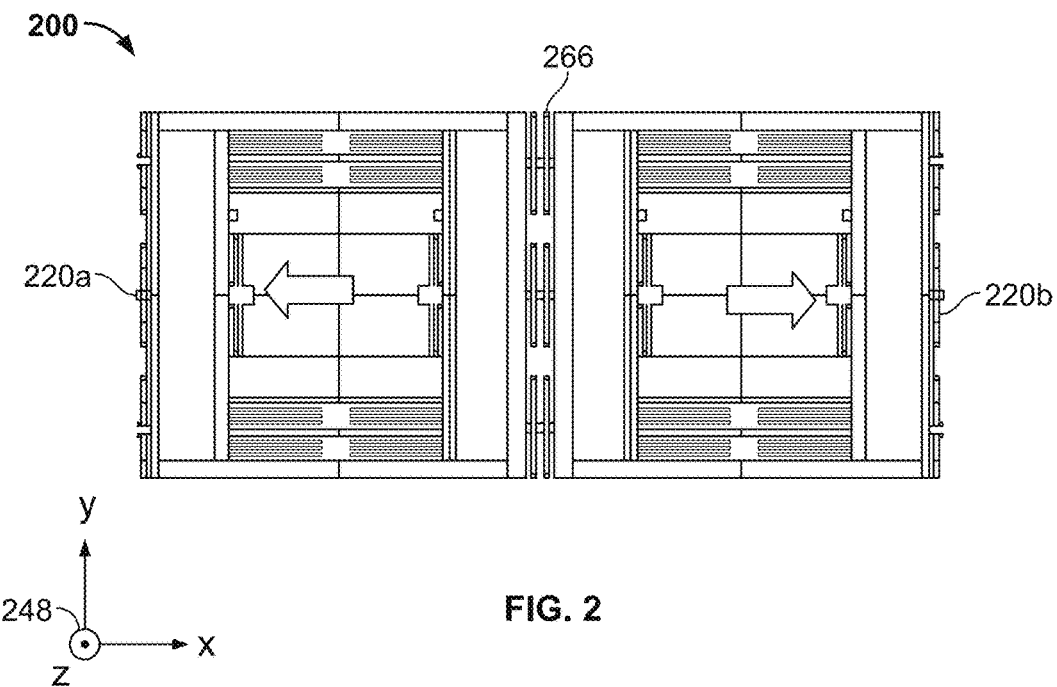
FIG. 2 depicts a planform view schematic of a MEMS subsystem, according to an illustrative implementation.

FIG. 2 depicts a planform view schematic of a MEMS subsystem 200. The MEMS subsystem 200 includes a right-hand coordinate system 248 with x, y, and z, axes. The view 200 depicts a left drive frame 220a and a right drive frame 220b (collectively, drive frames 220) springedly coupled by a spring element 266. The drive frames 220 are oscillated synchronously and in opposite directions along the x axis by driving structures (not shown). The MEMS subsystem 200 can represent the MEMS subsystem 102.

Figure 3:
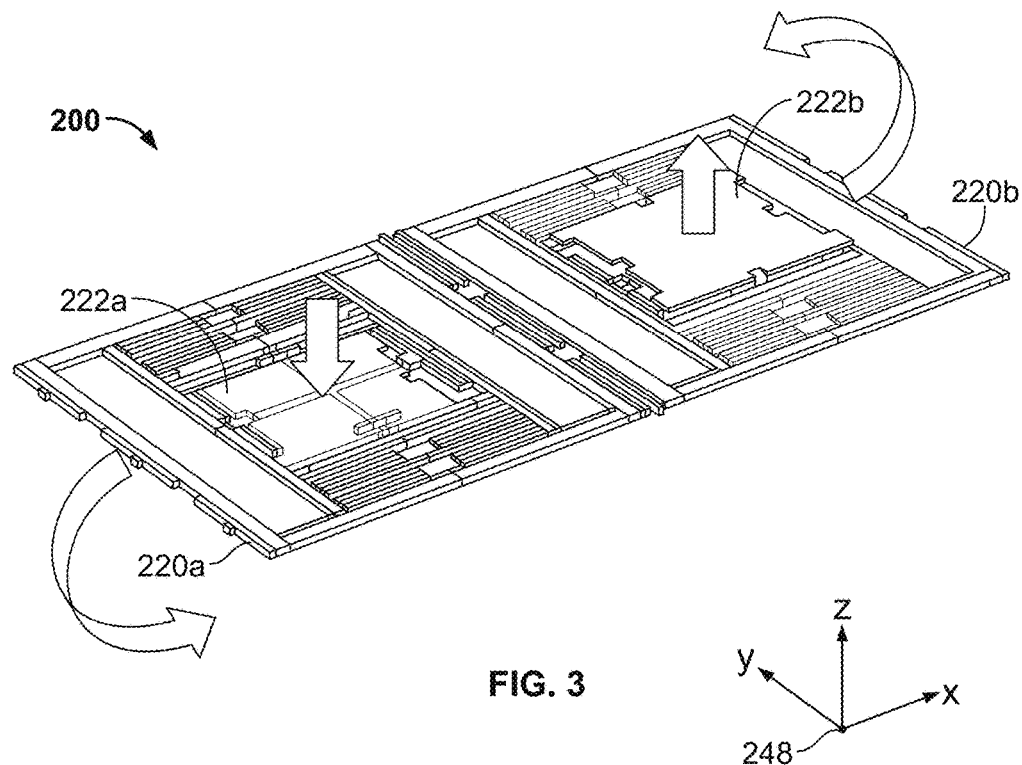
FIG. 3 depicts a perspective view of the MEMS subsystem undergoing both oscillation and rotation, according to an illustrative implementation.

FIG. 3 depicts a perspective view of the MEMS subsystem 200 undergoing both oscillation and rotation. The MEMS subsystem 200 includes sense masses 222a and 222b (collectively, sense masses 222). The sense masses 222a and 222b are springedly coupled to drive frames 220a and 220b, respectively. As the driving frames 220 oscillate with equal and opposite velocity along the x axis, the sense masses 222 also oscillate along the x axis. As the MEMS subsystem 200 experiences an external rotation about y axis, the sense masses 222 are deflected along the z axis with equal and opposite displacements. This displacement along the z axis due to rotation about the y axis is due to the Coriolis effect and is proportional to the cross product of the velocity of the sense mass along the x axis and the rotation rate about the y axis. In some examples, the sense masses 222 may also experience displacement in the z axis due to quadrature and/or acceleration. By detecting displacements of the sense masses along the z axis, rotation of the MEMS subsystem 200 about they axis can be detected and quantified.

Figure 4:
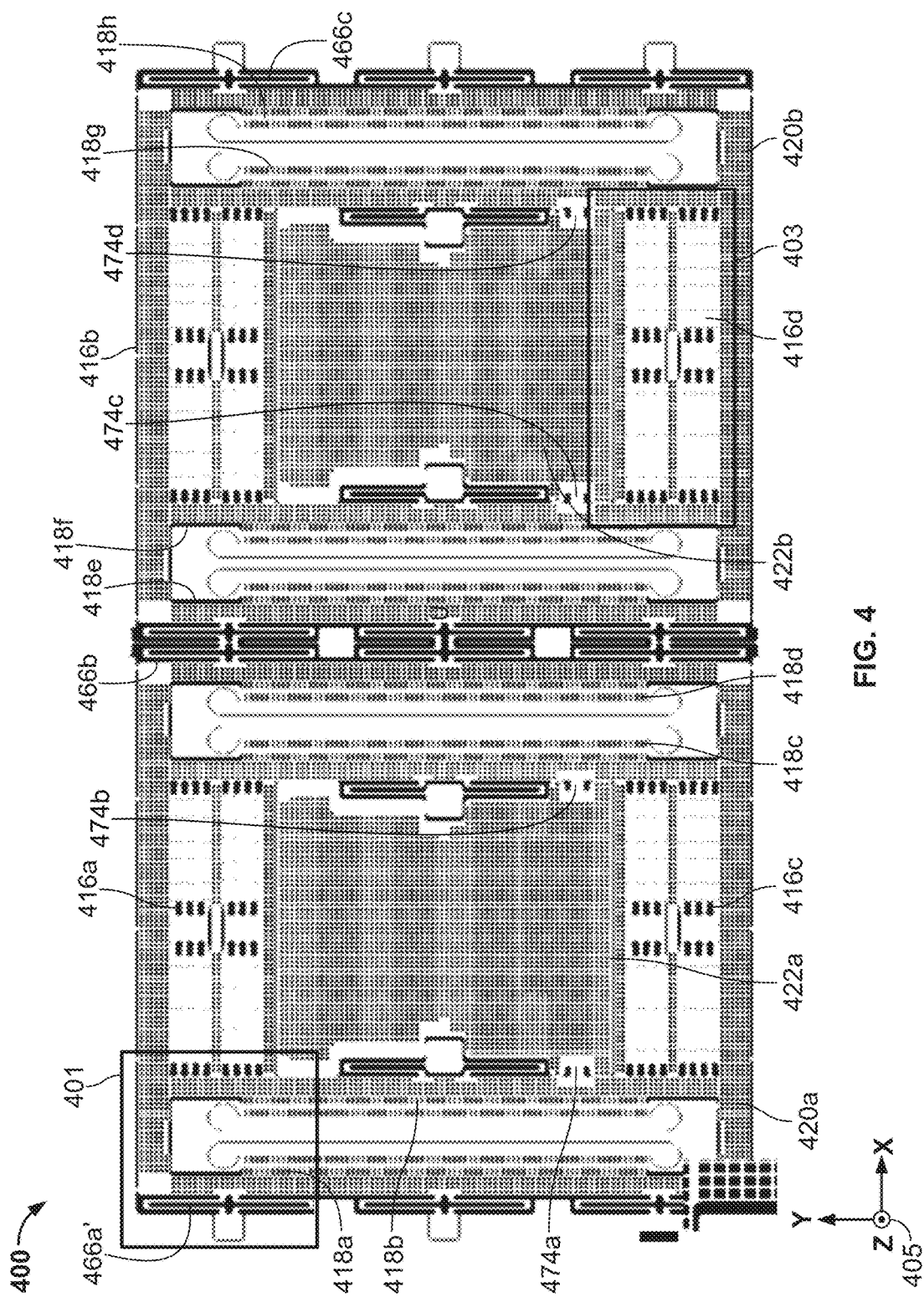
FIG. 4 depicts a MEMS subsystem for measuring rotation, according to an illustrative implementation.

FIG. 4 depicts a MEMS subsystem 400 for measuring rotation. FIG. 4 depicts a right-hand coordinate system 405 with x, y, and z axes. The MEMS subsystem 400 includes drive frames 420a and 420b (collectively, drive frames 420) that are springedly coupled to a base substrate (not shown) by spring elements 466a, 466b, and 466c (collectively, spring elements 466). The drive frames 420 are driven into oscillation with respect to the substrate by driving structures 418a, 418b, 418c, 418d, 418e, 418f, 418g, and 418h (collectively, driving structures 418). The MEMS subsystem 400 includes sense structures 416a, 416b, 416c, and 416d (collectively, sense structures 416) to measure velocity of the drive structures 420a with respect to the substrate. This measured velocity can be referred to as the drive velocity. The MEMS subsystem 400 includes sense masses 422a and 422b (collectively, sense masses 422) that are springedly coupled to the drive frames 420a and 420b, respectively, by spring elements 474a, 474b, 474c, and 474d (collectively, spring elements 474). The sense mass 422a is springedly coupled to the drive frame 420a by the spring elements 474a and 474b. The sense mass 422b is springedly coupled to the drive frame 420b by the spring elements 474c and 474d. The spring elements 466 are compliant along the x axis and stiff along they and z axes. The spring elements 474 are compliant along the z axis and are stiff along the x and y axes. Thus, the spring elements 466 and 474 allow the drive frames 420 and the sense masses 422 to move along the x axis in response to oscillation by the driving structures 418 while substantially restricting motion of the drive frames 420 along they and z axes. Any motion along the z axis that is allowed by the spring elements 466 contributes to the quadrature signal. The spring elements 474 allow the sense masses 422 to move along the z axis in response to the Coriolis effect caused by rotation of the MEMS structure about they axis FIG. 4 includes regions of interest 401 and 403.

Figure 5:
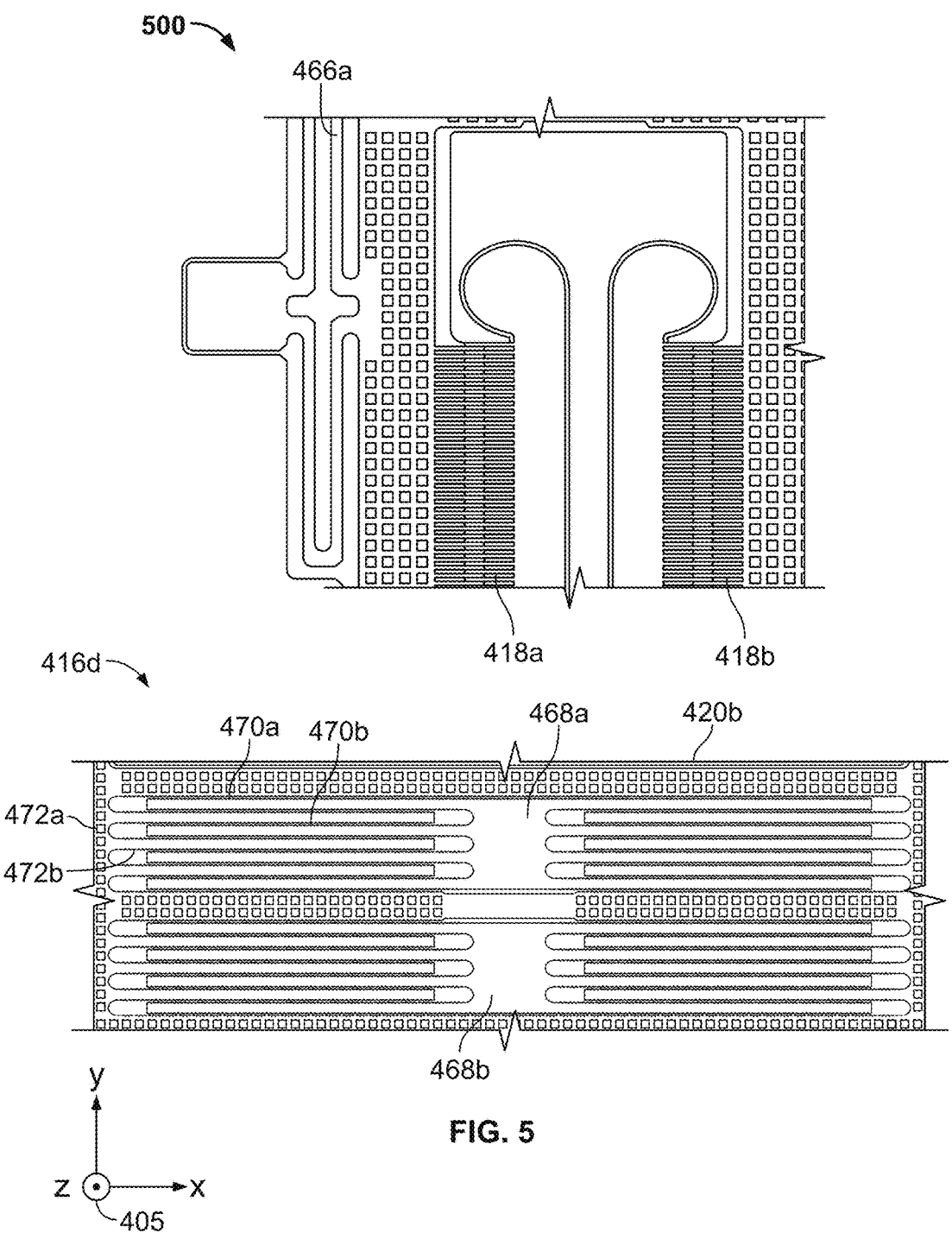
FIG. 5 depicts enlarged views of areas of interest of FIG. 4, according to an illustrative implementation.

FIG. 5 depicts enlarged views of the areas of interest of FIG. 4. FIG. 5 includes a view 500 of the area of interest 401. The view 500 includes the spring elements 466a, the driving frame 420a, and the driving structures 418a and 418b. The spring element 466a can be a multiply folded spring to produce linear motion and a constant stiffness across its operating range. The driving frame 420a is a rigid frame with a grid structure. The grid structure provides lower mass for the driving frame 420a while maintaining stiffness. The driving structures 418a are comb-like structures with interdigitated teeth. The driving structures 418 can be comb drives or levitation drives. The driving structures 418 can be employed in combination to produce sufficient driving force. In some examples, a different number of driving structures 418 is used than is depicted in FIGS. 405.

FIG. 5 also depicts an enlarged view of the sense structure 416d indicated by the area of interest 403. The sense structure 416d includes fixed elements 468a and 468b (collectively, fixed elements 468) which are bonded to the substrate below using wafer bonding techniques. The fixed structures 468 include linearly spaced periodic arrays of beam elements extending outward from the centers of the fixed structures 468. The fixed structure 468a includes fixed beam elements 470a and 470b (collectively, fixed beams 470). FIG. 5 depicts a portion of the drive frame 420b that is near the sense structure 416d. The drive frame 420b includes linearly spaced periodic arrays of movable beams that parallel the fixed beams of the fixed elements 468. The drive frame 420b includes movable beams 472a and 472b (collectively, movable beams 472). Each of the fixed and movable beams, including the fixed beams 470 and the movable beams 472, includes linearly spaced periodic arrays of teeth disposed along the edges of the fixed and movable beams. The teeth are conductive, and as the movable beams oscillate along the x-axis as depicted by the coordinate system 405, the capacitance between the opposing teeth varies. When opposing teeth are aligned, the capacitance is at a local maximum, and when opposing teeth are anti-aligned (that is, when the centers of teeth on one beam are aligned with the centers of gaps between teeth on an opposing beam), the capacitance is at a local minimum. Thus, as the drive frame 420b translates monotonically along the x-axis, the capacitance varies non-monotonically as opposing teeth become alternately aligned and anti-aligned. The velocity of the drive frame 420b can be determined using a cosine method as depicted in and described with respect to FIGS. 51-56. By using nonlinear periodic signals and the cosine method, the magnitude of the velocity of the drive frame 420b can be accurately determined in real time.

Figure 6:
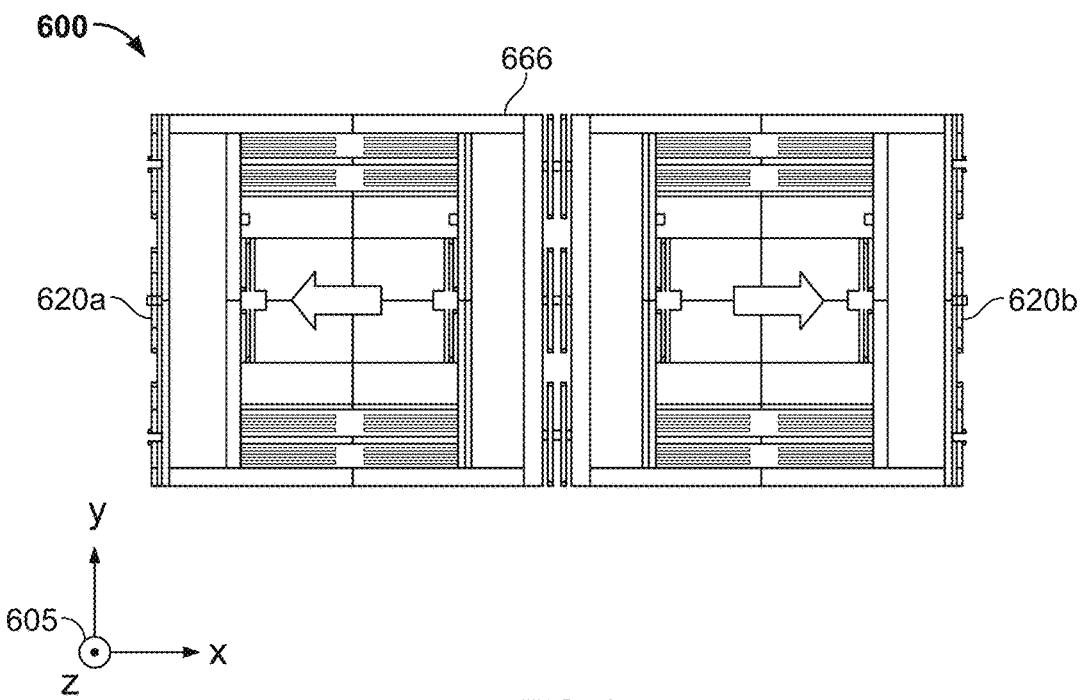
FIG. 6 schematically depicts a system for measuring rotation about a yaw axis, according to an illustrative implementation.

FIG. 6 schematically depicts a system 600 for measuring rotation about a yaw axis. FIG. 6 includes a right-hand coordinate system 605 with x, y, and z-axes. The system 600 has a primary plane parallel to the x-y plane of the coordinate system 605 and is configured to measure rotation about the z-axis of the coordinate system 605. Rotation about an axis normal to the primary plane is referred to herein as yaw. The system 600 includes drive frames 620a and 620b (collectively, drive frames 620) that are springedly coupled by a spring element 666. The drive frames 620 are driven to oscillate along the x-axis and move synchronously in opposite directions. The spring element 666 is compliant along the x-axis, but substantially restricts motion of the drive frames 620 along other axes. However, the spring element 666 does not completely restrict motion along axes other than the x-axis, and this off-axis motion is a source of quadrature.

Figure 7:
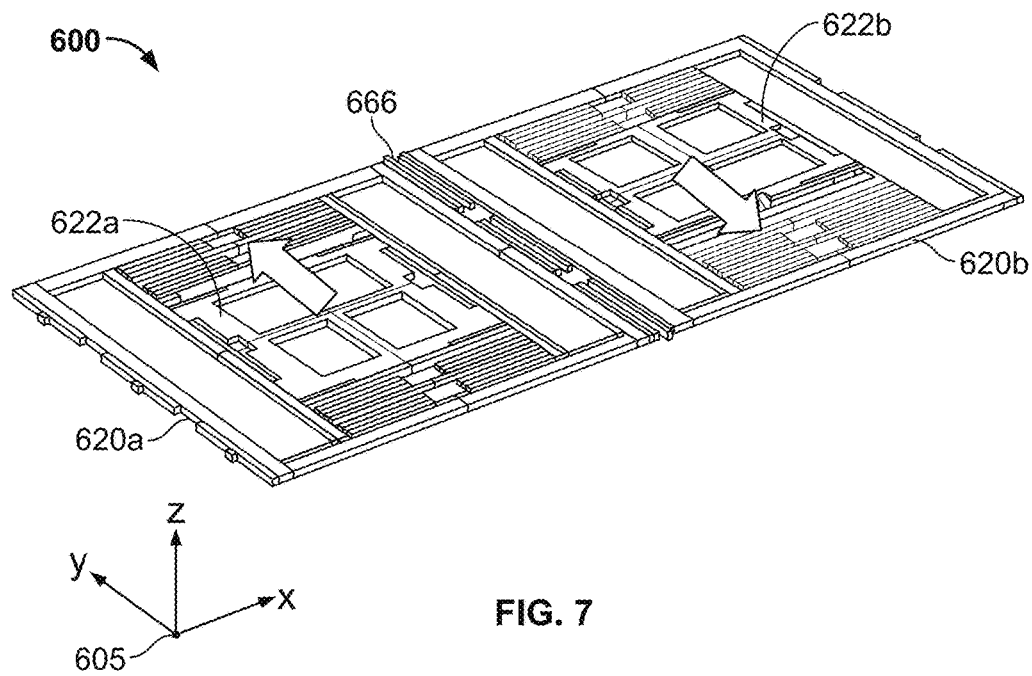
FIG. 7 depicts a perspective view of the system depicted in FIG. 6 as the system experiences an external rotation about the z-axis, according to an illustrative implementation.

FIG. 7 depicts a perspective view of the system 600 as the system 600 experiences an external rotation about the z-axis. The system 600 includes sense masses 622a and 622b (collectively, sense masses 622) that are springedly coupled to the drive frames 620a and 620b, respectively. As the drive frames 620 are drive to oscillate along the x-axis and an external rotation is applied to the system 600 about the z-axis, the sense masses 622a are displaced along the y-axis due to the Coriolis effect. For a rotation vector in the +z direction, the sense mass 622a is displaced in the +y direction relative to the drive frame 620a. For the same rotation having a vector in the +z direction, the sense mass 622b is displaced in the −y direction relative to the drive frame 620b. Thus, measurement of displacement of the sense masses 622 along the y-axis relative to the drive frames 620 provides a measurement of the Coriolis effect and thus rotation about the z-axis.

Figure 8:
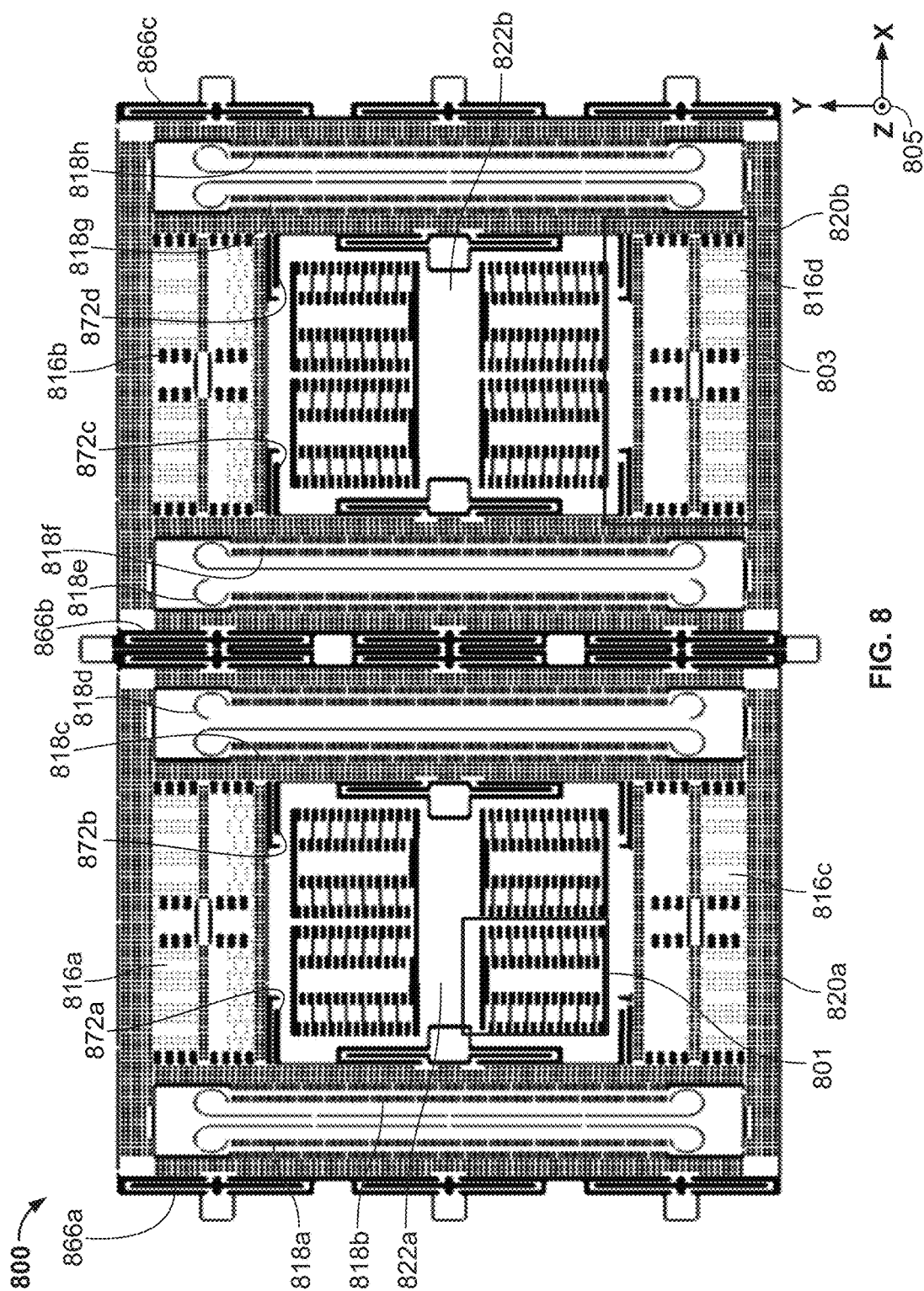
FIG. 8 depicts a system for measurement of yaw rotation, according to an illustrative implementation.

FIG. 8 depicts a system 800 for measurement of yaw rotation. FIG. 8 includes a right-hand coordinate system 805 with x, y, and z axes. The primary plane of the system 800 is the x-y plane. The system 800 includes drive frames 820a and 820b (collectively, drive frames 820) that are springedly coupled to a substrate below by spring elements 866a, 866b, and 866c (collectively, elements 866). The drive frames 820 are driven to oscillate along the x-axis by driving structures 818a, 818b, 818c, 818d, 818e, 818f, 818g, and 818h (collectively, driving structures 818). The driving structures 818a, 818b, 818c, and 818d cause the drive frame 820a to oscillate. The driving structures 818e, 818f, 818g, and 818h cause the drive frame 820b to oscillate. The drive frames 820 oscillate synchronously and in opposite directions. Thus, when the drive frame 820a is moving in the +x direction, the drive frame 820b is moving in the −x direction, and vice versa.

In some examples, the structures 818b, 818c, 818f, and 818g are sense structures. As sense structures, the structures 818b, 818c, 818f, and 818g sense changes in capacitance due to displacements of the drive frames 820. These changes in capacitance sensed by the structures 818b, 818c, 818f, and 818g can be used to measure motion parameters of the drive frames 820 such as displacement, displacement amplitude, displacement frequency, displacement phase, velocity, velocity amplitude, velocity frequency, and velocity phase. These motion parameters can be used by a closed-loop controller to maintain a constant drive amplitude. These motion parameters can also be used by the closed-loop controller to oscillate the drive frames 820 at resonance or off resonance by a desired increment.

The system 800 also includes sense structures 816a, 816b, 816c, and 816d (collectively, sense structures 816) for measuring displacement, velocity, and acceleration of the drive frames 820. The system 800 includes sense masses 822a and 822b (collectively, sense masses 822) that are springedly coupled to the drive frames 820 by spring elements 872a, 872b, 872c, and 872d (collectively, spring elements 872). The sense mass 822a is coupled to the drive frame 820a by the spring elements 872a and 872b. The sense mass 822b is coupled to the drive frame 820b by the spring elements 872c and 872d. FIG. 8 also depicts areas of interest 801 and 803.

The spring elements 866 are compliant along the x-axis but stiff along other axes. Thus, the spring elements 866 allow the drive frames 820 to move along the x-axis but substantially restrict its motion along other axes. Some amounts of motion along other axes is allowed by the spring elements 866, and this off-motion results in quadrature. The spring elements 872 are compliant along the y-axis and stiff along other axes. Thus, the spring elements 872 allow the sense masses 822 to move along the y-axis but substantially restrict motion of the sense masses 822 along other axes. As the drive frames 820 oscillate along x-axis and the system 800 is rotated about the z-axis, the Coriolis effect results in displacement of the sense masses 822 along the y-axis relative to the drive frames 820. By measuring this displacement of the sense masses 822 along the y-axis relative to the drive frames 820, the rate of rotation of the system 800 can be determined.

Figure 9:
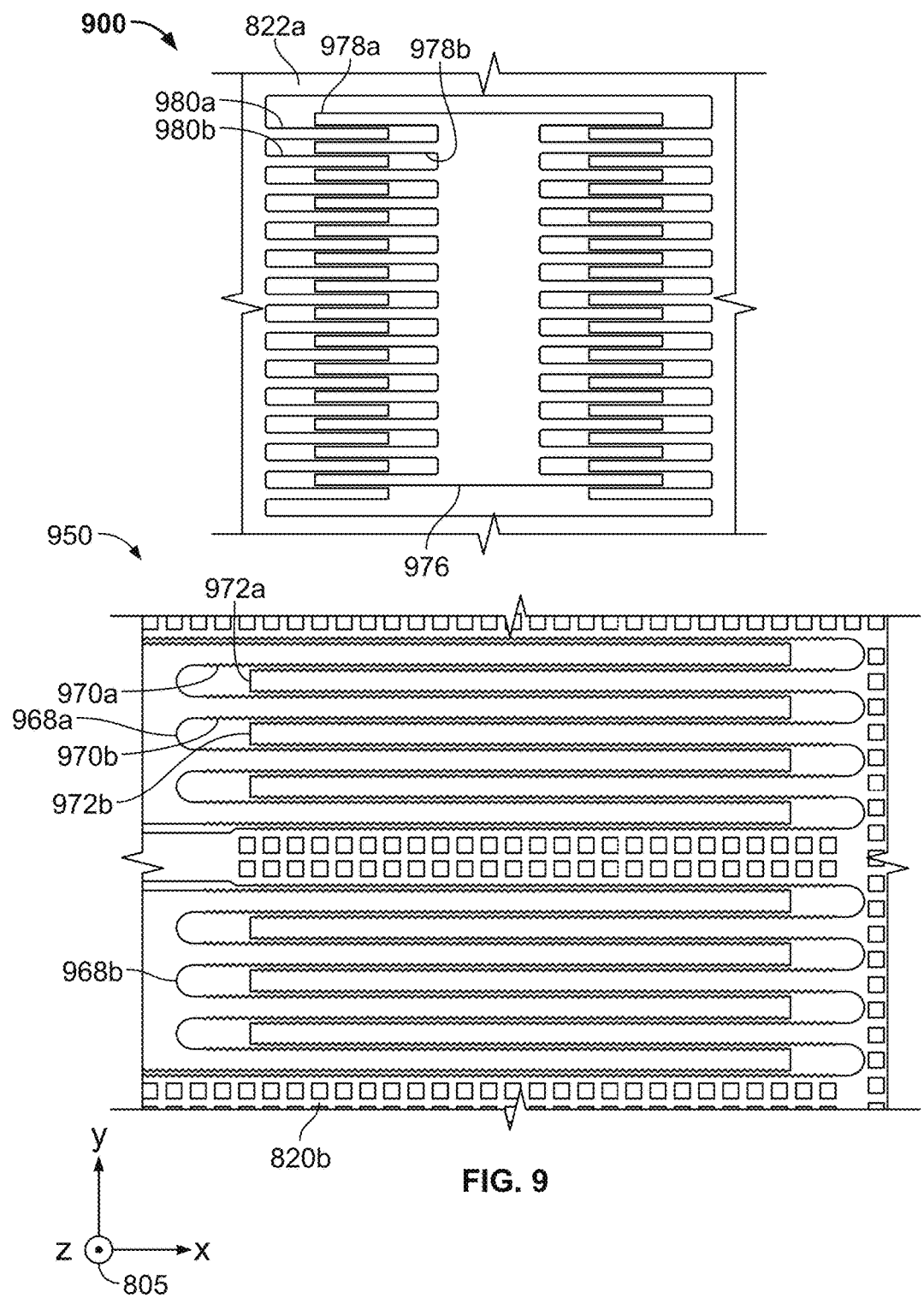
FIG. 9 depicts enlarged views of areas of interest of the system depicted in FIG. 8, according to an illustrative implementation.

FIG. 9 depicts enlarged large views 900 and 950 of the areas of interest 801 and 803 of the system 800, respectively. The view 900 depicts sense capacitors used to measure displacement of the sense mass 822a along the y-axis relative to the drive frame 820a. The view 900 depicts a fixed element 976 that is bonded to the substrate below using wafer bonding techniques. The fixed element 976 includes linear periodic arrays of fixed beams extending perpendicular to the long axis of the fixed element 976. The fixed element 976 includes fixed beams in 978a and 978b (collectively, fixed beams 978). The sense mass 822a includes linear periodic arrays of movable beams that are parallel to the fixed beams 978. The sense mass 822a includes movable beams 980a and 980b (collectively, movable beams 980). As the sense mass 822a moves along the y-axis due to the Coriolis effect caused by rotation about the z-axis, capacitance between the fixed element 976 and the sense mass 822a varies according to the y-displacement.

Figure 11:
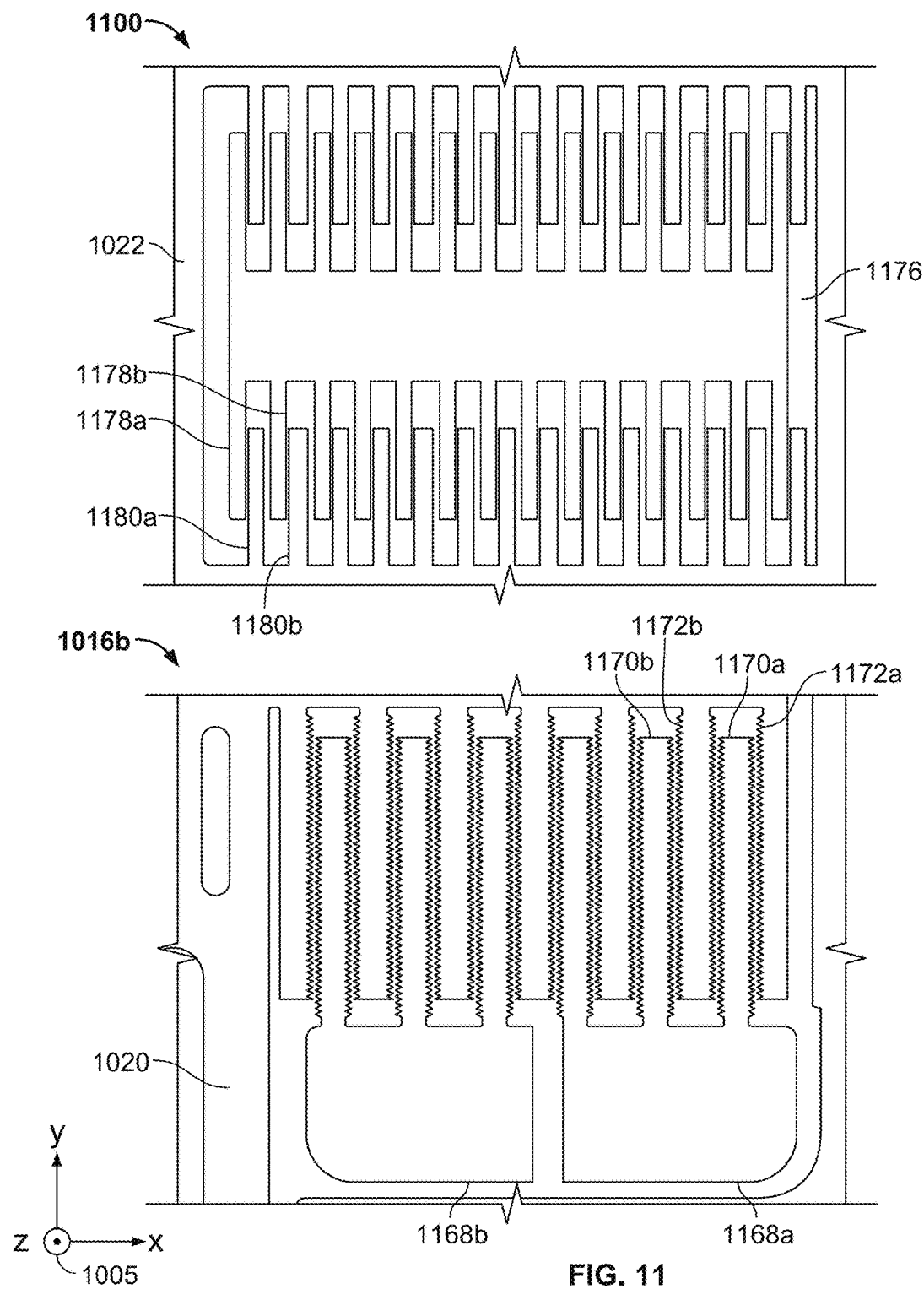
FIG. 11 depicts an enlarged view of a structure to detect motion of a sense mass along the y-axis with respect to the drive frame of a MEMS subsystem, according to an illustrative implementation.
Figure 15:
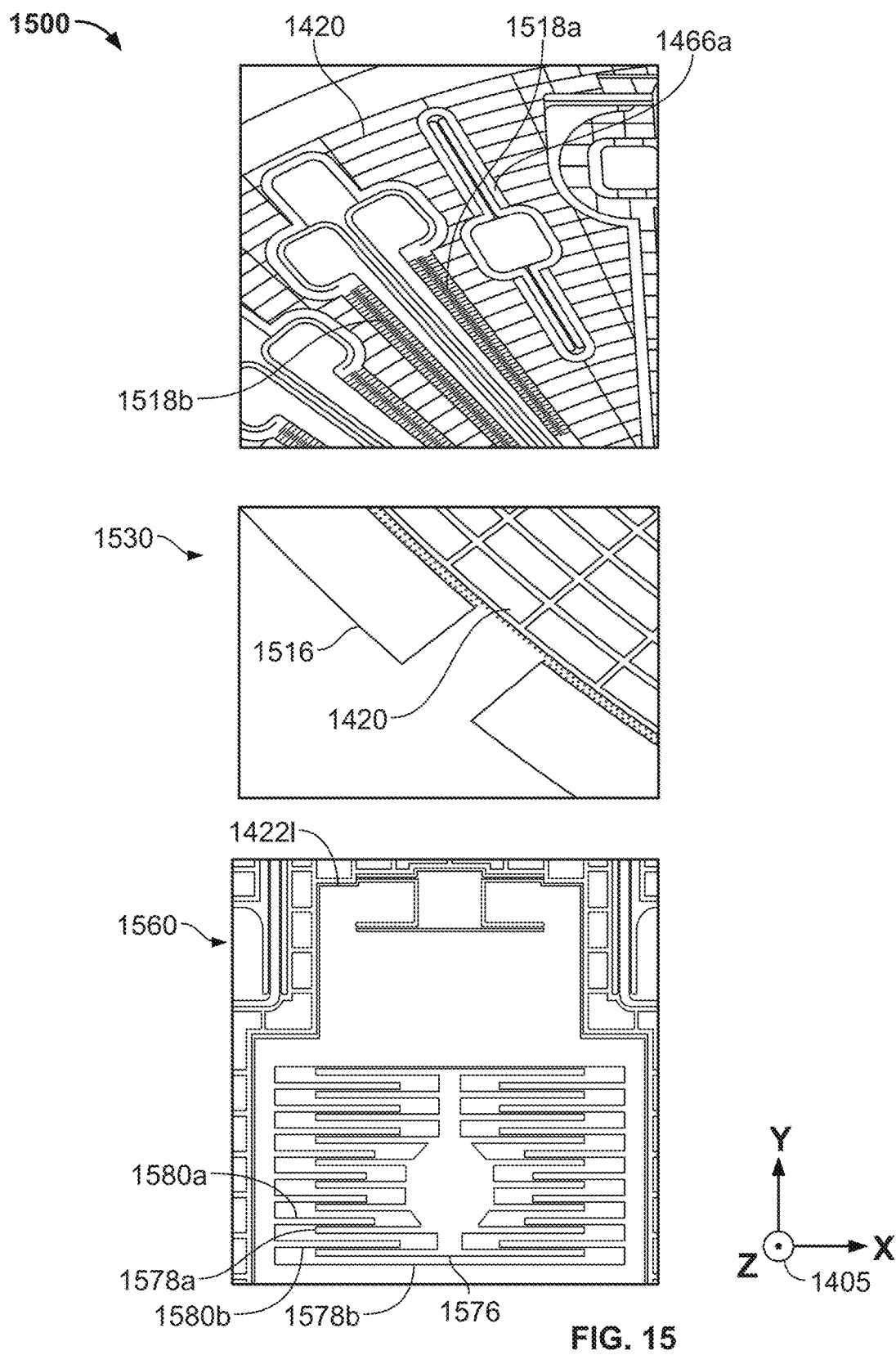
FIG. 15 depicts enlarged views of three areas of interest of the three-axis system depicted in FIG. 14, according to an illustrative implementation.

In some examples, the gap between the movable beam 980a and the fixed beam 978a is different than the gap between the movable beam 980a and the fixed beam 978b when the sense mass 822a is in the rest position. In these examples, the other beams of the sense mass 822a and the fixed element 976 also have different gap sizes on each side. The small gaps are aligned such that motion of the sense mass 822a with respect to the fixed element 976 in a first direction causes all of the small gaps to become smaller and all of the large gaps to become larger. Motion of the sense mass 822a in a direction opposite to the first direction causes all of the small gaps to become larger and all of the large gaps to become smaller. The smaller gap has the larger capacitance and thus dominates the signal. Thus, the overall capacitance signal measured between the sense mass 822a and the fixed element 976 can provide an indication of the motion of the sense mass 822a relative to the fixed element 976. A separate array of fixed and movable beams can provide a signal for a differential measurement. The movable beams in the separate array are coupled to the sense mass 822a and move synchronously with the movable beams 980. Beams in the separate array will have gaps arranged such that motion of the sense mass 822a in the first direction causes the small gaps of the separate array to become larger and the large gaps of the separate array to become smaller. Thus, the separate array will produce a capacitance signal that is synchronous but of opposite polarity to the capacitance signal from the array depicted in the view 900. A differential measurement can be performed between these two capacitance signals. Examples of such structures with different gap sizes are depicted in FIGS. 11 and 15.

By measuring the change in capacitance between the fixed element 976 and the sense mass 822*a*, displacement of the sense mass along the y-axis can be determined. By determining displacement of the sense mass along the y-axis, the Coriolis effect and thus the rate of rotation about the z-axis can be determined.

The view 950 depicts the sense structure 816*d* used to measure displacement, velocity, and acceleration of the drive frame 820*b*. The view 950 depicts fixed elements 968*a* and 968*b* (collectively, fixed elements 968) that are bonded to the substrate below using wafer bonding techniques. The fixed elements 968 include linear periodic arrays of fixed beams. The fixed element 968*a* includes fixed beams 970*a* and 970*b* (collectively, fixed beams 970). The drive frame 820*b* includes linear periodic arrays of movable beams that are parallel to the fixed beams of the fixed elements 968. The drive frame 820*b* includes movable beams 972*a* and 972*b* (collectively, movable beams 972). The sense structure 816*d* is constructed and operated similarly to the sense structure 416*d*. The fixed and movable beams of the sense structure 816*d* have linear periodic arrays of teeth similar to the linear periodic arrays of teeth of the sense structure 416*d*. Capacitance measured between the fixed element 968*a* and the drive frame 820*b* can be used to determine displacement, velocity, and acceleration of the drive frame 820*b* using systems of methods similar to those described with respect to the sense structure 416*d*.

Figure 10:
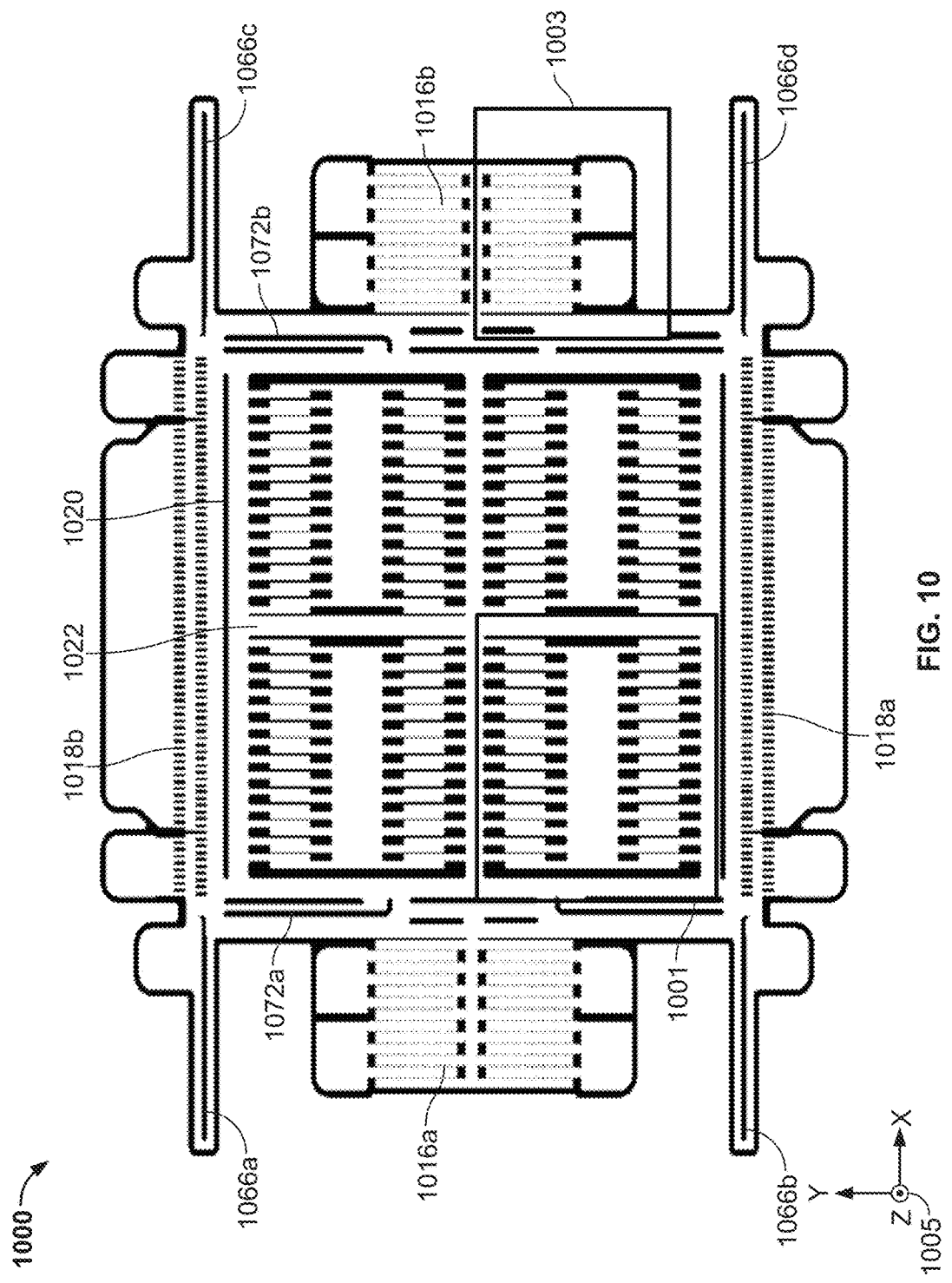
FIG. 10 depicts a single-mass system used to measure rotation about a yaw axis, according to an illustrative implementation.

FIG. 10 depicts a single-mass system 1000 used to measure rotation about a yaw axis. The system 1000 includes a drive frame 1020 that is springedly coupled to a substrate below by spring elements 1066*a*, 1066*b*, 1066*c*, and 1066*d* (collectively, spring elements 1066). FIG. 10 depicts a right-hand coordinate system 1005 with x, y, and z-axes. The system 1000 includes drive structures 1018*a* and 1018*b* (collectively, drive structures 1018) which drive the drive frame 1020 to oscillate along the y-axis. The system 1000 includes a sense mass 1022 that is springedly coupled to the drive frame 1020 by spring elements 1072*a* and 1072*b* (collectively, spring elements 1072). The system 1000 also includes sense structures 1016*a* and 1016*b* (collectively, sense structures 1016) that measure displacement, velocity, and acceleration of the drive frame 1020 along the y-axis with respect to the substrate below. The spring elements 1066 are compliant along the y-axis but stiff along other axes and thus allow the drive frame 1020 to move along the y-axis but substantially restrict its motion along other axes. The spring elements 1066 do allow some motion of the drive frame 1020 along other axes, causing quadrature. FIG. 10 also depicts areas of interest 1001 and 1003 indicating structures for measuring displacement of the sense mass 1022 and the drive frame 1020, respectively. As the drive frame 1020 oscillates along the y-axis and the system 1000 is rotated about the z-axis, the sense mass 1022 is displaced along the x-axis due to the Coriolis effect. By measuring the displacement of the sense mass 1022 along the x-axis with respect to the drive frame 1020, the rotation rate about the z-axis can be determined.

FIG. 11 depicts an enlarged view 1100 of a structure to detect motion of the sense mass 1022 along the y-axis with respect to the drive frame 1020 of the system 1000. The view 1100 depicts a fixed element 1166 that is bonded to the substrate below using wafer bonding techniques. The fixed elements 1176 include linear periodic arrays of fixed beams extending perpendicularly to the long axis of the fixed element 1176. The fixed element 1176 includes fixed beams 1178*a* and 1178*b* (collectively, fixed beams 1178). The sense mass 1022 includes linear periodic arrays of movable beams that are parallel to the fixed beams of the fixed elements 1176. The sense mass 1022 includes movable beams 1180*a* and 1180*b* (collectively, movable beams 1180). Displacement of the sense mass 1022 with respect to the drive frame 1020 can be determined using the systems and methods described with respect to the structure depicted in the view 900 of FIG. 9.

FIG. 11 depicts an enlarged view of the sense structure 1016*b*. The sense structure 1016*b* includes fixed elements 1168*a* and 1168*b* (collectively, fixed elements 1168) that are bonded to the substrate below using wafer bonding techniques. The fixed elements 1168 include linear periodic arrays of fixed beams. The fixed element 1168*a* includes fixed beams 1170*a* and 1170*b*. The drive frame 1020 includes linear periodic arrays of movable beams that are parallel to the fixed beams of the fixed elements 1168. The drive frame 1020 includes movable beams 1172*a* and 1172*b*. Each of the fixed and movable beams include linear periodic arrays of teeth. Capacitance between the fixed elements 1168 and the drive frame 1020 can be measured using the systems and methods described with respect to the sense structures 416 and 816 to determine displacement, velocity, and acceleration of the drive frame 1020 with high accuracy.

Figure 12:
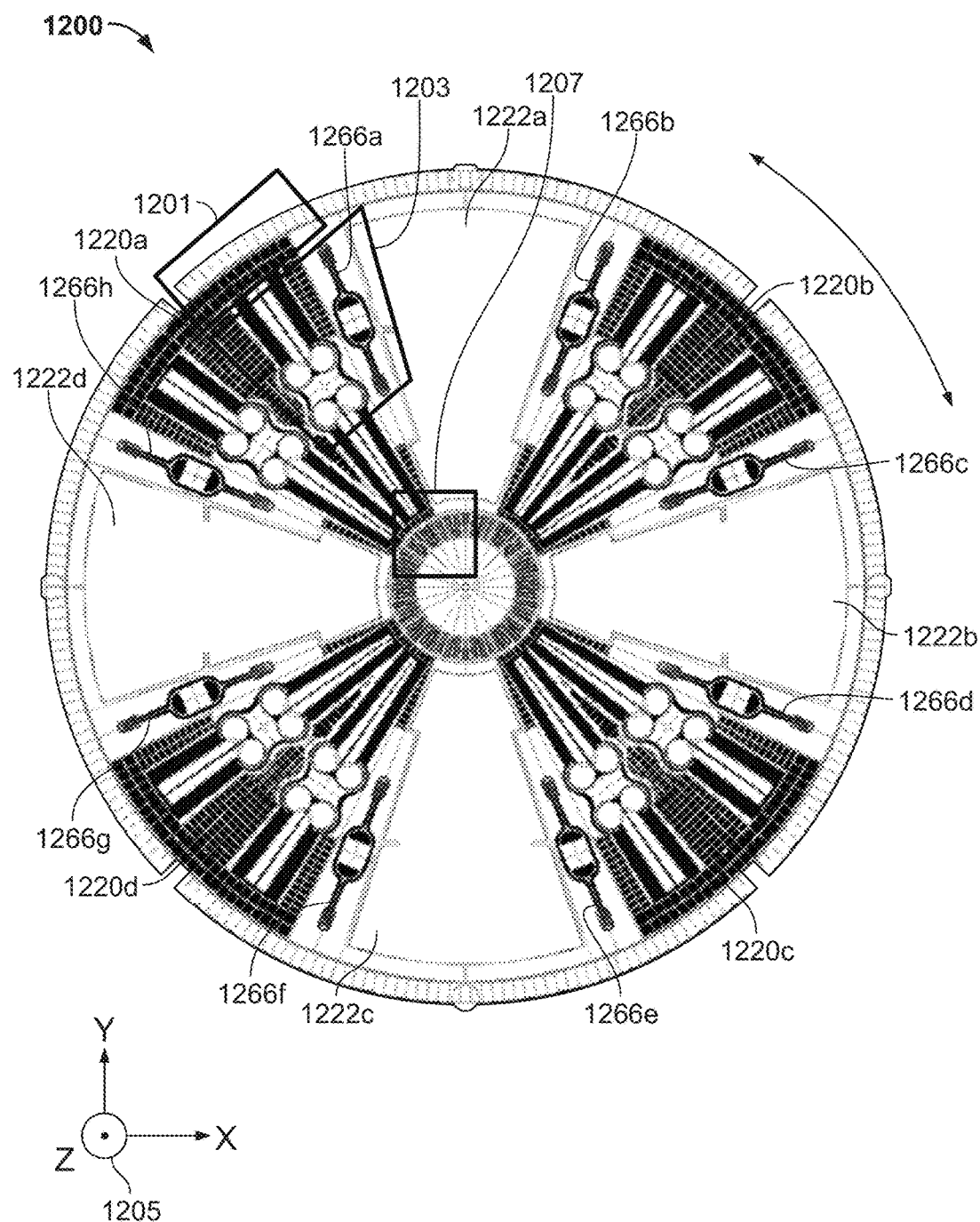
FIG. 12 depicts a two-axis sensor for measuring pitch and roll rotations, according to an illustrative implementation.

FIG. 12 depicts a two-axis sensor 1200 for measuring pitch and roll rotations. FIG. 12 depicts a right-hand coordinate system 1205 with x, y, and z-axes. A pitch rotation of the system 1200 is a rotation about the y-axis and a roll rotation of the system 1200 is a rotation about the x-axis. The system 1200 includes drive frames 1220*a*, 1220*b*, 1220*c*, and 1220*d* (collectively, drive frames 1220) that are springedly coupled to the body of the system 1200 by spring elements 1266*a*, 1266*b*, 1266*c*, 1266*d*, 1266*e*, 1266*f*, 1266*g*, and 1266*h* (collectively, spring elements 1266). The drive frames 1220 are driven to oscillate in rotation about the z-axis by drive structures. The system 1200 includes sense masses 1222*a*, 1222*b*, 1222*c*, and 1222*d* (collectively, sense masses 1222) that are springedly coupled to the drive frames 1220 by spring elements. The sense masses 1222 are displaced along the z-axis with respect to the drive frames 1220 due to the Coriolis effect when the system 1200 experiences a rotation about the x or y-axes. The sense masses 1222*a* and 1222*c* deflect along the z-axis due to a roll rotation about the x-axis. The sense masses 1222*b* and 1222*d* deflect along the z-axis due to a pitch rotation about the y-axis. Deflection of the sense masses 1222 along the y-axis is measured by measuring capacitance between the sense masses 1222 and a top wafer (not shown) located above the sense masses 1222. By measuring deflection of the sense masses 1222 along the z-axis, the system 1200 can be used to determine pitch rotation about the y-axis and roll rotation about the x-axis. FIG. 12 includes areas of interest 1201, 1203, and 1207 indicating structures used for determining drive velocity, driving the drive frames 1220, and springedly coupling the sense masses 1222 to the drive frames 1220, respectively. By combining pitch and roll subset structures into a single monolithic structure, precise alignment between the two sense axes is accurately determined at the time of manufacturing and does not change throughout the lifetime of the device.

Figure 13:
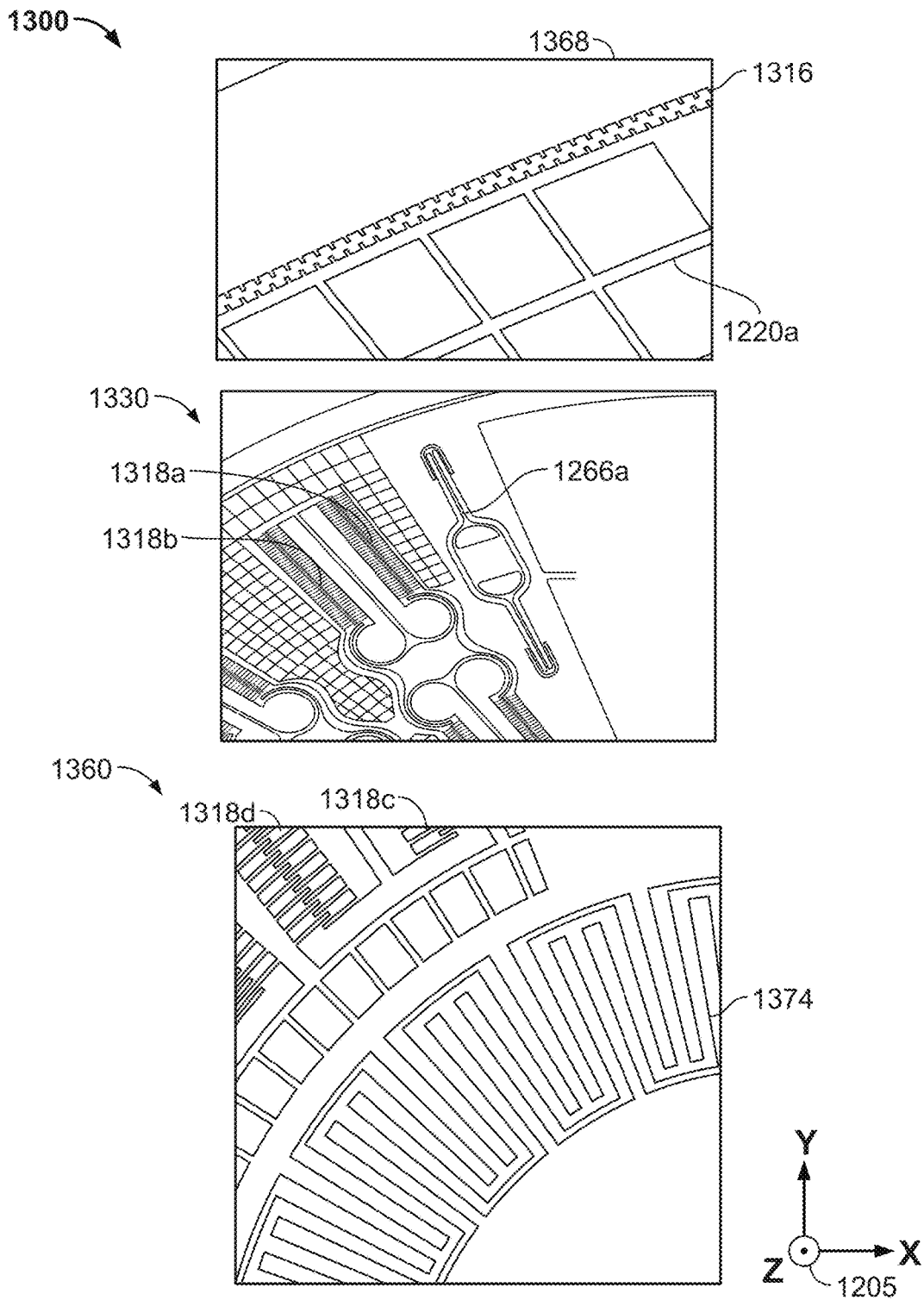
FIG. 13 depicts drive structures, according to an illustrative implementation.

FIG. 13 depicts three enlarged views 1300, 1330, and 1360 depicting the areas of interest 1201, 1203, and 1207, respectively. The enlarged view 1300 depicts a sense structure 1316 configured to determine velocity of the drive frames 1220. The view 1300 depicts a fixed element 1368. The view 1300 also depicts a portion of the drive frame 1220a. The drive frame 1220a has a circular outer perimeter, and the fixed element 1368 has a circular inner perimeter facing the circular outer perimeter of the drive frame 1220a. An array of teeth is disposed on the circular outer perimeter of the drive frame 1220a, and an opposing array of teeth is disposed on the circular inner perimeter of the fixed element 1368. Together, the opposing arrays of teeth are part of the sense structure 1316. Rotation of the drive frame 1220a with respect to the fixed element 1368 can be measured by measuring the capacitance between the opposing arrays of teeth using the systems and methods described with respect to the sense structures 416, 816, and 1016. The system 1200 includes similar arrays of opposing teeth to measure the velocity of the drive frames 1220b, 1220c, and 1220d.

FIG. 13 depicts drive structures 1318a, 1318b, 1318c, and 1318d (collectively, drive structures 1318). The view 1330 depicts the spring element 1266a and the drive structures 1318a and 1318b. The drive structures 1318 operate in similar fashion as the drive structures 418, 818, and 1018. The drive structures 1318 cause the drive frames 1220 to oscillate in rotation about the z-axis.

The view 1360 depicts the drive structures 1318c and 1318d and a spring element 1374. The spring element 1374 allows the sense masses 1222 to move along the z-axis while substantially preventing motion along other axes. The spring element 1374 is double folded to help in mode separation.

Figure 14:
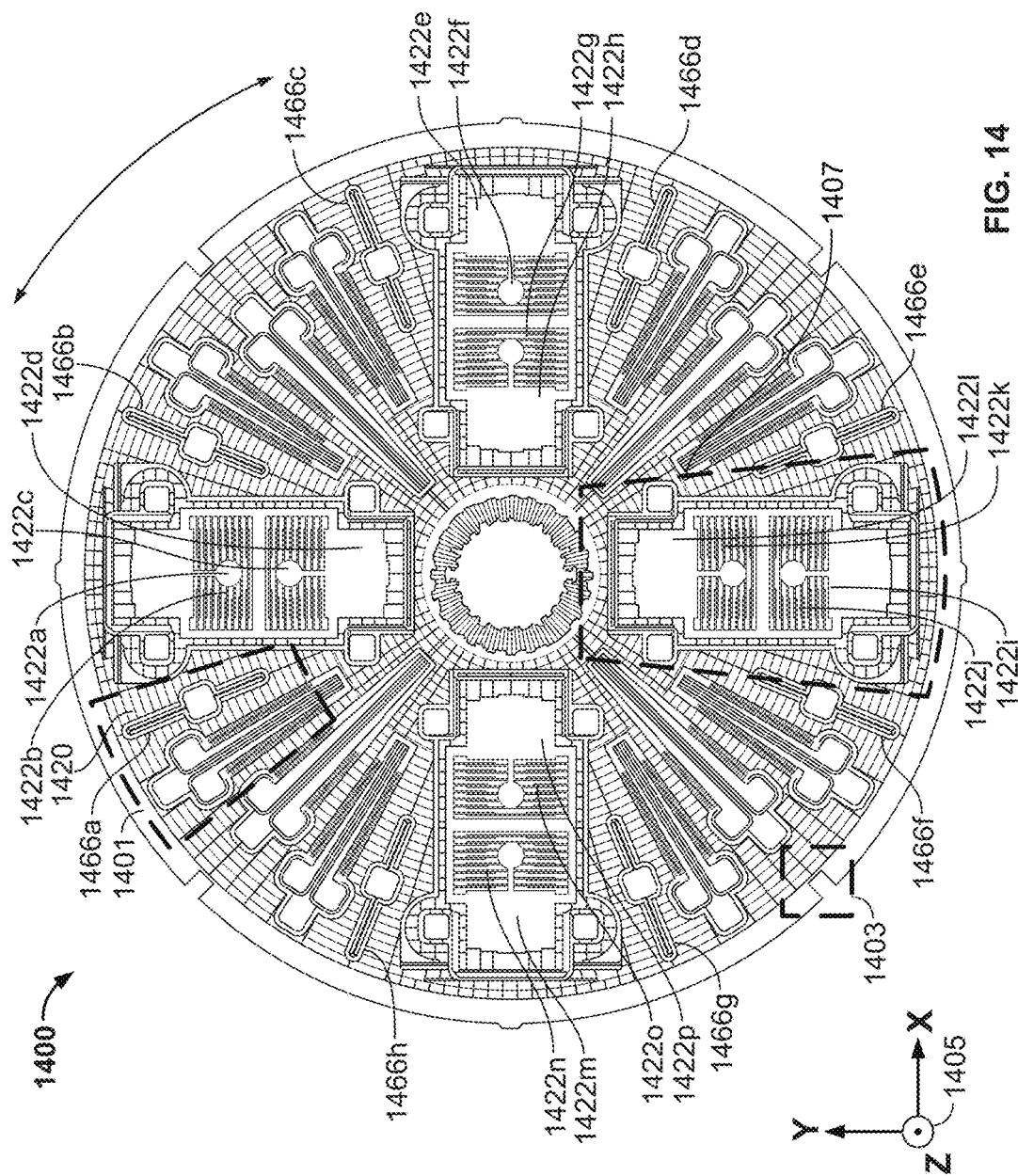
FIG. 14 depicts a three-axis system for measuring pitch, roll, and yaw rotations, according to an illustrative implementation.

FIG. 14 depicts a three-axis system 1400 for measuring pitch, roll, and yaw rotations. FIG. 14 depicts a right-handed coordinate system 1405 with x, y, and z-axes. The system 1400 includes a drive frame 1420 that is springedly coupled to the substrate below by spring elements 1466a, 1466b, 1466c, 1466d, 1466e, 1466f, 1466g, and 1466h (collectively, spring elements 1466). The system 1400 includes sense masses 1422a, 1422b, 1422c, 1422d, 1422e, 1422f, 1422g, 1422h, 1422i, 1422j, 1422k, 14221, 1422m, 1422n, 1422o, and 1422p (collectively, sense masses 1422). The drive frame 1420 is driven into oscillating rotation about the z-axis. Due to this oscillating rotation, the drive frame 1420 causes the sense masses 1422a, 1422b, 1422c, 1422d, 1422i, 1422j, 1422k, and 14221 to oscillate primarily along the x axis. Likewise, due to this oscillating rotation, the drive frame 1420 causes the sense masses 1422e, 1422f, 1422g, 1422h, 1422m, 1422n, 1422o, and 1422p to oscillate primarily along the y axis.

As the system 1400 experiences an external yaw rotation about the z-axis, the Coriolis effect causes the sense masses 1422b, 1422c, 1422j, and 1422k to displace along the y axis and the sense masses 1422f, 1422g, 1422n, and 1422o to displace along the x axis. As the system 1400 experiences an external roll rotation about the x-axis, the sense masses 1422a, 1422d, 1422i, and 14221 are displaced along the z-axis due to the Coriolis effect. As the system 1400 experiences a pitch rotation about the y-axis, the sense masses 1422e, 1422h, 1422m, and 1422p are displaced along the z-axis due to the Coriolis effect. In some examples, sense masses can be springedly coupled to the drive frame 1420 such that the sense masses deflect along multiple axes. For example, the sense masses 1422b and 1422d can be displaced both along the y-axis due to an external yaw rotation and along the z-axis due to an external roll rotation. As another example, the sense masses 1422e and 1422g can be displaced both along the x-axis due to an external yaw rotation and along the z-axis due to an external pitch rotation. Other sense masses can be displaced along multiple axes in a similar manner. By measuring displacement of the sense masses 1422 due to the Coriolis effect, external rotations can be determined.

FIG. 14 also depicts the areas of interest 1401, 1403, and 1407.

FIG. 15 depicts enlarged views 1500, 1530, and 1560 of the three areas of interest 1401, 1403, and 1407, respectively. The view 1500 depicts the drive frame 1420, the spring element 1466a, and drive structures 1518a and 1518b (collectively, drive structures 1518). The drive structures 1518 drive the drive frame 1420 into oscillating rotation about the z-axis as described previously with respect to FIG. 14. The system 1400 can include more drive elements in addition to the drive elements 1518.

The view 1530 depicts a portion of the drive frame 1520 and a sense element 1516. The sense element 1516 is constructed and operated similarly to the sense element 1316. The sense element 1516 is used to accurately measure the displacement, velocity, and acceleration of the drive frame 1420 in real time.

The view 1560 depicts the sense mass 14221 and a structure configured for sensing motion in the x-y plane. The view 1560 depicts a fixed element 1576 that is bonded to the substrate below using wafer bonding techniques. The fixed element 1576 includes linear periodic arrays of beams disposed perpendicularly to the long axis of the fixed element 1576. The fixed element 1576 includes fixed beams 1578a and 1578b. The sense mass 14221 includes linear periodic arrays of movable beams that are parallel to the fixed beams of the fixed element 1576. The sense mass 14221 includes the movable beams 1580a and 1580b (collectively, movable beams 1580). Changes in capacitance between the fixed and moveable beams are measured to determine displacement in the x-y plane of the sense mass 14221.

Figure 16:
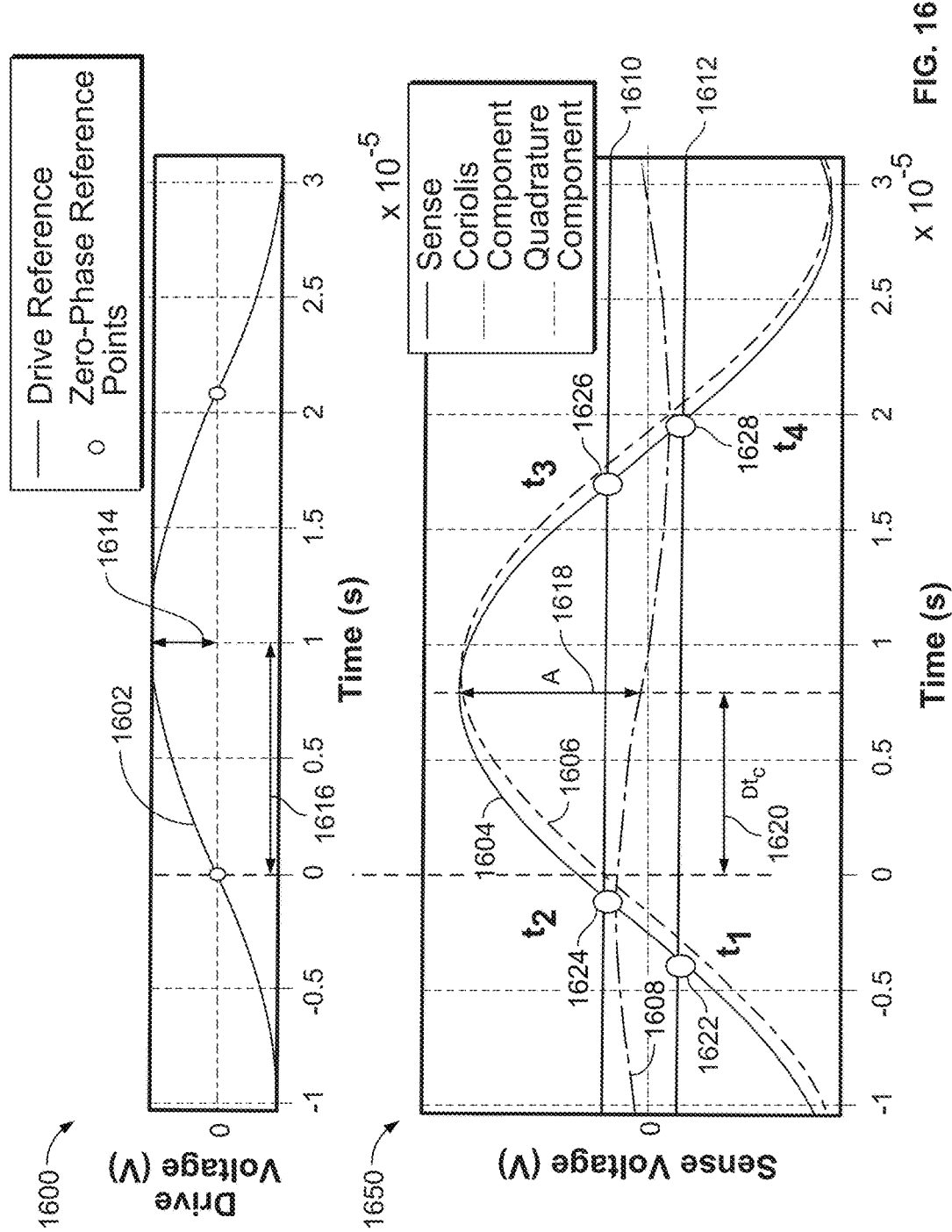
FIG. 16 depicts two graphs showing the determination of a Coriolis component from a sense signal, according to an illustrative implementation.

FIG. 16 depicts two graphs 1600 and 1650 showing the determination of a Coriolis component from a sense signal. The graph 1600 shows the behavior of drive voltage with respect to time. The drive voltage is the voltage applied to a drive element to drive a drive frame into oscillation and can be measured directly at the drive element or elsewhere in a circuit powering the drive element. The graph 1600 includes a drive reference curve 1602 which oscillates between positive and negative voltages, crossing zero twice in the time interval depicted in the graph 1600. The times at which the drive reference curve 1602 crosses zero are the zero-phase reference points and are used to establish timing with respect to the drive signal. The drive reference curve 1602 has an amplitude 1614 and a drive reference offset time 1616 which corresponds with the time interval between a zero crossing occurring on a rising edge and the time of maximum amplitude of the drive reference curve 1602. In the graph 1600, the drive reference offset time is 10 microseconds.

The graph 1650 depicts the extraction of Coriolis and quadrature components from the sense signal. The graph 1650 includes a sense curve 1604, a quadrature component curve 1606, and a Coriolis component curve 1608. The sense curve is derived from a capacitor which measures displacement of a sense mass along the axis along which the sense mass is displaced due to the Coriolis effect. As the sense curve 1604 is a periodic signal, it can be represented as a combination of multiple periodic signals. When the sensor is experiencing an external rotation, the sense curve will be composed of two components: a Coriolis component due to the rotation and a quadrature component due to motion of the drive frame in the sense direction. Because quadrature is caused by motion of the drive frame in the sense direction, the quadrature component is in phase with the drive voltage curve 1602 and is proportional to displacement of the sense mass. The Coriolis component is caused by the Coriolis effect and is proportional to the sense mass velocity. The Coriolis component curve 1608 is phase-shifted by 90° from the quadrature component curve 1606. The quadrature component curve 1606 has an amplitude A 1618 that is large compared to the amplitude of the Coriolis component curve 1608. This is typical because the Coriolis effect is often weak.

The physics of the coupled oscillator system of the sense mass and the drive mass can cause the quadrature component to be slightly phase-shifted from the drive voltage. To determine the magnitude phase shift, the gyroscope can be calibrated when the gyroscope is in a zero-rotation state. During calibration, the phase of the synchronous demodulation is tuned to minimize or zero the Coriolis component and maximize the quadrature component. The phase which produces this condition is the phase shift of the quadrature component from the drive voltage.

Regardless of any phase shift between the quadrature component and the drive voltage, the phase between the drive voltage curve 1602 and the sense curve 1604 will change as a function of the ratio between the Coriolis component and the quadrature component. Thus, the Coriolis component can be measured by measuring the phase shift between the sense curve 1604 and the drive voltage curve 1602.

The graph 1650 includes a positive voltage reference level 1610 and a negative voltage reference level 1612. The graph 1650 also includes four times, $t_1$ 1622, $t_2$ 1624, $t_3$ 1626, and $t_4$ 1628. These four times correspond the times at which the sense curve 1604 crosses the reference level 1610 and 1612. The times 1622, 1624, 1626 and 1628 can be determined using comparators such as the threshold detectors 134, logic such as the logic 136, and time to digital convertors such as the TDC 138. The times $t_2$ 1624 and $t_3$ 1626 correspond to times at which the sense curve 1604 crosses the positive voltage reference level 1610. The times $t_1$ 1622 and $t_4$ 1628 correspond to times at which the sense curve 1604 crosses the negative voltage reference level 1612. The graph 1650 also includes a sense curve amplitude A 1618 and a sense curve offset $\Delta t_C$ 1620. The sense curve amplitude A 1618 is the amplitude of the sense curve 1604. The sense curve offset time $\Delta t_C$ 1620 is the time interval between the zero-phase reference point of the rising edge of the drive reference curve 1602 and the time at which the sense curve 1604 reaches its maximum amplitude A 1618. If there is no external rotation and thus no Coriolis effect, the offset times 1616 and 1620 will be the same because the sense curve 1604 only has a quadrature component. However, the presence of a Coriolis effect due to external rotation will cause the offset time 1620 to be less than the offset time 1616.

To extract the Coriolis component curve 1608 from the sense curve 1604, first the sense curve offset time interval $\Delta t_C$ 1620 is measured. Then, the cosine method (depicted in and described with respect to FIGS. 51-56) is used to determine the amplitude A 1618 and the frequency $\omega_0$ of the sense curve 1604 using the measured times 1622, 1624, 1626 and 1628. Once the amplitude A 1618 and the frequency $\omega_0$ of the sense curve 1604 are determined using the cosine method, the quadrature and Coriolis components can be calculated using Equations 6 and 7, respectively.

$$Q = \frac{A}{\sqrt{1 + \tan^2(\omega_0 \cdot \Delta t_C)}} \quad (6)$$

$$C = Q \cdot \tan(\omega_0 \cdot \Delta t_C) \quad (7)$$

By measuring the times 1622, 1624, 1626, and 1628 at which the sense curve 1604 crosses the reference level 1610 and 1612, the Coriolis and quadrature components can be accurately determined. The quadrature and Coriolis components calculated from Equations 6 and 7 can represent the quadrature and Coriolis magnitudes 108 and 110, respectively.

One benefit of the systems methods described herein is that the rotation rate can be determined accurately despite the presence of perturbations to the drive velocity of the drive frame of the sensor. Decoupling of the rotation rate from the drive velocity in the presence of a perturbation to the drive voltage will be described with respect to FIGS. 17-20.

Figure 17:
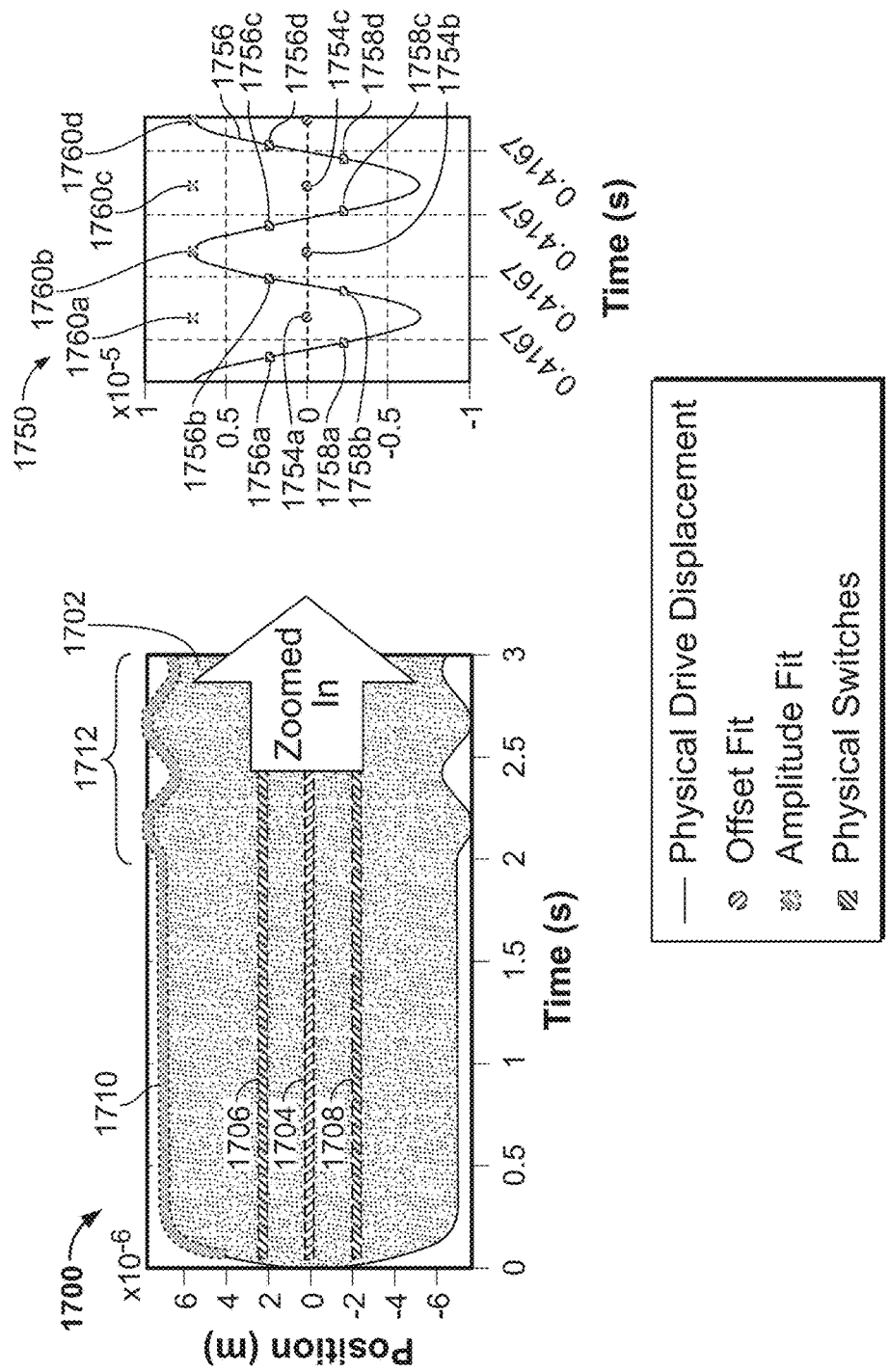
FIG. 17 depicts two views showing results of the systems and methods described with respect to FIG. 16, according to an illustrative implementation.

FIG. 17 depicts two views 1700 and 1750 showing results of the systems and methods described with respect to FIG. 16. The graph 1700 shows the results of the cosine method plotted over a time interval of three seconds. The graph 1700 includes a physical drive displacement curve 1702, an offset fit curve 1704, an amplitude fit curve 1710, and physical switch curves 1706 and 1708. The times at which the physical drive displacement curve 1702 crosses the physical switch curves 1706 and 1708 are determined using sense structures such as the sense structures 116, 416, 816, 1016, and 1216, zero-crossing detectors such as the detector 158, and TDC's such as the TDC 160. The offset fit curve 1704 and the amplitude fit curve 1710 are determined using the cosine method based on the times at which the physical drive displacement curve 1702 crosses the physical switches 1706 and 1708.

FIG. 17 depicts the drive displacement curve 1702 in the presence of a perturbation applied to the drive voltage, which affects the amplitude of the drive displacement curve 1702. This is manifested in the amplitude variations of the drive displacement curve 1072 during a time interval 1712. Because the displacement of the sense mass due to the Coriolis effect is impacted by velocity of the drive frame, perturbations to the drive voltage and drive velocity will affect the Coriolis component extracted from the sense signal.

The graph 1750 depicts an enlarged view of a portion of the graph 1700. The graph 1750 includes a physical drive displacement curve 1752 that corresponds to the physical drive displacement curve 1702. The graph 1750 also includes offset fit points 1754a, 1754b, and 1754c, which correspond to points on the offset fit curve 1704. The graph 1750 also includes amplitude fit points 1760a, 1760b, 1760c, and 1760d (collectively, amplitude fit points 1760), which correspond to points on the amplitude fit curves 1710. The graph 1750 also includes physical switch points 1756a, 1756b, 1756c, and 1756d (collectively, physical switch points 1756), which correspond to points on the physical switch curve 1706. The graph 1750 also includes physical switch points 1758a, 1758b, 1758c, and 1758d (collectively, physical switch points 1758), which correspond to points on the physical switch curve 1708.

Figure 18:
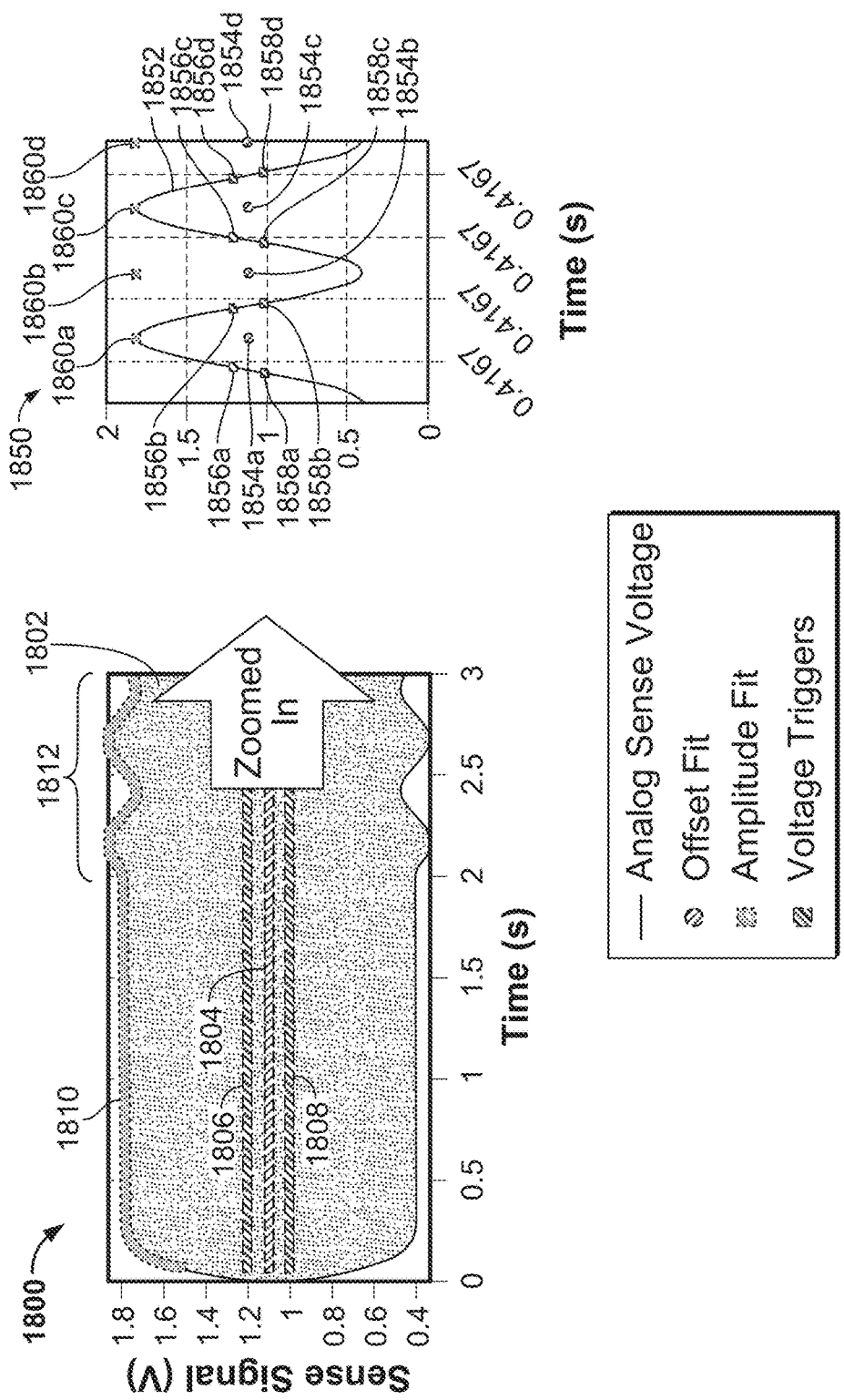
FIG. 18 depicts two graphs showing results of applying a cosine method to a sense signal, according to an illustrative implementation.

FIG. 18 depicts two graphs 1800 and 1850 showing results of applying the cosine method to a sense signal, such as the sense curve 1604. The graph 1800 includes an analog sense voltage curve 1802, and amplitude fit curve 1810 corresponding to the amplitude of the analog sense curve 1802, an offset fit curve 1804, and voltage trigger curves 1806 and 1808. The amplitude fit curve 1810 and the offset fit curve 1804 are determined using the cosine method based on times at which the analog sense curve 1802 crosses the voltage trigger levels 1806 and 1808. The times at which the analog sense curve 1802 crosses the voltage trigger levels 1806 and 1808 are determined using threshold detectors such as the threshold detectors 134, logic such as the logic 136, and a TDC such as the TDC 138. The curve 1802 includes oscillations in the sense signal over a time interval 1812.

The graph 1850 depicts an enlarged view of the graph 1800. The graph 1850 includes an analog sense voltage curve 1852 that corresponds to the analog sense voltage curve 1802. The graph 1850 also includes amplitude fit points 1860a, 1860b, 1860c, and 1860d (collectively, amplitude fit points 1868) that correspond to points on the amplitude fit curve 1810. The graph 1850 also includes offset fit points 1854a, 1854b, 1854c, and 1854d (collectively, offset fit points 1854), that correspond to points on the offset fit curve 1804. The graph 1850 also includes voltage trigger points 1856a, 1856b, 1856c and 1856d (collectively, voltage trigger points 1856), that correspond to points on the voltage trigger curve 1806. The graph 1850 also includes voltage trigger points 1858a, 1858b, 1858c, and 1858d, (collectively, voltage trigger points 1858), that correspond to points on the voltage trigger curve 1808. By measuring times at which the analog sense voltage curve crosses the voltage trigger levels 1806 and 1808, the amplitude and offset of the analog sense voltage curve of 180 can be determined.

Figure 19:
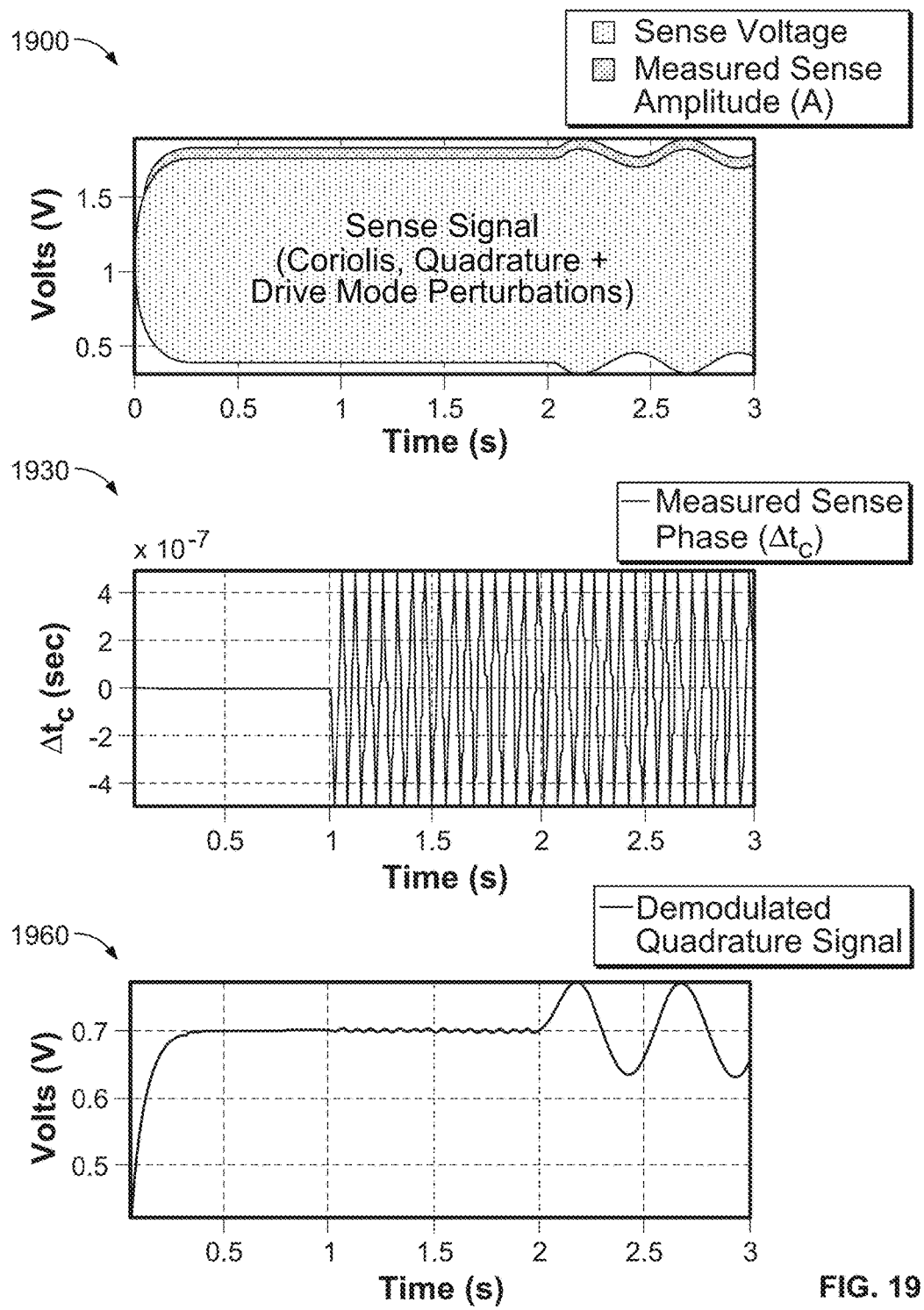
FIG. 19 depicts three graphs that illustrate demodulation of a drive velocity perturbation from a sense signal, according to an illustrative implementation.

FIG. 19 depicts three graphs 1900, 1930 and 1960 that illustrate the demodulation of the drive velocity perturbation from a sense signal. The graph 1900 depicts a sense voltage curve containing perturbations in amplitude due to the drive mode perturbations. The sense signal includes both Coriolis and quadrature components. The graph 1930 depicts the measured phase of the sense signal, expressed as a time offset $\Delta t_C$, an example of which is the offset time 1620. The measured offset time is relatively independent of the drive mode perturbations. The graph 1960 depicts the quadrature signal extracted from the sense curve shown in 1900. The quadrature signal shown in the graph 1960 is determined using measured times in Equation 6.

Figure 20:
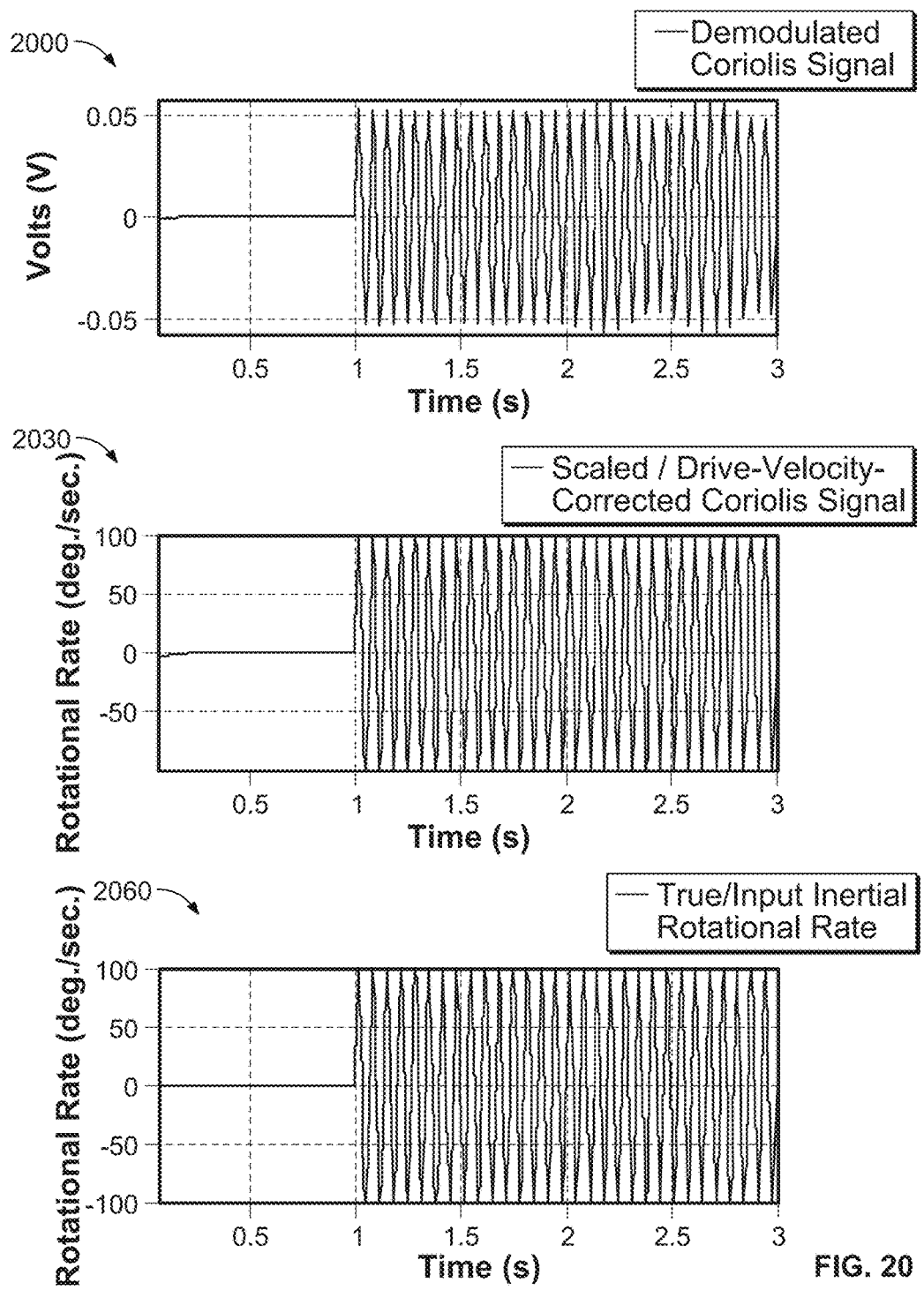
FIG. 20 depicts three graphs showing the demodulation of the rotation rate from a sense signal, according to an illustrative implementation.

FIG. 20 depicts three graphs 2000, 2030 and 2060 showing the demodulation of the rotation rate from the sense signal shown in 1900. The graph 2000 depicts the demodulated Coriolis signal calculated using Equation 7 and based on measured times of crossing of reference levels. The demodulated Coriolis signal shown in the graph 2000 includes oscillations in amplitude due to the drive mode perturbations. The graph 2030 shows the Coriolis signal after correcting for variations in drive velocity due to the drive mode perturbations. The drive velocity is measured in real-time using sense structures such as the sense structures 116, 416, 816, 1016 and 1216 and drive velocity subsystems such as the drive velocity subsystem 106. The corrected Coriolis signal shown in the graph 2030 does not contain oscillations in amplitude due to the drive mode perturbations and is calculated using Equation 8.

In Equation 8, SF represents a scale factor, C(t) represents the Coriolis component depicted in the graph 2000, and $v_{D(t)}$ represents the drive velocity measured in real-time.

The graph 2060 depicts the actual rotation rate applied to the sensor. The actual rotation rate depicted in 2060 matches the calculated rotation rate depicted in the graph 2030, illustrating that the rotation rate can be calculated accurately despite the presence of the perturbation to the drive mode.

Figure 21:
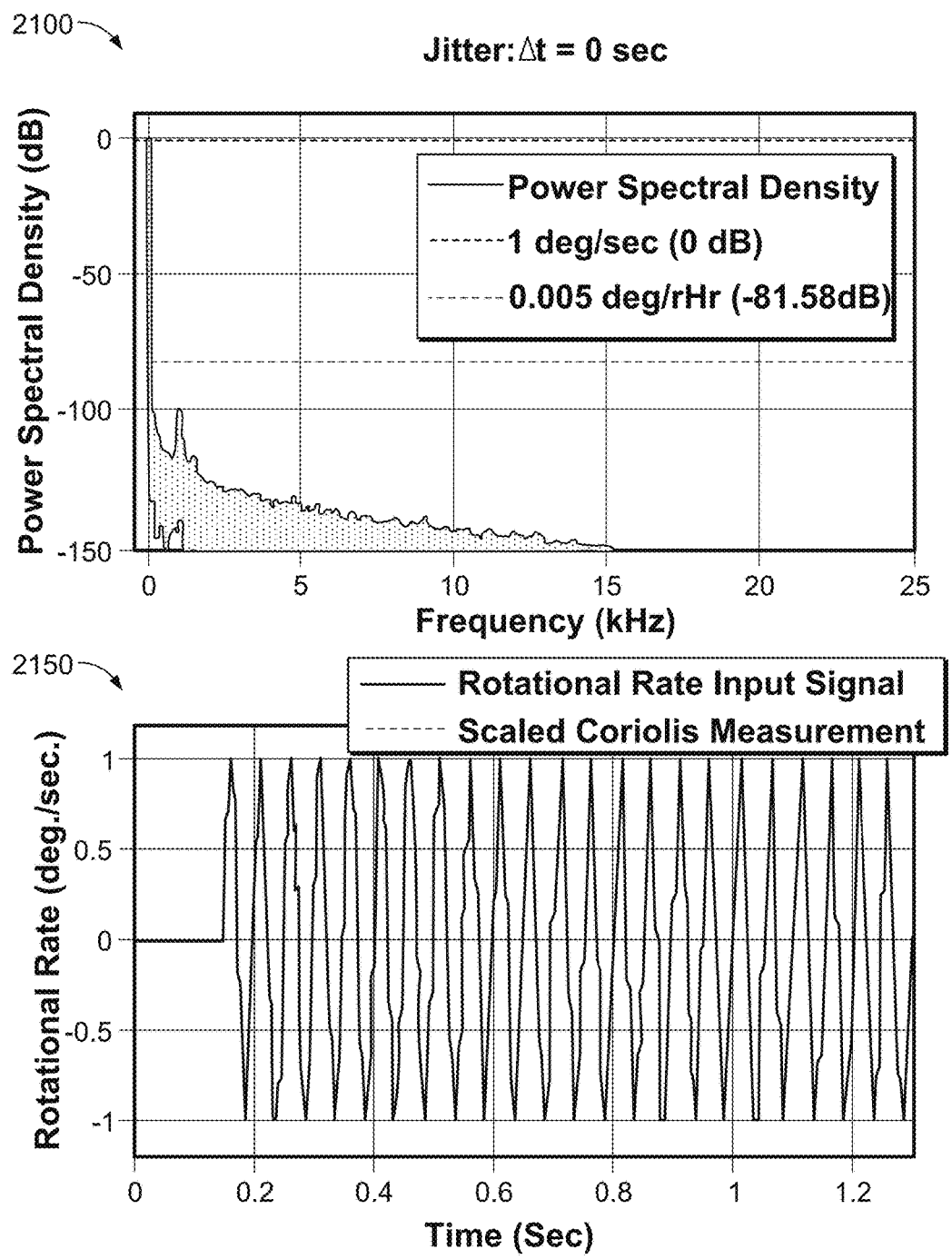
FIG. 21 depicts two graphs showing the performance of the systems and methods described herein with a timing jitter of zero seconds, according to an illustrative implementation.

FIG. 21 depicts two graphs 2100 and 2150 showing the performance of the systems and methods described herein with a timing jitter of zero seconds. The graph 2100 depicts the power spectral density in dB. The power spectral density across a wide range of frequencies is well below −81.58 dB, which corresponds to a rotation rate of 0.005°/hr.

The graph 2150 depicts the measured rotation rate and the true rotation rate. As shown in the graph 2150, the measured rotation rate is well matched to the true rotation rate.

Figure 22:
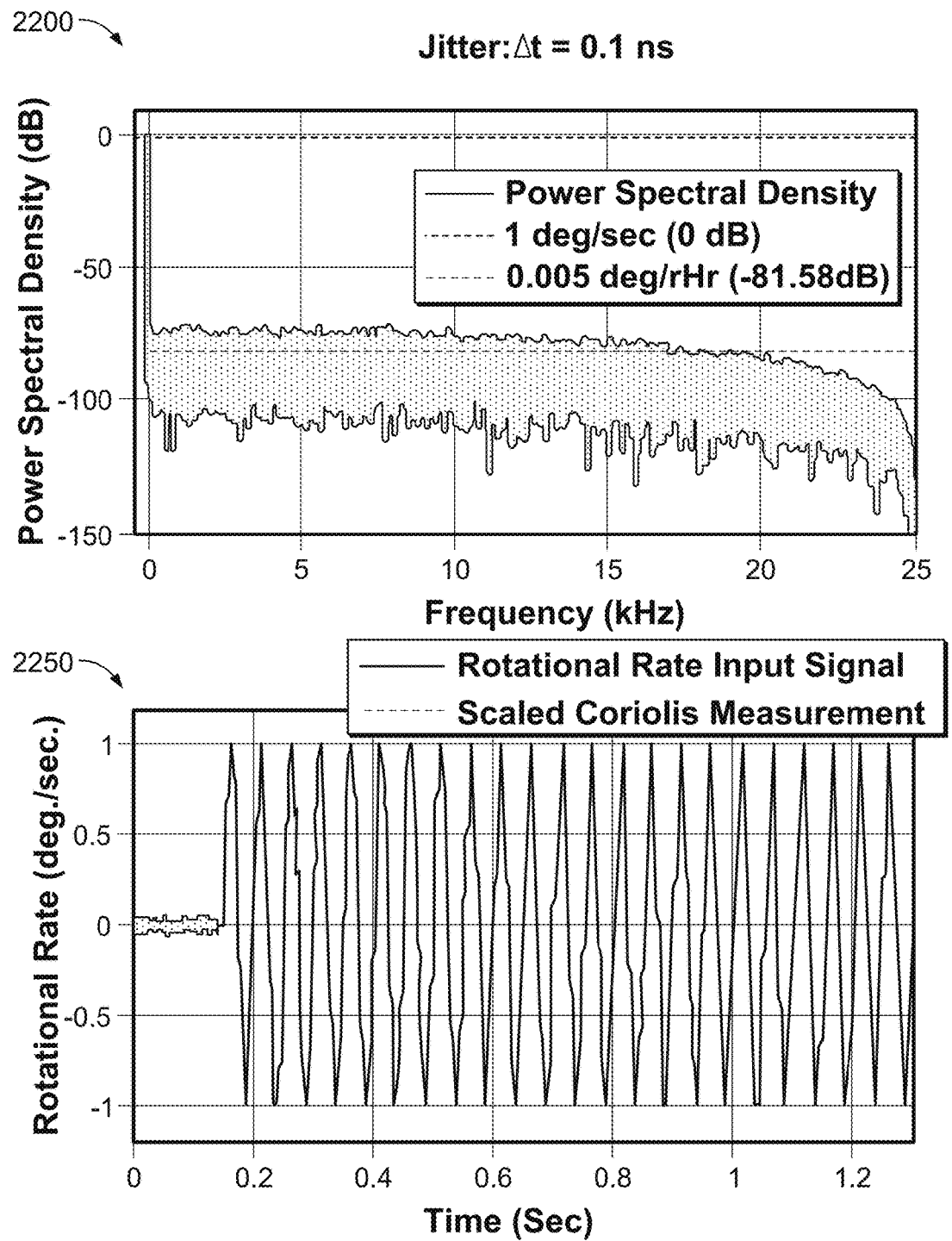
FIG. 22 depicts two graphs showing the performance of the systems and methods described herein in the presence of a timing jitter of 0.1 nanoseconds, according to an illustrative implementation.

FIG. 22 depicts two graphs 2200 and 2250 showing the performance of the systems and methods described herein in the presence of a timing jitter of 0.1 nanoseconds. The graph 2200 shows the power spectral density of the measured signal in the presence of this timing jitter. The power spectral density is approximately −80 dB across a range of frequencies and decreases at frequencies above 20 kilohertz.

The graph 2250 shows the measured rotation rate and the true rotation rate in the presence of the timing jitter of 0.1 nanoseconds. As shown in the graph 2250, the scaled Coriolis measurement matches well to the true rotation rate, but has increased noise.

Figure 23:
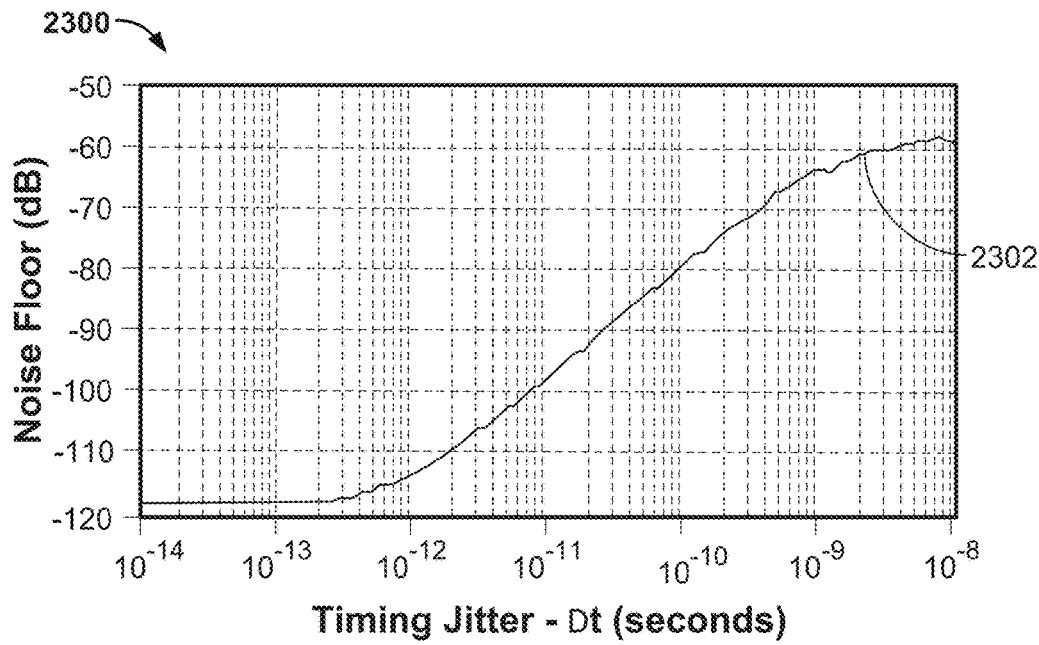
FIG. 23 depicts a graph showing changes in noise floor of the systems and methods described herein with respect to timing jitter, according to an illustrative implementation.

FIG. 23 depicts a graph 2300 showing changes in noise floor of the systems and methods described herein with respect to timing jitter. The graph 2300 includes a noise floor curve 2302 which ranges from approximately −60 dB at timing jitter of 10 nanoseconds to below −110 dB at a timing jitter of one picosecond.

Figure 24:
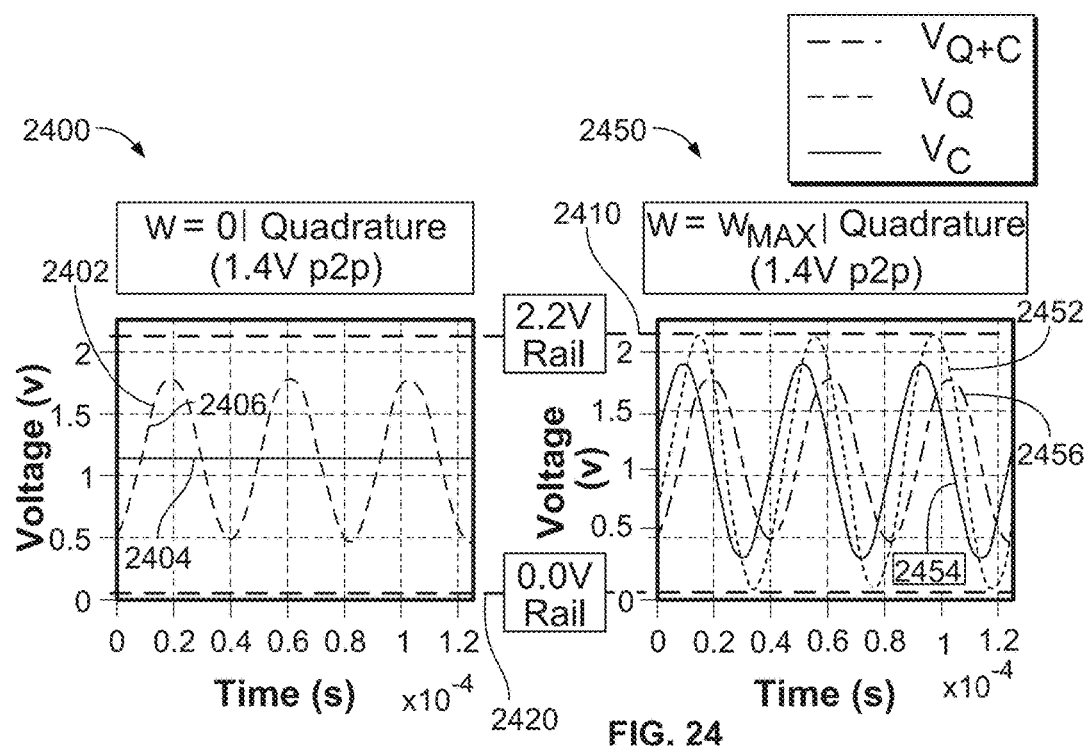
FIG. 24 depicts two graphs showing an example of determining the maximum rotation rate which can be measured using the systems and methods described herein, according to an illustrative implementation.

FIG. 24 depicts two graphs 2400 and 2450 showing an example of determining the maximum rotation rate which can be measured using the systems and methods described herein. The graph 2400 depicts signals derived from the sensor with no external rotation. The graph 2400 includes a sense signal curve 2402, a quadrature component 2406, and a Coriolis component curve 2404. Because there is no applied rotation, the quadrature component curve 2406 is overlaid on the sense signal curve 2402. FIG. 24 depicts a lower limit rail 2420 and an upper limit rail 2410 which represent the limits of analog components used to measure the sense signal curve 2402. In the example depicted in FIG. 24, the lower limit rail 2420 is at 0V, and the upper limit rail 2410 is at 2.2V. In other examples, the upper and lower limit rails 2410 and 2420 can be at different voltage levels.

The graph 2450 depicts a sense signal curve 2456, a quadrature component curve 2454, and a Coriolis component curve 2454. The graph 2450 depicts outputs of the sensor in the presence of an external rotation sufficient to cause the sense signal curve 2452 to span the full scale range between the upper limit 2410 and the lower limit 2420. Because an applied external rotation is present, the Coriolis component 2454 has a large amplitude. The quadrature component curve 2456 has the same amplitude as the quadrature component curve 2406, because the drive velocity is the same in both situations. The ratio of Coriolis to quadrature voltage signals is described by Equation 9.

$$\Omega(t) = [SF] \cdot \frac{C(t)}{v_D(t)} \quad (8)$$

$$\frac{V_C}{V_Q} = \frac{F_C}{F_Q} = \frac{2m_s x_0 \omega_d \Omega}{k_{xy} x_0} \quad (9)$$

In Equation 9, $m_s$ represents the mass of the sense mass, $x_0$ represents the displacement, $\Omega_d$ represents the drive frequency, $\omega$ represents the external rotation rate, and $k_{xy}$ represents a physical quadrature level caused by coupling the drive velocity into the sense direction. In Equation 9, $V_C$ represents the voltage of the Coriolis signal, $V_Q$ represents the voltage of the quadrature signal, $F_C$ represents the Coriolis force, and $F_Q$ represents the quadrature force.

Given a physical quadrature level $k_{xy}$ and a capacitance-to-voltage gain G, an offset can be chosen such that $V_Q$ spans a desired percentage of the full-scale range delineated by the upper and lower limits 2410 and 2420. In the example depicted in the FIG. 24, the full-scale range is 2.2V and the $V_Q$ is chosen to be 1.4V peak-to-peak. In this example, the maximum value of $V_C$ is 1.26V peak-to-peak as shown in Equation 10.

$$V_{C,MAX} = \sqrt{(2.2V)^2 - (1.4V)^2} = 1.26V \; (p2p) \qquad (10)$$

The maximum measurable rate of rotation which can be measured without saturating the analog components is given by Equation 11. Thus, $V_Q$ depends on the capacitance-to-voltage gain G, and the coupling constant $k_{xy}$ depends on the physical amount of quadrature exhibited by the sensor.

$$\Omega_{MAX} = \frac{V_{C,MAX}}{V_Q} \cdot \frac{k_{xy} x_0}{2 m_s x_0 \omega_d} \qquad (10)$$

The minimum detectable angular rate of rotation can also be calculated. An offset phase $\theta_T$ can be calculated based on a timing measurement of $\Delta t_C$. The ratio of Coriolis to quadrature voltage signals can be expressed as shown in Equation 12.

$$\frac{V_C}{V_Q} = \tan(\theta_T) \qquad (12)$$

The ratio of minimum Coriolis voltage to quadrature voltage is given by Equation 13, where $\delta t_{MIN}$ is the minimum resolvable timing interval for measuring $\Delta t_C$.

$$\frac{V_{C,MIN}}{V_Q} = \tan(\omega_d \cdot \delta t_{MIN}) \qquad (13)$$

The minimum measurable rotation rate for a given minimum resolvable timing interval is going by Equation 14. The minimum resolvable timing internal is limited by the digital electronics of the system.

$$\Omega_{MIN} = \tan(\omega_d \cdot \delta t_{MIN}) \cdot \frac{k_{xy} x_0}{2 m_s x_0 \omega_d} \qquad (14)$$

Figure 25:
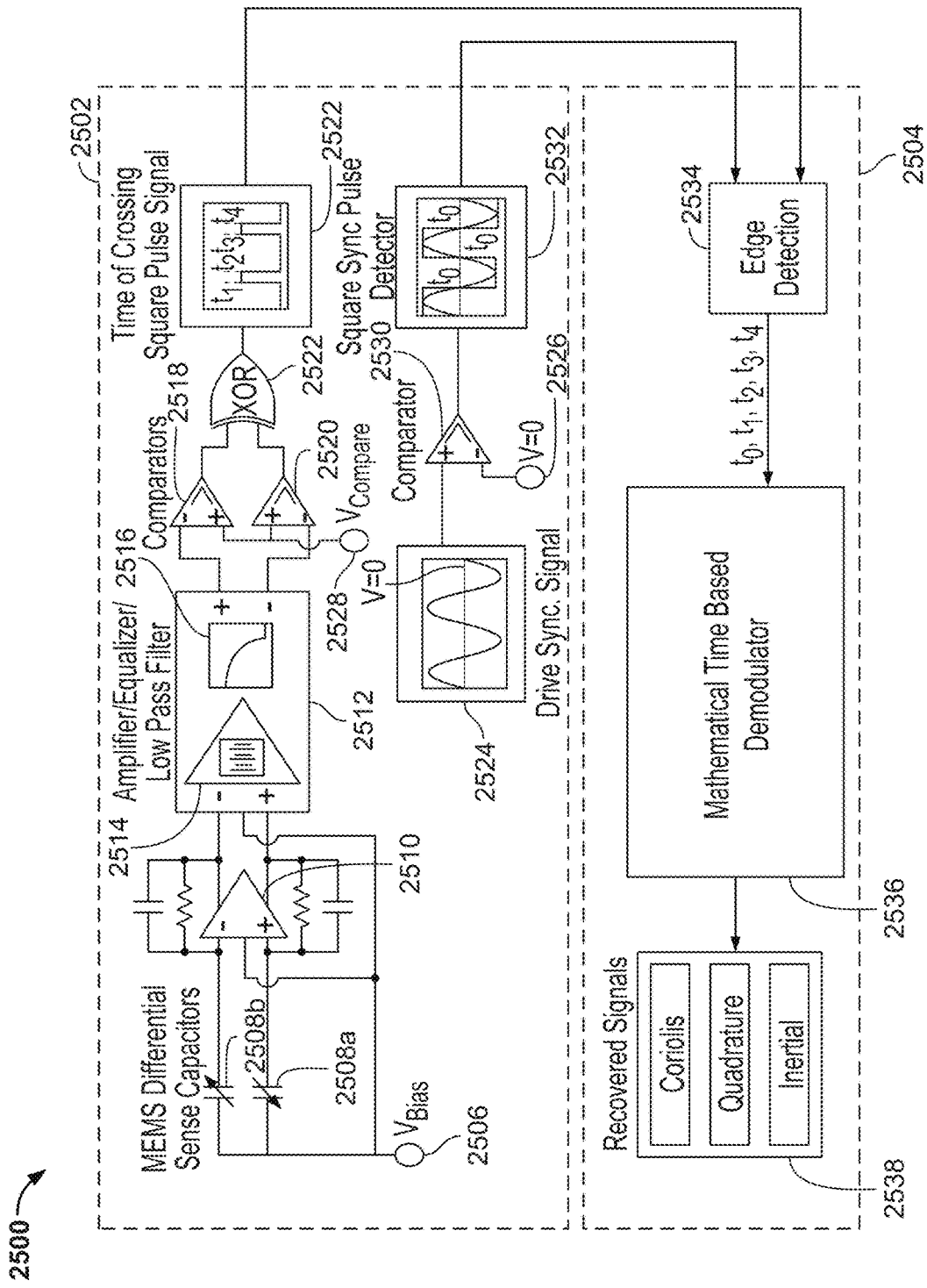
FIG. 25 depicts a system for determining Coriolis, quadrature and inertial components of signals from an inertial sensor, according to an illustrative implementation.

FIG. 25 depicts a system 2500 for determining Coriolis, quadrature and inertial components of signals from an inertial sensor. The system 2500 includes an analog subsystem 2502 and a signal processing system 2504. The analog subsystem 2502 includes a bias voltage source 2506 which applies a bias voltage across differential sense capacitors 2508a and 2508b (collectively, sense capacitors 2508). Sense capacitors 2508 can be the sense capacitors comprising the sense masses 122 and the sense electrodes 124. Thus, capacitance of the sense capacitors 2508 changes due to rotation of the device and displacement of the sense masses 122 due to the Coriolis effect. The capacitive current from the sense capacitors 2508 is measured by a differential amplifier 2510. The differential amplifier can be a transimpedance amplifier or a charge amplifier. The output of the differential amplifier 2510 is provided to a filtering subsystem 2512. The filtering subsystem 2512 includes an amplifier 2514 and a low pass filter 2516. The outputs of the filter subsystem of 2512 are provided to comparators 2518 and 2520, each of which compares its respective input signal to a voltage level provided by a voltage source 2528. The outputs of the comparators 2518 and 2520 are provided to an exclusive-or module 2522 which produces a square-wave signal corresponding to times at which the sense capacitor signals crossed the comparison threshold of the capacitors 2518 and 2520. The analog module 2502 also operates on a drive sync signal 2524 corresponding to a voltage applied to the drive structures. The drive sync signal 2524 is provided to a comparator 2530 which compares the drive sync signal 2524 to a zero voltage level provided by a zero level voltage source 2526. The comparator 2530 produces a square-wave signal corresponding to times at which the drive sync signal 2524 crosses zero. The square-wave signals 2522 and 2532 are provided to the signal processing system 2504.

The signal processing system 2504 includes an edge detection module 2534, which produces a series of times corresponding to time intervals between rising edges of the square-wave signal 2532 and each subsequent edge of the square-wave signal 2522 until the next rising edge of the square-wave 2532. Thus, offset times of each crossing of the comparison voltage level from the voltage source 2528 can be determined. In some examples, the edge detection module 2534 measures timing intervals from falling edges of the square-wave signal 2532. A mathematical time-based demodulator 2536 accepts the time provided by the edge detection module 2534 and determines amplitude and frequency of the signal and Coriolis, quadrature, and inertial components of the sense signal. The Coriolis, quadrature and inertial components are output as recovered signals 2538.

In some examples, the system 2500 implements the functions of the demodulation subsystem 104. In these examples, the drive sync signal 2524 is provided by the MEMS subsystem 102.

Figure 26:
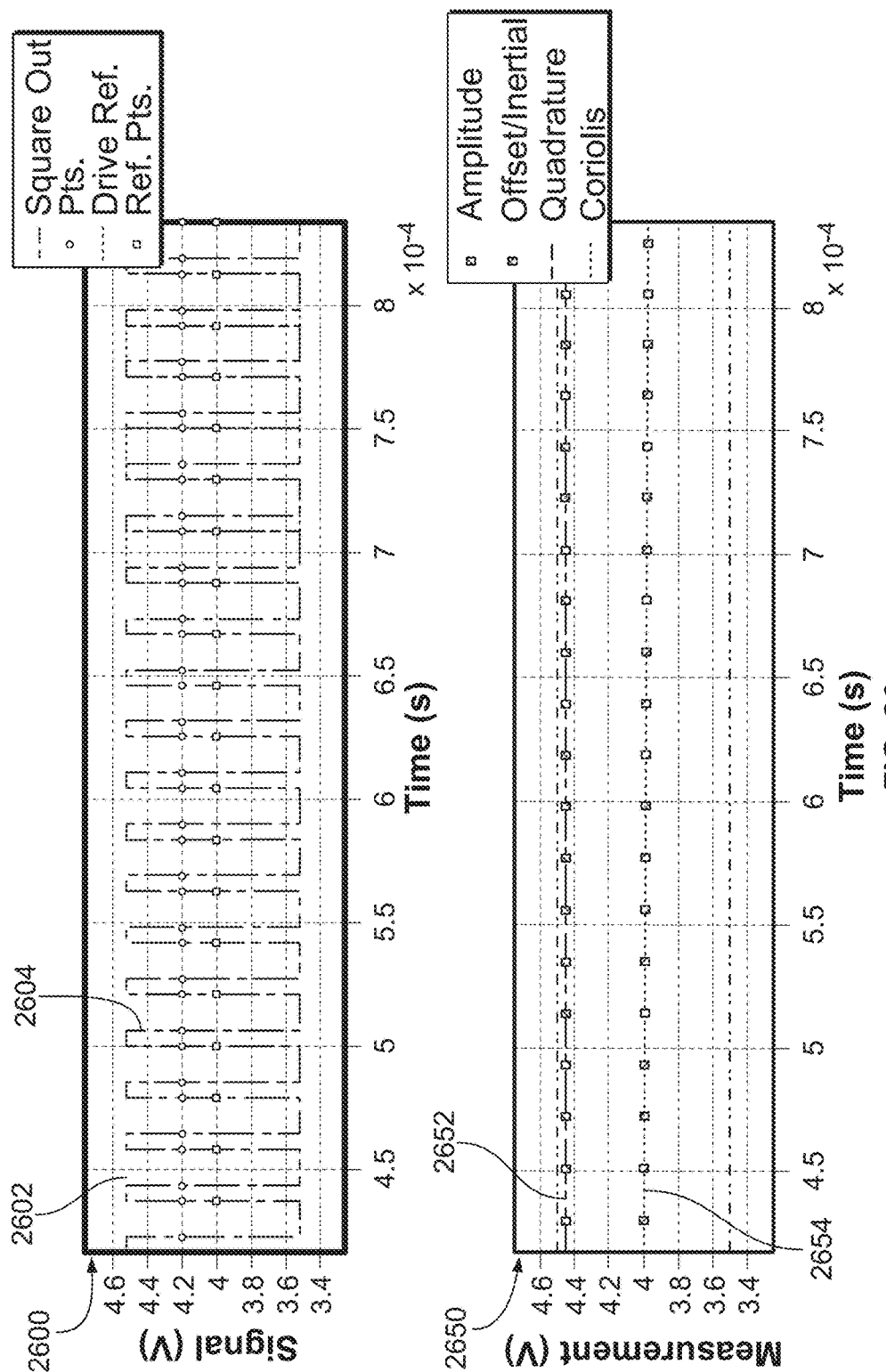
FIG. 26 depicts two graphs showing the extraction of Coriolis and quadrature components from square-wave signals, according to an illustrative implementation.

FIG. 26 depicts two graphs 2600 and 2650 showing the extraction of Coriolis and quadrature components from the square-wave signals 2522 and 2534. The graph 2600 includes a drive reference curve 2602 and a sense signal square-wave curve 2604. The drive reference curve 2602 corresponds to the square-wave signal 2532, and the sense signal square-wave 2604 to the square-wave signal 2522. The graph 2600 also depicts times at which the curves 2602 and 2604 cross reference levels of 4V and 4.2V, respectively.

The graph 2650 depicts the demodulation of quadrature and Coriolis components from the square-wave curves, 2602 and 2604. The graph 2650 includes a quadrature curve 2652 and a Coriolis curve 2654. The curves 2652 and 2654 are extracted from the curves 2602 and 2604 using the cosine method described herein and used to determine the amplitude A and offset $\delta t_c$ of Equations 6 and 7.

Figure 27:
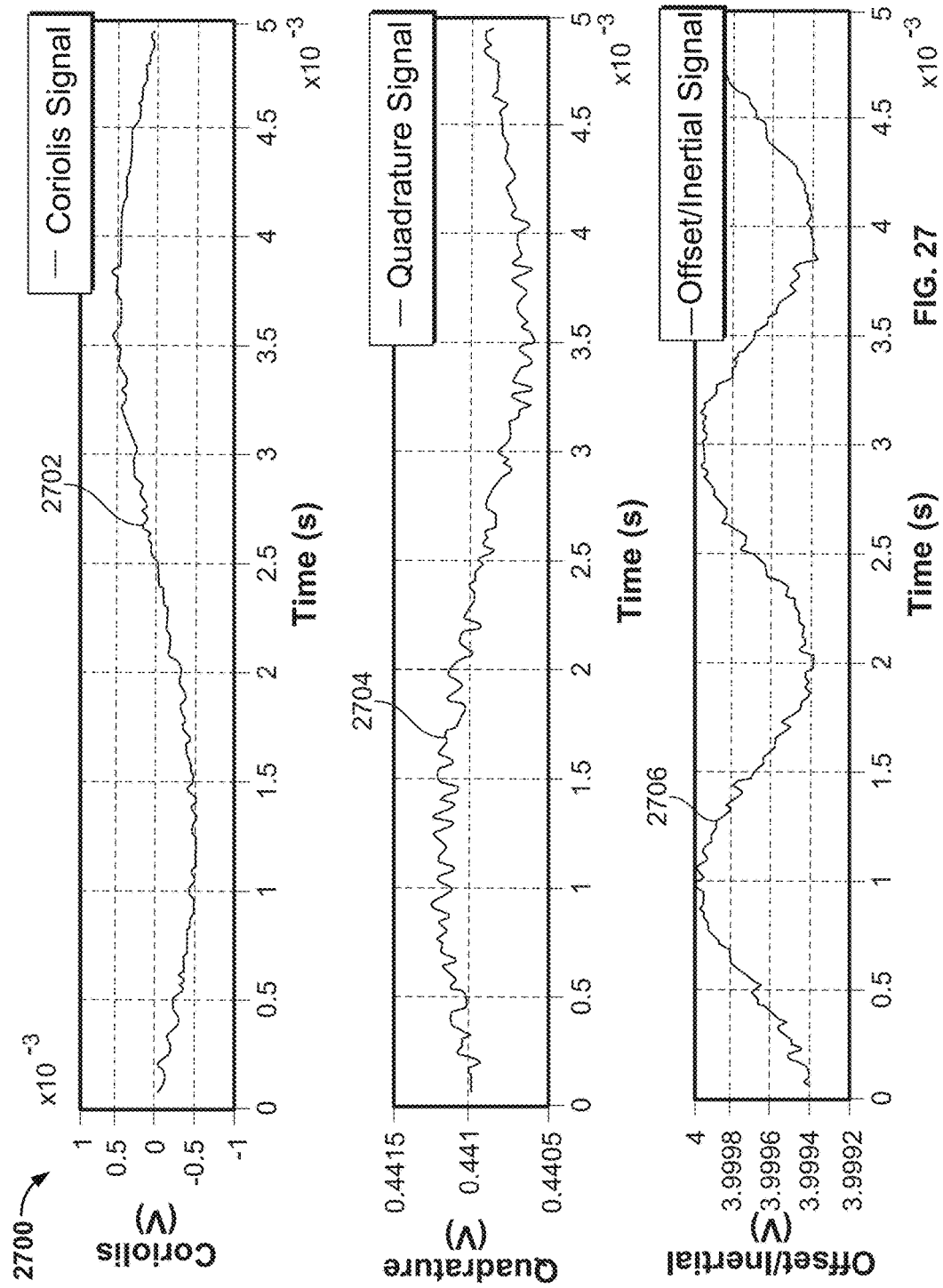
FIG. 27 depicts a graph showing calculated Coriolis, quadrature, and offset signals determined from the analog signals that are depicted in FIG. 26, according to an illustrative implementation.

FIG. 27 depicts a graph 2700 showing calculated Coriolis, quadrature, and offset signals determined from the analog signals that are depicted in FIG. 26. The graph 2700 includes a Coriolis curve 2702, a quadrature curve 2704, and offset curve 2706. The peak noise is about 1 part in 10 of the 1°/s signal depicted in the graph 2700.

Figure 28:
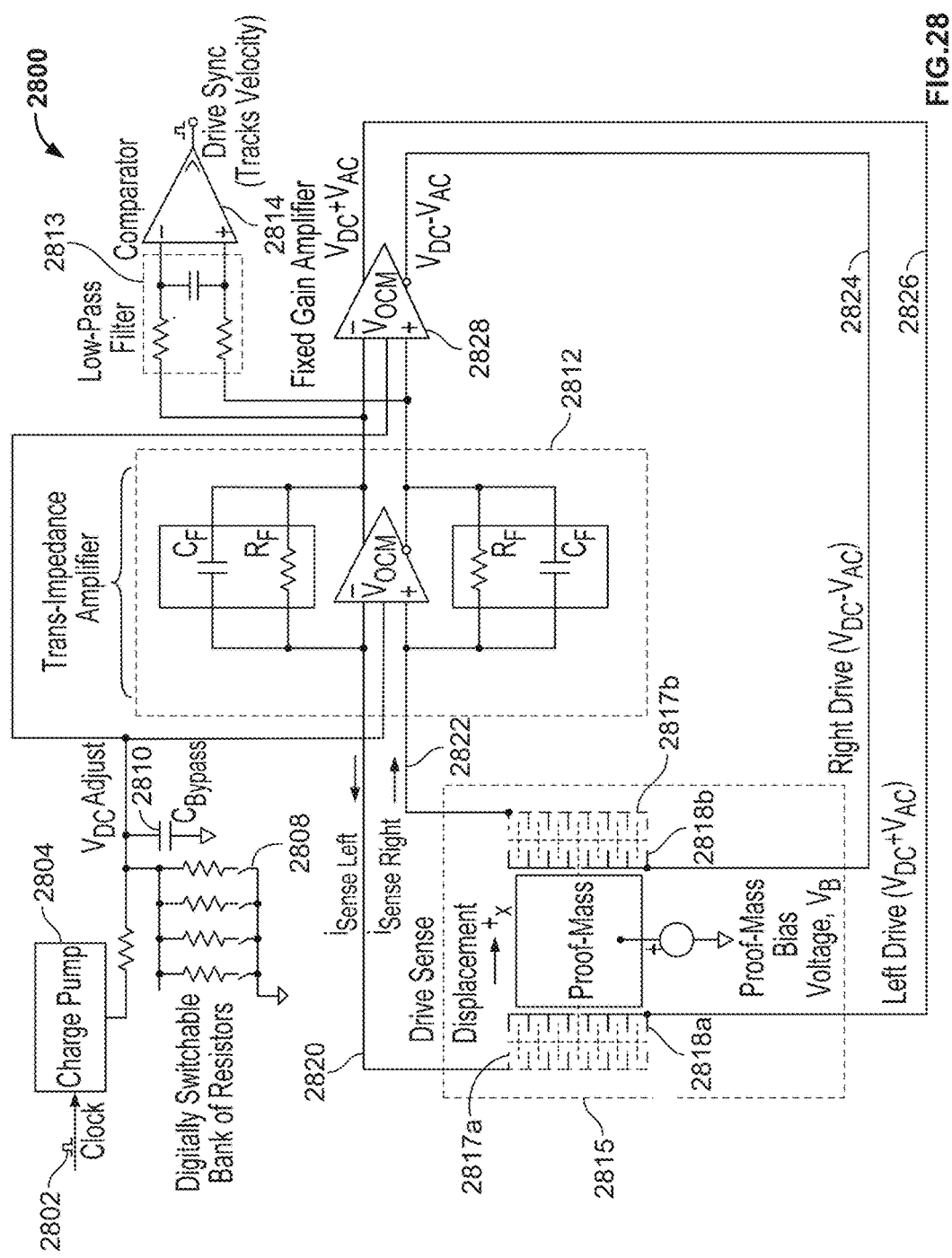
FIG. 28 depicts a system for controlling drive velocity based on real-time drive velocity measurements, according to an illustrative implementation.

FIG. 28 depicts a system 2800 for controlling drive velocity based on real-time drive velocity measurements. The system 2800 includes an oscillating structure 2815 which is driven into oscillation by drive structures 2818a and 1818b (collectively, drive structures 2818). Motion of the structure 2815 is measured by sense structures 2817a and 2817b (collectively, sense structures 2817). Both the drive structures 2818 and the sense structures 2817 can be periodic interdigitated capacitors. The system 2800 includes a clock signal 2802 provided to a charge pump 2804. The output of the charge pump 2804 is connected to ground via a digitally switchable bank of resistors 2808 and a bypass capacitor 2810 and is connected to the output common mode voltage terminal of the transimpedance amplifier system 2812. The outputs of the sense structures 2817a and 2817b are connected to the differential terminals of the amplifier of the transimpedance amplifier system 2812. The transimpedance amplifier system 2812 converts the current signals 2820 and 2922 into voltages 2824 and 2826. The voltages 2824 and 2826 are provided to low pass filter 2813 and comparator 2814 for producing a square-wave signal corresponding to a drive sync signal. The output of the comparator 2814 is used by the systems and methods described herein to determine an offset of a sense signal with respect to the drive signal. The system 2800 includes feedback of the signals 2824 and 2826 into the drive structures 2818. In this way, closed-loop control of the drive velocity can be maintained.

Figure 29:
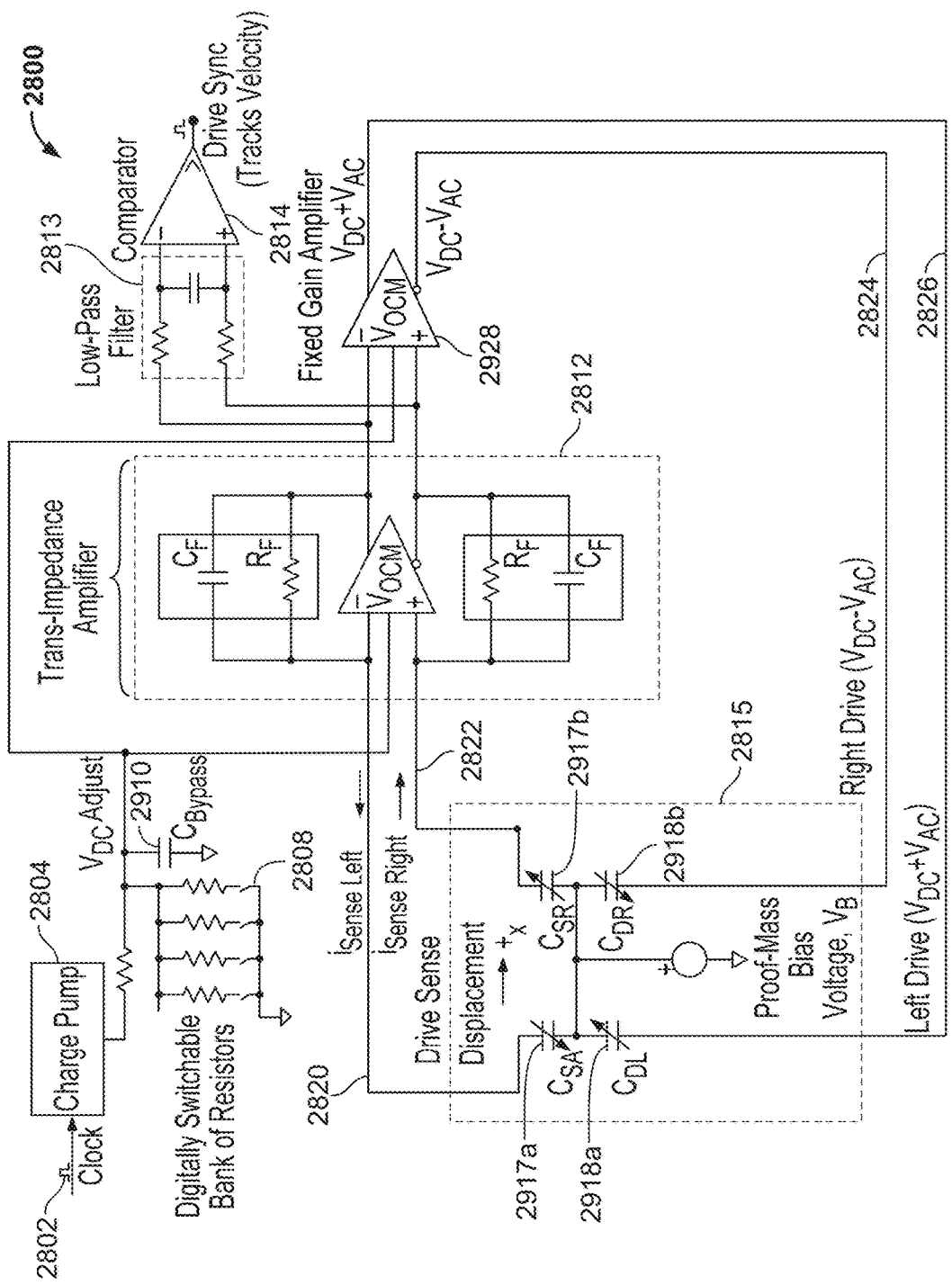
FIG. 29 depicts a system with drive structures and sense structures depicted as variable capacitors, according to an illustrative implementation.

FIG. 29 depicts the system 2800 with the drive structures 2818 and the sense structures 2817 depicted as variable capacitors. FIG. 29 depicts variable sense capacitors 2917a and 2917b (collectively, sense capacitors 2917). The sense capacitors 2917 correspond to the sense structures 2817. FIG. 29 depicts variable drive capacitors 2918a and 2918b (collectively, drive capacitors 2918), which correspond to the drive structures 2818.

Equations 15 and 16 describe the time-domain capacitive currents of the current signals 2820 and 2822.

$$i_{SL} = \dot{x} \nabla C_{SL}(V_{DC} - V_B) = -\dot{x}\frac{C_0}{g_0}(V_{DC} - V_B) \quad (15)$$

$$i_{SR} = \dot{x} \nabla C_{SR}(V_{DC} - V_B) = +\dot{x}\frac{C_0}{g_0}(V_{DC} - V_B) \quad (16)$$

Equations 17, 18, and 19 describe the frequency-domain outputs of the amplifier system 2812.

$$V_+(\omega) = V_{DC} + I_{SL}(\omega)Z_F(\omega) \quad (17)$$
$$= V_{DC} - j\omega\Delta x(\omega)\frac{C_o}{g_o}(V_{DC} - V_{Proof})Z_F(\omega)$$
$$\equiv V_{DC} - V_{AC}$$

$$V_-(\omega) = V_{DC} + I_{SR}(\omega)Z_F(\omega) \quad (18)$$
$$= V_{DC} + j\omega\Delta x(\omega)\frac{C_o}{g_o}(V_{DC} - V_{Proof})Z_F(\omega)$$
$$\equiv V_{DC} + V_{AC}$$

$$V_{AC} = j\omega\Delta x(\omega)\frac{C_o}{g_o}(V_{DC} - V_{Proof})Z_F(\omega) \quad (19)$$

Equation 20 describes the feedback impedance of the amplifier system 2812.

$$Z_F(\omega) = \frac{R_F}{1 + j\omega R_F C_F} \quad (20)$$

Equation 21 applies to Equation 20 for situations in which the amplifier system 2812 incorporates a charge amplifier, which imparts a −90° current-to-voltage phase shift.

$$(R_F C_F)^{-1} \ll \omega_0 \quad (21)$$

Equation 22 applies to Equation 20 for situations in which the amplifier system 2812 includes a transimpedance amplifier, which imparts a 0° current-to-voltage phase shift.

$$(R_F C_F)^{-1} \gg \omega_0 \quad (22)$$

The differential voltage that actuates the drive capacitors 2918 is given by Equation 23.

$$V_{Diff} = V_{Left} - V_{Right} = 2V_{AC} \quad (23)$$

The capacitance and gradient in capacitance of the drive capacitors 2918 are given by Equations 24, 25, 26, and 27.

$$C_{DL} = \frac{N\varepsilon t(g_o + x)}{h} + C_{fringeDL} \quad (24)$$

$$C_{DR} = \frac{N\varepsilon t(g_o - x)}{h} + C_{fringeDR} \quad (25)$$

$$\nabla C_{DL} = \frac{dC_{DL}}{dx} = +\frac{N\varepsilon t}{h} = +\frac{C_o}{g_o} \equiv C_D \quad (26)$$

$$\nabla C_{DR} = \frac{dC_{DR}}{dx} = -\frac{N\varepsilon t}{h} = -\frac{C_o}{g_o} \quad (27)$$

The capacitances and capacitance gradients of the sense capacitors 2917 are given by Equations 28, 29, 30, and 31.

$$C_{SL} = \frac{N\varepsilon t(g_o - x)}{h} + C_{fringeSL} \quad (28)$$

$$C_{SR} = \frac{N\varepsilon t(g_o + x)}{h} + C_{fringeSR} \quad (29)$$

$$\nabla C_{SL} = \frac{dC_{SL}}{dx} = -\frac{N\varepsilon t}{h} = -\frac{C_o}{g_o} \equiv -\nabla C_S \quad (30)$$

$$\nabla C_{SR} = \frac{dC_{SR}}{dx} = +\frac{N\varepsilon t}{h} = +\frac{C_o}{g_o} \quad (31)$$

The force applied to the drive frame is given by Equation 32.

$$\text{Force} = 2\nabla C_D(V_{DC} - V_B)V_{AC} = 2\frac{C_0}{g_o}(V_{DC} - V_B)V_{AC} \quad (32)$$

The mechanical transfer function of force to displacement is given by Equation 33, and at resonance equation 34. The transfer of acceleration to displacement imparts a −90° phase shift.

$$H(s) = \mathcal{L}\left\{\frac{x}{\ddot{x}}\right\} = \frac{1}{s^2 + s\frac{\omega_0}{Q} + \omega_0^2} \quad (33)$$

$$H(j\omega_0) = \frac{-jQ}{\omega_0^2} \quad (34)$$

The system 2800 generally experiences a stable sustained oscillation when the Barkhausen stability criteria are satisfied. The Barkhausen stability criteria are satisfied when the magnitude of the loop gain is equal to unity as shown in Equation 35 and the phase shift around the loop is zero or an integer multiple of $2\pi$ as shown in Equation 36.

$$|T(j\omega)|=1 \quad (35)$$

$$\angle T(j\omega)=2\pi n, n \in 0,1,2 \quad (36)$$

The electronics of the system 2800 can induce a phase shift that moves the oscillation frequency slightly away from the desired mechanical resonance. A transimpedance amplifier leads to a negative frequency shift as given by Equations 37 and 38.

$$\Delta\theta_S = -\tan^{-1}(\omega R_F C_F) \quad (37)$$

$$\omega_* = \text{positive root}\left\{\omega^2 + \omega\frac{\omega_o}{Q\tan(\Delta\theta_S - \frac{\pi}{2})} - \omega_o^2\right\} \quad (38)$$

A charge amplifier leads to a positive frequency shift as given by Equations 39 and 40.

$$\Delta\theta_S = \frac{\pi}{2} - \tan^{-1}(\omega R_F C_F) \quad (39)$$

$$\Delta\theta_s = \frac{\pi}{2} - \tan^{-1}(\omega R_F C_F)$$

$$\omega_* = \text{positive root}\left\{\omega^2 + \omega\frac{\omega_o}{Q\tan(\Delta\theta_S - \frac{\pi}{2})} - \omega_o^2\right\} \quad (40)$$

The gain loss is a measure of the degradation of the mechanical displacement resulting from a phase-shifted isolation frequency $\omega^*$ as shown in Equation 41 and 42.

$$\text{Gain Loss} = 20\text{Log}_{10}\left(\frac{|H(j\omega_*)|}{|H(j\omega_o)|}\right) \quad (41)$$

$$H(s) = \mathcal{L}\left\{\frac{x}{\ddot{x}}\right\} = \frac{1}{s^2 + s\frac{\omega_0}{Q} + \omega_0^2} \quad (42)$$

Figure 30:
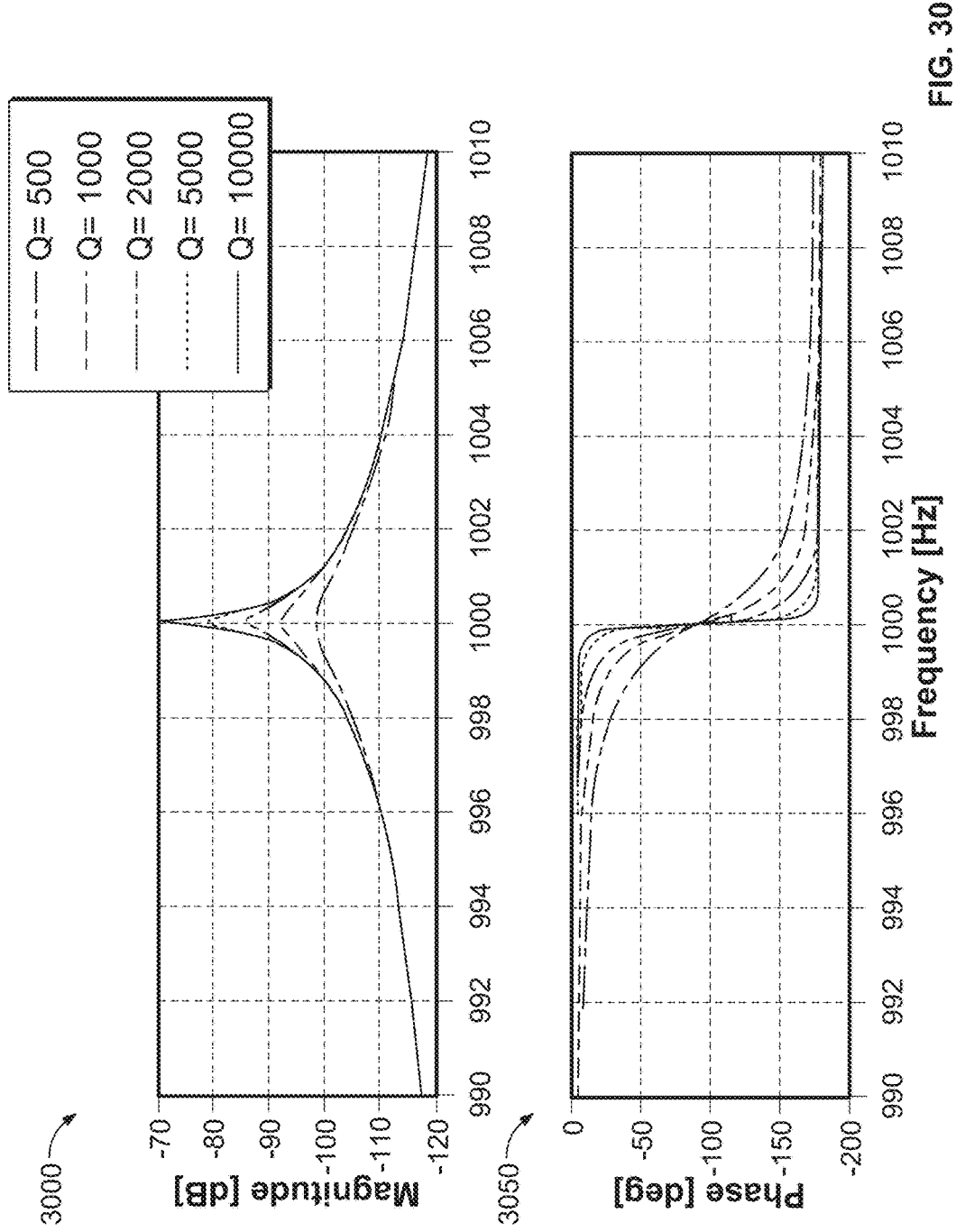
FIG. 30 depicts a Bode plot with a magnitude graph and a phase graph, according to an illustrative implementation.

FIG. 30 depicts a Bode plot with a magnitude graph 3000 and a phase graph 3050. The magnitude graph 3000 depicts the magnitude of the transfer function 42 at various quality factors Q. The phase graph 3050 depicts the phase of the transfer function 42 as a function of frequency for various quality factors Q.

Figure 31:
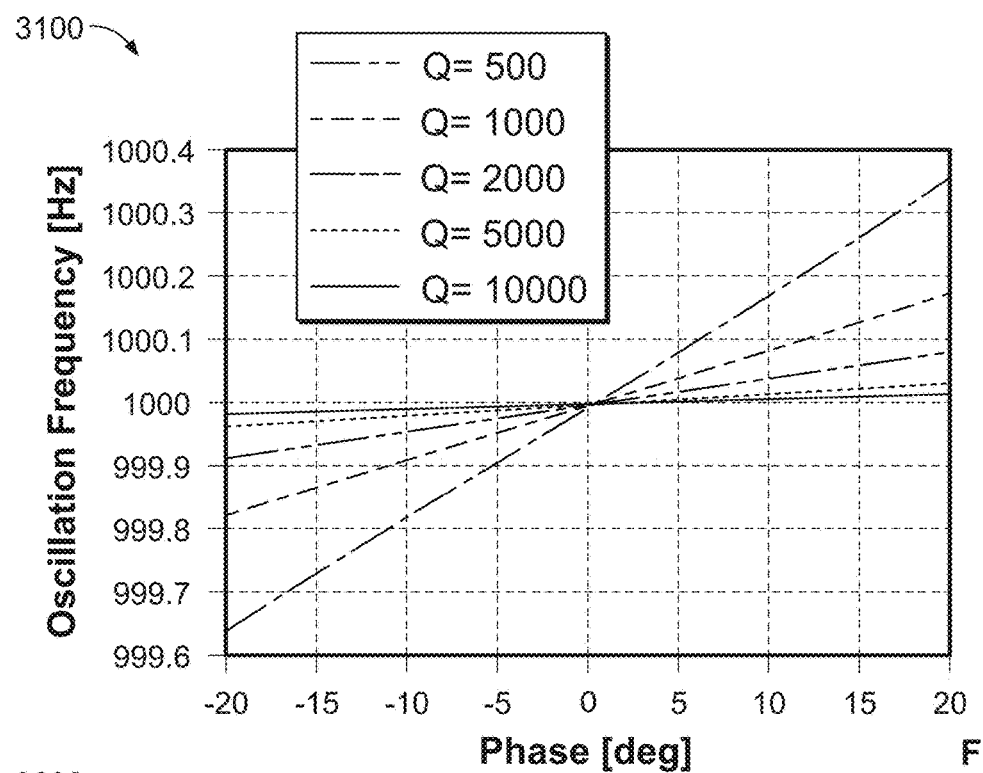
FIG. 31 depicts a graph showing change in oscillation frequency as a function of phase shift for various quality factors, according to an illustrative implementation.

FIG. 31 depicts a graph 3100 showing the change in oscillation frequency as a function of phase shift for various quality factors Q. As the quality factor decreases, the oscillation frequency exhibits a greater dependence on the phase shift.

Figure 32:
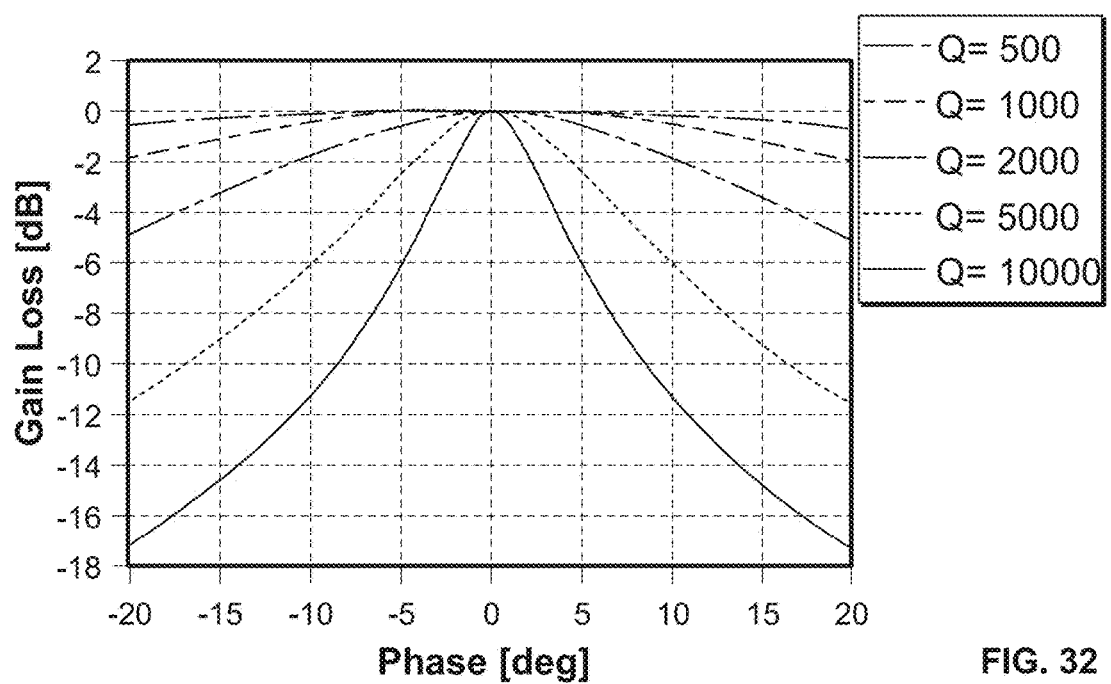
FIG. 32 depicts a graph showing gain loss as a function of phase shift, according to an illustrative implementation.

FIG. 32 depicts a graph 3200 showing the gain loss as a function of phase shift. As the quality factor Q increases, the gain loss becomes more dependent on phase shift.

Figure 33:
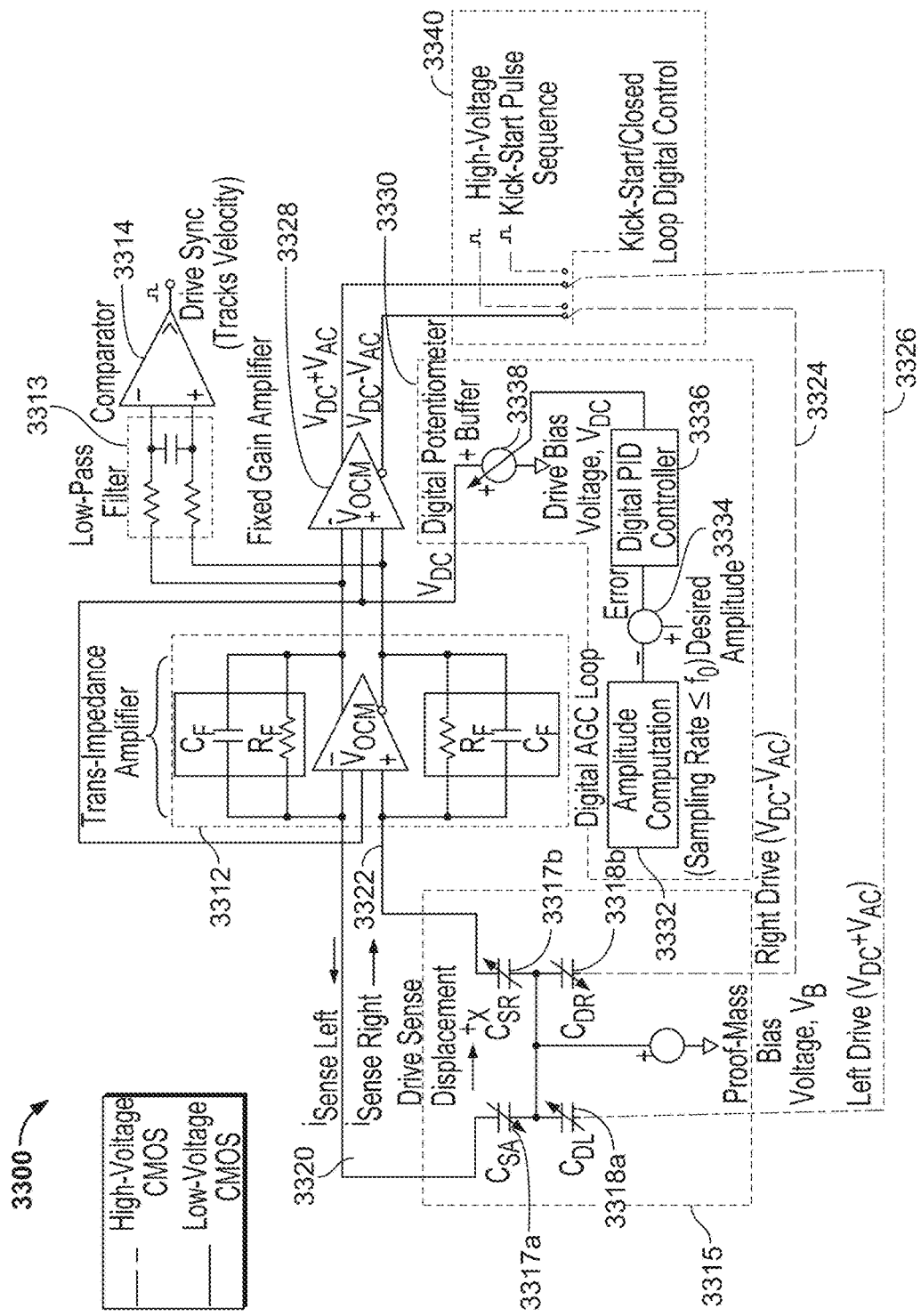
FIG. 33 depicts a system using digital control to control drive velocity, according to an illustrative implementation.

FIG. 33 depicts a system 3300 using digital control to control drive velocity. The system 3300 includes an oscillating structure 3315. The oscillating structure 3315 can be the drive frame 120. The oscillating structure 3315 includes drive capacitors 3318a and 3318b (collectively, drive capacitors 3318) that cause the oscillating structure to oscillate. The oscillating structure 3315 also includes sense capacitors 3317a and 3317b (collectively, sense capacitors 3317). The sense capacitors 3317 produce current signals 3320 and 3322 which are provided to a transimpedance amplifier system 3312. The transimpedance amplifier system produces differential output signals that are provided to a fixed gain amplifier 3328 and a low pass filter 3313. The output of the low pass filter 3313 is provided to a comparator 3814 which produces a square-wave drive sync signal.

The outputs of the fixed gain amplifier 3328 are provided to a kick-start subsystem 3340. The kick-start subsystem 3340 includes a set of switches and a high voltage kick-start volts sequence used to initiate oscillations of the oscillating structure 3315. When the oscillating structure 3315 is oscillating in steady state, the kick-start subsystem 3340 simply passes the outputs of the fixed gain amplifier 3328 on as the drive signals 3324 and 3326. The drive signals 3324 and 3326 are provided to the drive capacitors 3318 and cause the drive capacitors 3318 to drive the oscillating structure 3315 into oscillation.

The system 3300 includes a digital automatic gain control loop 3330. The digital automatic gain control loop 3330 includes an amplitude computation module 3332. The amplitude computation module 3332 uses time intervals from nonlinear periodic capacitors such as the sense structures 116 to determine amplitude of the oscillations of the oscillating structure 3315. The amplitude computation module 3332 produces an amplitude output which is subtracted from a desired amplitude at block 3334 to produce an error signal which is provided to a digital controller 3336. The digital controller 3336 can use proportional-integral-derivative (PID) control to adjust a bias voltage 3338 that is provided to the common mode offset terminals of the amplifier 3328 and the amplifier in the amplifier system 3312. By using digital control to adjust the output common mode voltage level of the amplifiers, the system 3300 maintains a desired drive amplitude. The system 3300 could also maintain a desired drive frequency. By controlling drive amplitude and/or frequency the velocity of the oscillating structure 3315 is controlled.

Figure 34:
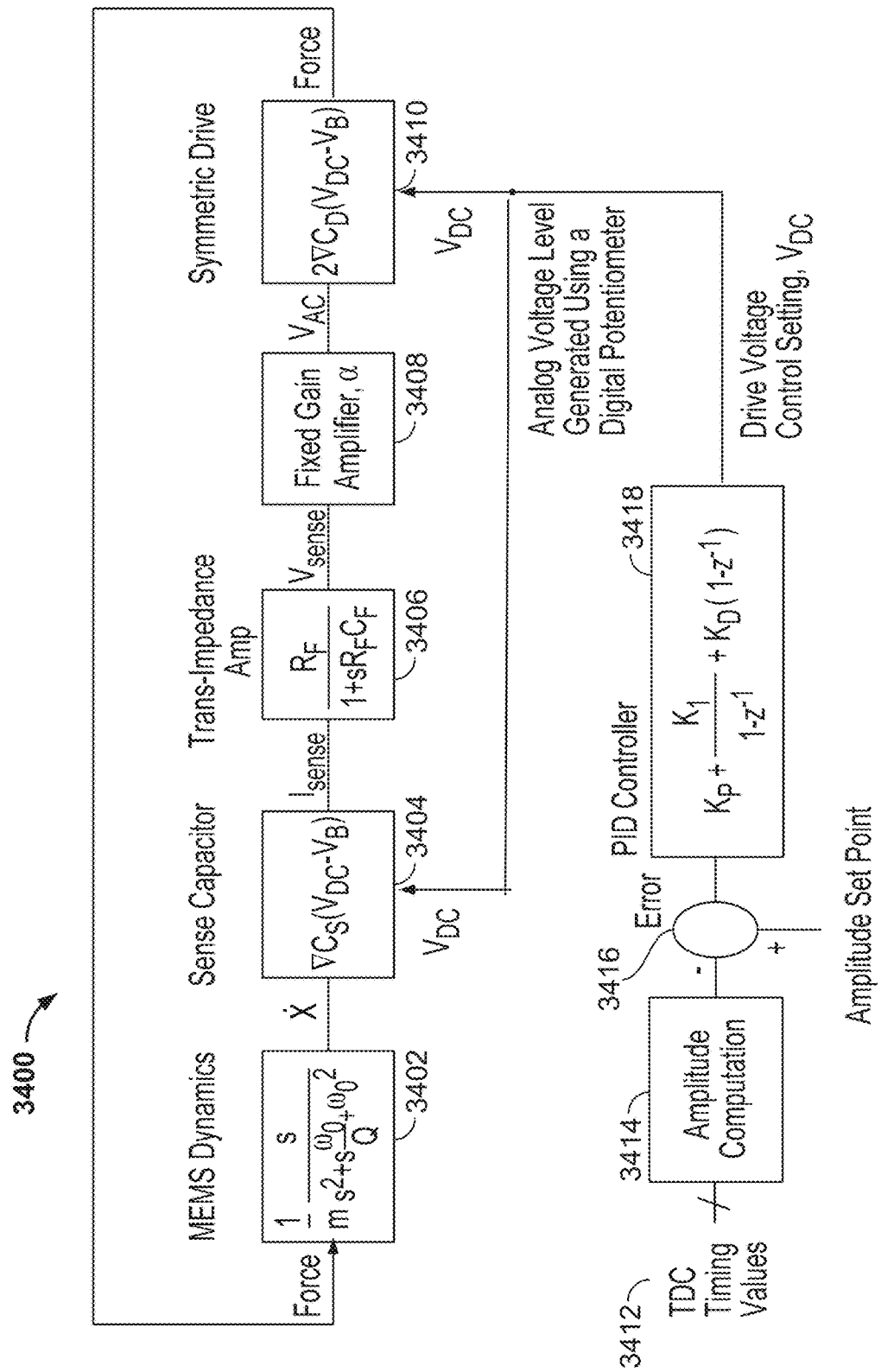
FIG. 34 depicts a block diagram representing the system depicted in FIG. 33, according to an illustrative implementation.

FIG. 34 depicts a block diagram 3400 representing the system 3300. The block diagram 3400 includes a MEMS dynamics block 3402 reflecting the transfer function of force into oscillator velocity. The oscillator velocity from the MEMS dynamics block 3402 is provided to a sense capacitor block 3404 which includes a transfer function for transferring oscillator velocity into sense current. The sense current produced by the sense capacitor block 3404 is provided to a transimpedance amplifier block 3406 which converts sense current into a sense voltage. The sense voltage is provided to a fixed gain amplifier block 3408 which converts the sense voltage into an AC voltage to power the drive capacitors. The AC voltage is provided to a symmetric drive block 3410 which represents the drive capacitors. The symmetric drive 3410 transforms the AC voltage into a force acting on the oscillator. The block diagram 3400 also includes TDC timing values 3412 provided to an amplitude computation block 3414. The amplitude computation block 3414 computes an amplitude which is provided to a summing block 3416. The summing block 3416 subtracts the computed amplitude from an amplitude set point and provides and output error to a PID controller block 3418. The PID controller block 3418 provides a drive voltage control setting to the sense capacitor block 3404 and the symmetric drive block 3410. The DC drive setting required to stabilize the drive loop and satisfy the Barkhausen stability criteria is given by Equation 43. By using digital control to provide an analog voltage control setting, the drive velocity can be controlled accurately.

$$V_{DC} = \sqrt{\frac{\text{mass}\omega_o}{2QR_F\nabla C_S \nabla C_D \alpha}} + V_B \quad (43)$$

Figure 35:
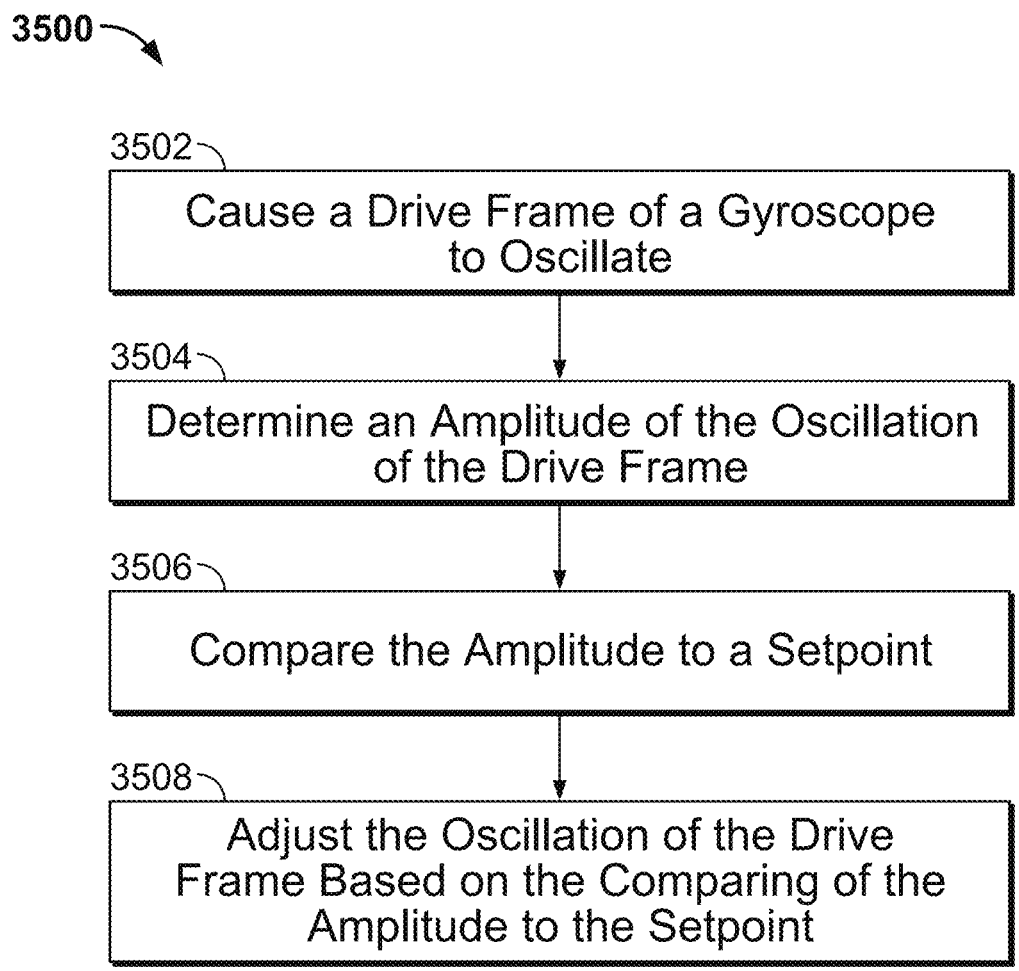
FIG. 35 depicts a flow chart of a method for adjusting oscillation of a drive frame of a gyroscope, according to an illustrative implementation.

FIG. 35 depicts a flow chart of a method 3500 for adjusting oscillation of a drive frame of a gyroscope. At 3502, the drive frame is caused to oscillate. At 3504, an amplitude of the oscillation of the drive frame is determined. At 3506, the amplitude is compared to a setpoint. At 3508, the oscillation of the drive frame is adjusted based on the comparing of the amplitude to the setpoint.

Figure 36:
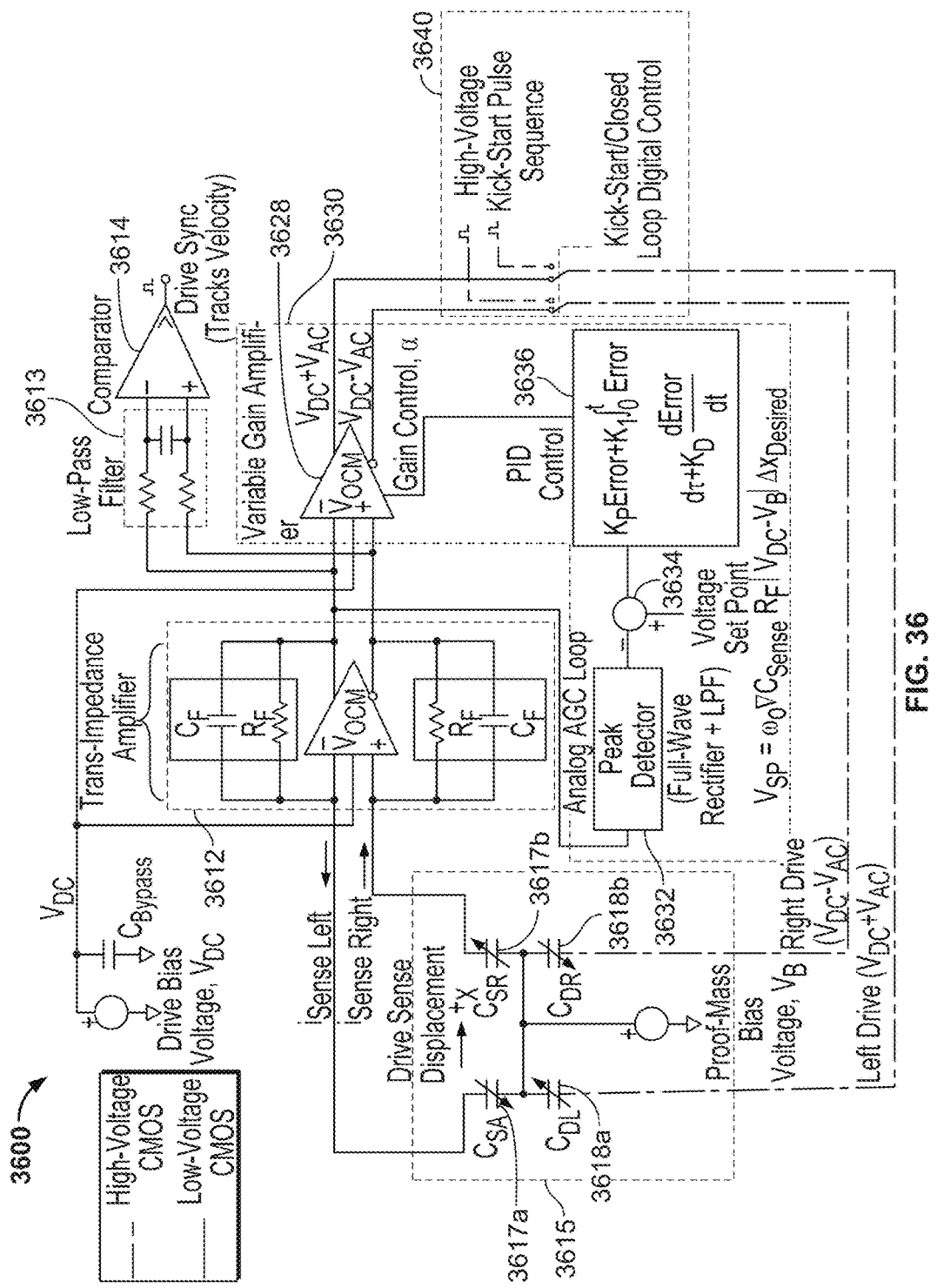
FIG. 36 depicts a system for controlling oscillator motion with an analog automatic gain control loop, according to an illustrative implementation.

FIG. 36 depicts a system 3600 for controlling oscillator motion with an analog automatic gain control loop. The system 3600 includes an oscillator structure 3616 that is driven into oscillation by drive capacitors 3617a and 3617b (collectively, drive capacitors 3617). The oscillating structure 3616 includes capacitors 3615a and 3615b (collectively, sense capacitors 3615) that experience a change in capacitance as the oscillating structure 3616 oscillates. The sense capacitors 3615 produce sense currents that are provided to an amplifier subsystem 3612. The amplifier subsystem 3612 can include a transimpedance amplifier. The amplifier subsystem 3612 outputs voltage signals that correspond to the sense currents. The voltage signals are provided to a low-pass filter 3613, which provides output to a comparator 3614. The comparator 3614 produces a square-wave drive sync signal used to determine drive velocity. The voltage signals from the amplifier subsystem 3612 are provided to an analog automatic gain control (AGC) loop 3630. The analog AGC loop 3630 includes a peak detector 3632, a summing element 3634, a PID controller 3636, and a variable gain amplifier 3628. The PID controller 3636 is implemented with analog circuitry. One or more voltage signals from the amplifier 3612 are provided to the peak detector 3632, and the variable gain amplifier 3628. The peak detector 3632 includes a full-wave rectifier and low-pass filter to detect peaks in the voltage signal. The summing element 3634 subtracts an output from the peak detector 3632 from a voltage set point given by Equation 44 to produce an error signal.

$$V_{SP} = \omega_o \nabla C_S R_F |V_{DC} -$$
$$V_B |\Delta x_{Desired} V_{SP} = \omega_0 \nabla C_{Sense} R_F |V_{DC} -$$
$$V_B |\Delta x_{Desired} \quad (44)$$

The PID controller 3636 produces a gain control signal from the error signal. The variable gain amplifier 3628 uses the gain control signal from the PID controller 3636, and the voltage signals from the amplifier subsystem 3612 to produce analog voltage signals used to drive the drive capacitors 3617. Thus, the analog AGC loop 3630 adjusts the voltage applied to the drive capacitors 3617 based on measured currents from the sense capacitors 3615. This closed-loop control enables real-time adjustment of the drive velocity.

The system 3600 also includes a kick-start subsystem 3640, which provides a high-voltage pulse sequence to initiate oscillation of the oscillating structure 3616.

Figure 37:
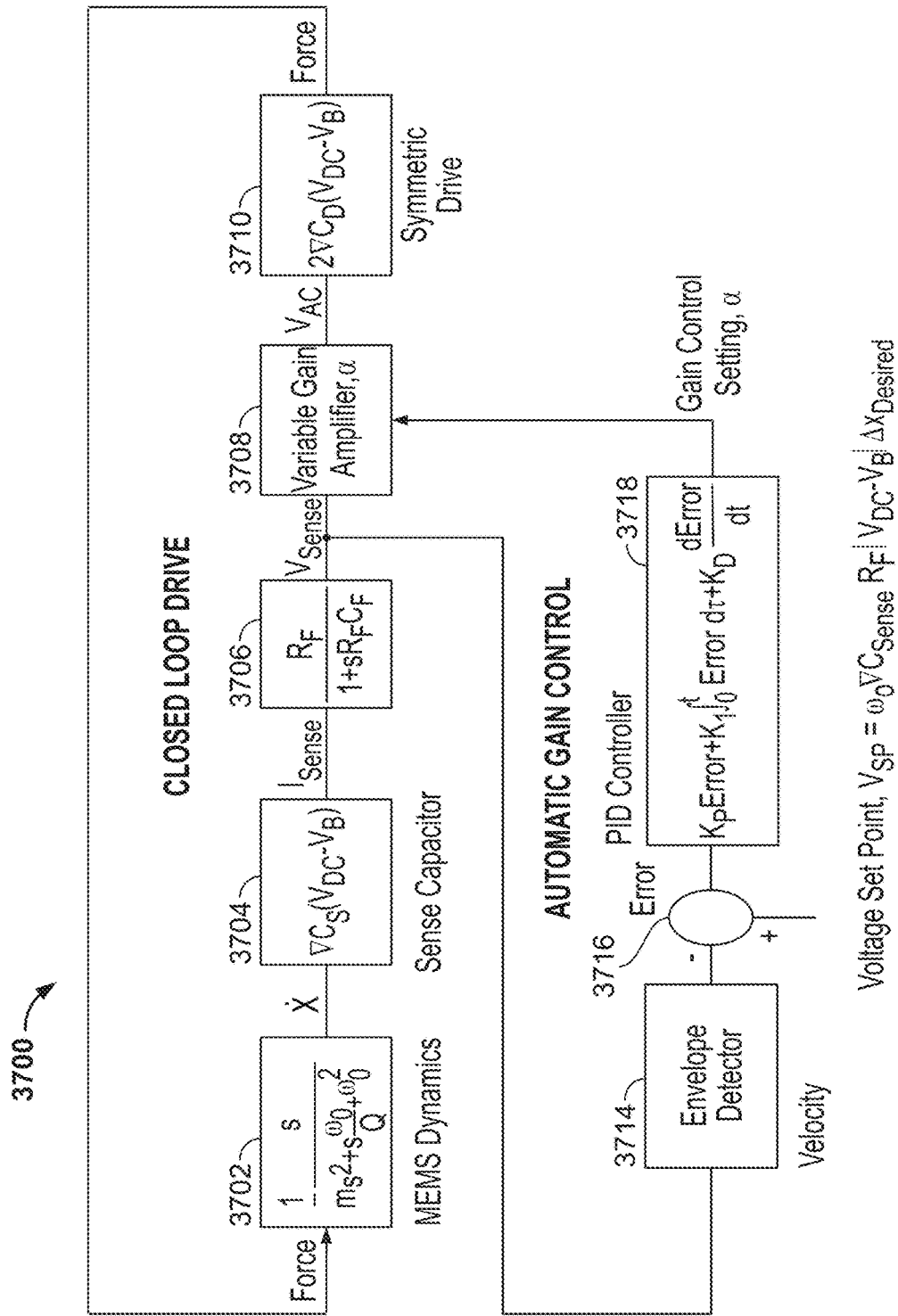
FIG. 37 depicts a block diagram representing the system depicted in FIG. 36, according to an illustrative implementation.

FIG. 37 depicts a block diagram 3700 representing the system 3600. The block diagram 3700 includes a MEMS dynamics block 3702, which transforms force into oscillator velocity. The oscillator velocity is transformed by a sense capacitor block 3704 into a sense current. The sense current is transformed by a transimpedance amplifier block 3706 into a sense voltage. The sense voltage is transformed by a variable gain amplifier block 3708 into an AC voltage. The AC voltage is transformed by a symmetric drive block 3710 into the force, which is fed back into the MEMS dynamics block 3702. The gain setting required to satisfy the Barkhausen stability criterion and stabilize the drive loop is given by Equation 45.

$$\alpha = \frac{\text{mass}\omega_o}{2QR_F \nabla C_S \nabla C_D (V_{DC} - V_B)^2} \quad (45)$$

The sense voltage is also provided to an envelope detector block 3714, which provides an input to a summing element 3716. The summing element 3716 compares the provided input to a voltage set point given by Equation 43 to produce an error signal. The error signal is provided to a PID controller block 3718, which transforms the error into a gain control setting that is provided to the variable gain amplifier block 3708. By performing analog closed-loop control on the sense voltage, the block diagram 3700 enables real-time monitoring and control of oscillator velocity.

Figure 38:
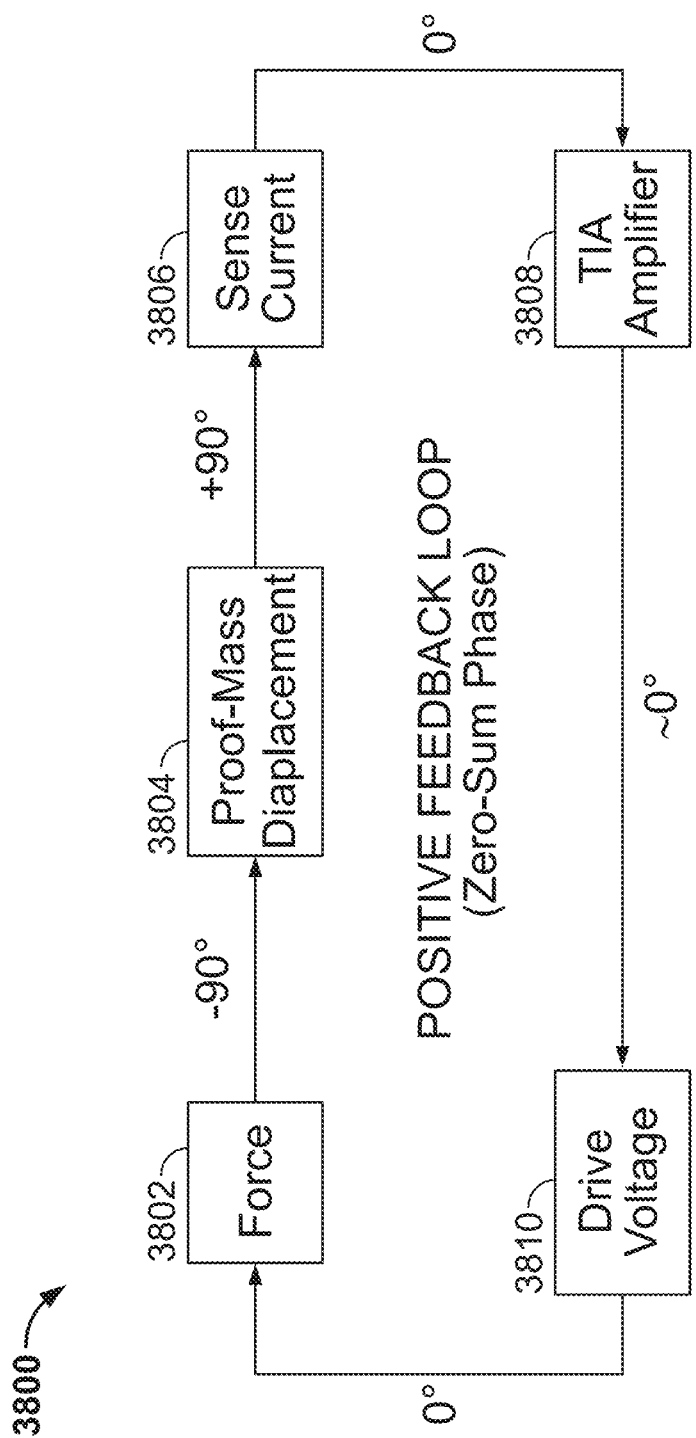
FIG. 38 schematically depicts a positive feedback loop that represents the closed-loop feedback of the system depicted in FIG. 36, according to an illustrative implementation.

FIG. 38 schematically depicts a positive feedback loop 3800 that represents the closed-loop feedback of the system 3600. The positive feedback loop 3800 includes a drive voltage block 3810 that provides a voltage to drive capacitors. The drive voltage produced by the drive voltage block 3810 results in a force 3802 that is in phase with the drive voltage 3810. The force 3802 produces a proof mass displacement 3804 that has a −90° phase offset from the force 3802. The proof mass displacement 3804 produced a sense current 3806 that has a +90° phase offset from the proof mass displacement 3804. Thus, the sense current 3806 is in phase with the drive voltage 3810 and the force 3802. A transimpedance amplifier 3808 produces a voltage based on the sense current 3806 that is approximately in phase with the sense current 3806. The voltage produced by the transimpedance amplifier 3808 is provided to the drive voltage block 3810, which adjusts the drive voltage accordingly. Thus, appropriate phase offsets are maintained throughout the positive feedback loop 3800.

Figure 39:
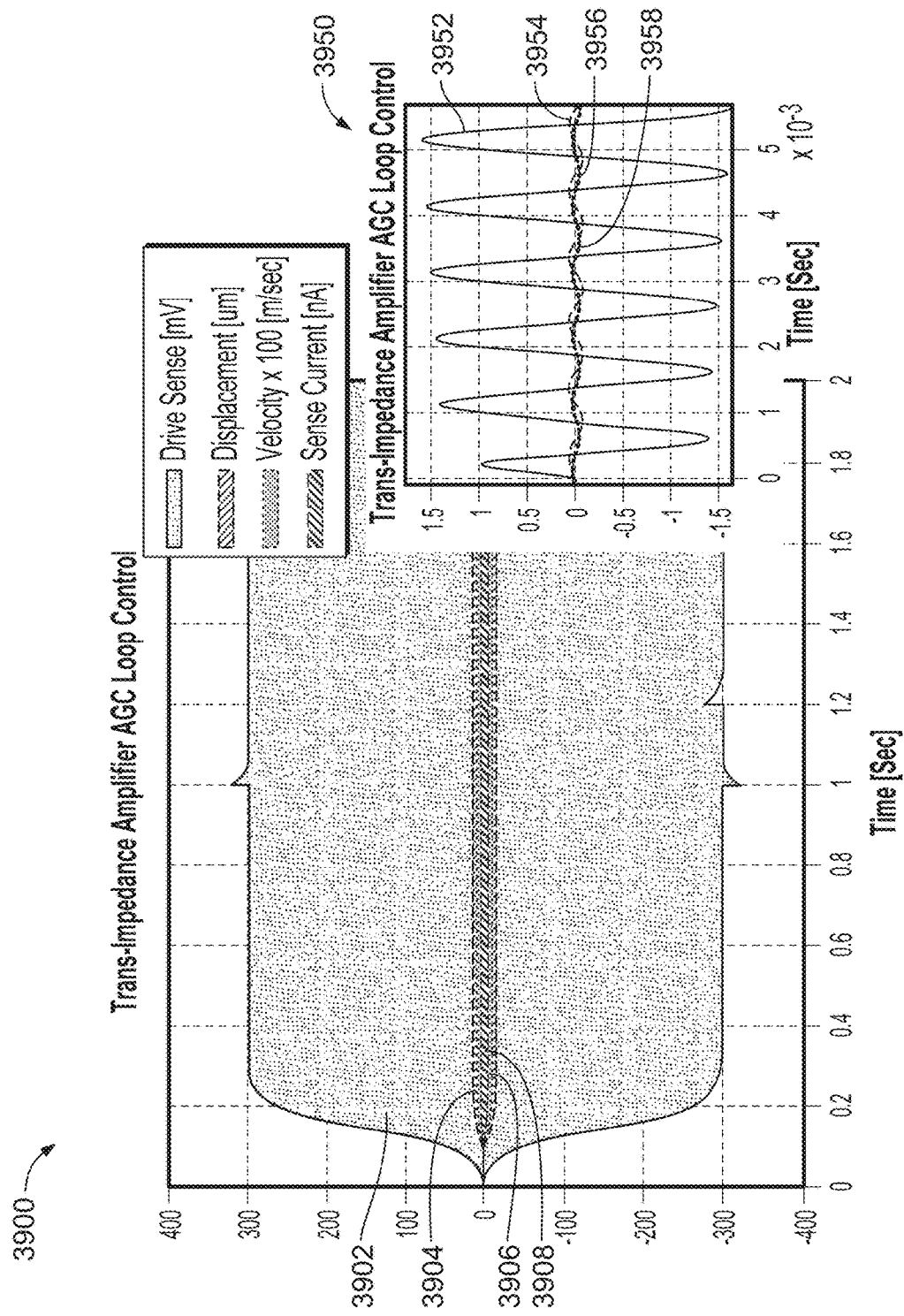
FIG. 39 depicts two graphs showing the performance of the system depicted in FIG. 36 with a transimpedance amplifier, according to an illustrative implementation.

FIG. 39 depicts two graphs 3900 and 3950 showing the performance of the system 3600 with a transimpedance amplifier. The graph 3900 includes a drive sense curve 3902, a displacement curve 3904, a velocity curve 3906, and a sense current curve 3908. The drive sense curve 3902 represents the output of the transimpedance amplifier and is proportional to the sense current from the sense capacitors 3615. The displacement curve 3904 reflects the calculated displacement of the oscillating structure 3616. The velocity curve 3906 reflects the calculated velocity of the oscillating structure 3616. The sense current curve 3908 represents the sense current produced by the sense capacitors 3615.

The graph 3950 is an enlarged view of a portion of the graph 3900. The graph 3950 includes a drive sense curve 3952, a displacement curve 3954, a velocity curve 3956, and a sense current curve 3958. The drive sense curve 3952 corresponds to a portion of the drive sense curve 3902. The displacement 3954 corresponds to a portion of the displacement curve 3904. The velocity curve 3956 corresponds to a portion of the velocity curve 3906. The sense current curve 3958 corresponds to a portion of the sense current curve 3908. The phase offsets of the loop 3800 are visible in the graph 3950. For example, the displacement curve 3954 is phase-shifted from the drive sense curve 3952.

Figure 40:
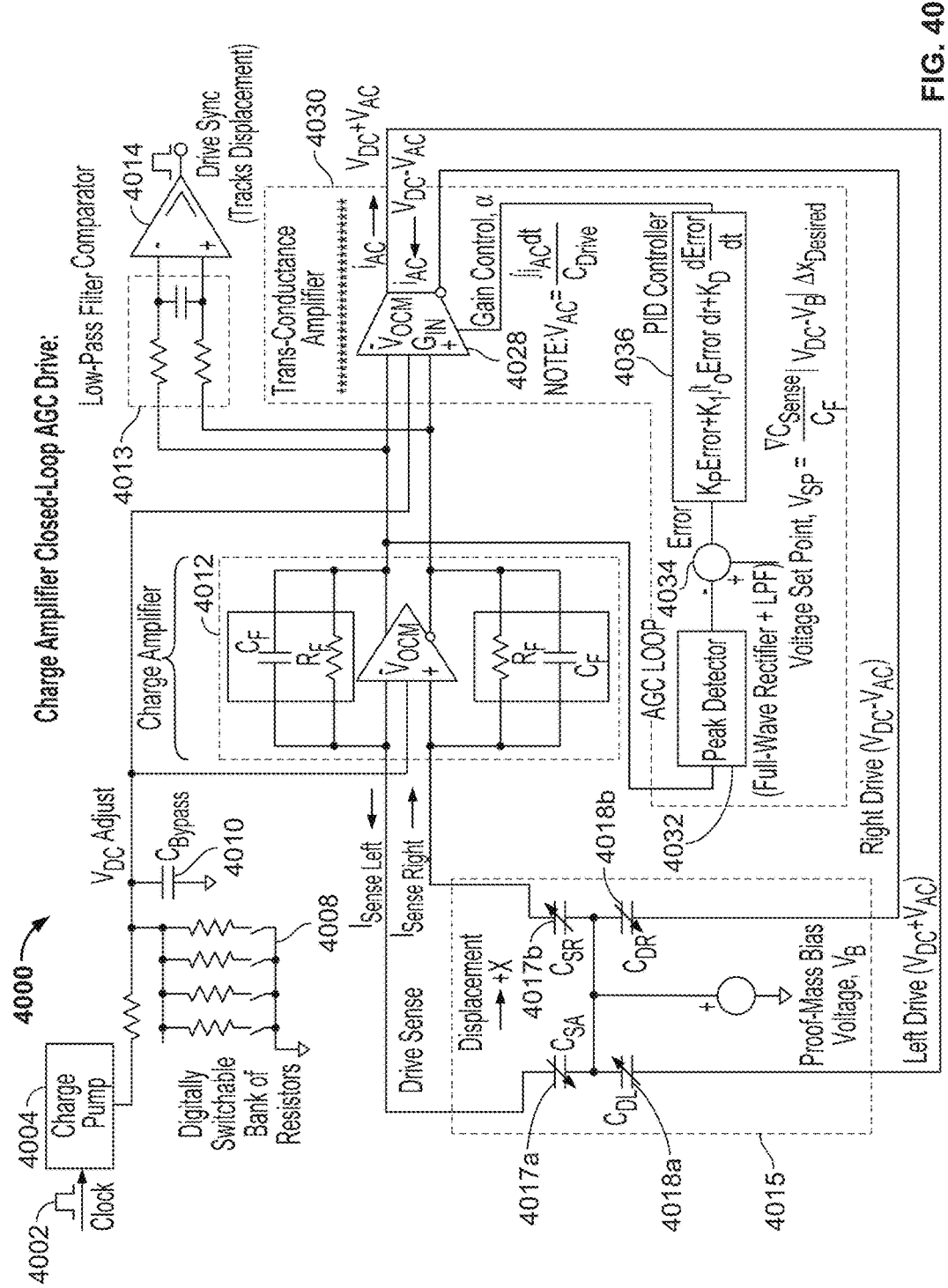
FIG. 40 depicts a system which uses a charge amplifier to perform closed-loop control of oscillator velocity, according to an illustrative implementation.

FIG. 40 depicts a system 4000 which uses a charge amplifier to perform closed-loop control of oscillator velocity. The system 4000 includes an oscillating structure 4015, which is driven into oscillation by drive capacitors 4018a and 4018b (collectively, drive capacitors 4018). The oscillating structure 4015 also includes sense capacitors 4017a and 4017b, which produce capacitive current based on motion of the oscillating structure 4015. The oscillating structure 4015 is similar to the oscillating structures 102, 2815, 3315, and 3816. Signals from the sense capacitors 4017 are provided to an amplifier subsystem 4012. The amplifier subsystem 4012 can include a charge amplifier. The amplifier subsystem 4012 produces output voltages based on the sense currents.

The system 4000 includes a clock signal 4002, a charge pump 4004, a digitally switchable bank of resistors 4008, and a bypass capacitor 4010. The output is provided to a common mode offset voltage terminal of an amplifier of the amplifier subsystem 4012.

Voltages produced by the amplifier subsystem 4012 in response to the sense currents of the oscillating structure 4015 are provided to a low-pass filter 4013, and a comparator 4014, which produce a square-wave drive sync signal for use in determining velocity and displacement of the oscillating structure 4015.

The output voltages of the amplifier subsystem 4012 are provided to an AGC loop 4030 to perform feedback control. The AGC loop 4030 includes a peak detector 4032, a summing element 4034, a PID controller 4036, and a transconductance amplifier 4028. The peak detector 4032 includes a full-wave rectifier and low-pass filter, and determines an amplitude of the oscillator. The summing element 4034 subtracts the determined amplitude from a voltage set point given by Equation 46.

$$V_{SP} = \frac{\nabla C_S}{C_F}|V_{DC} - V_B|\Delta x_{Desired} \qquad (46)$$

The summing element 4034 produces an error signal based on the subtraction and provides the error signal to the PID controller 4036. The PID controller 4036 determines an appropriate gain and provides the gain to the transconductance amplifier 4028. The transconductance amplifier 4028 provides output voltages to the drive capacitors 4018. By performing closed-loop control using a charge amplifier to detect sense current, motion of the oscillator can be accurately regulated.

Figure 41:
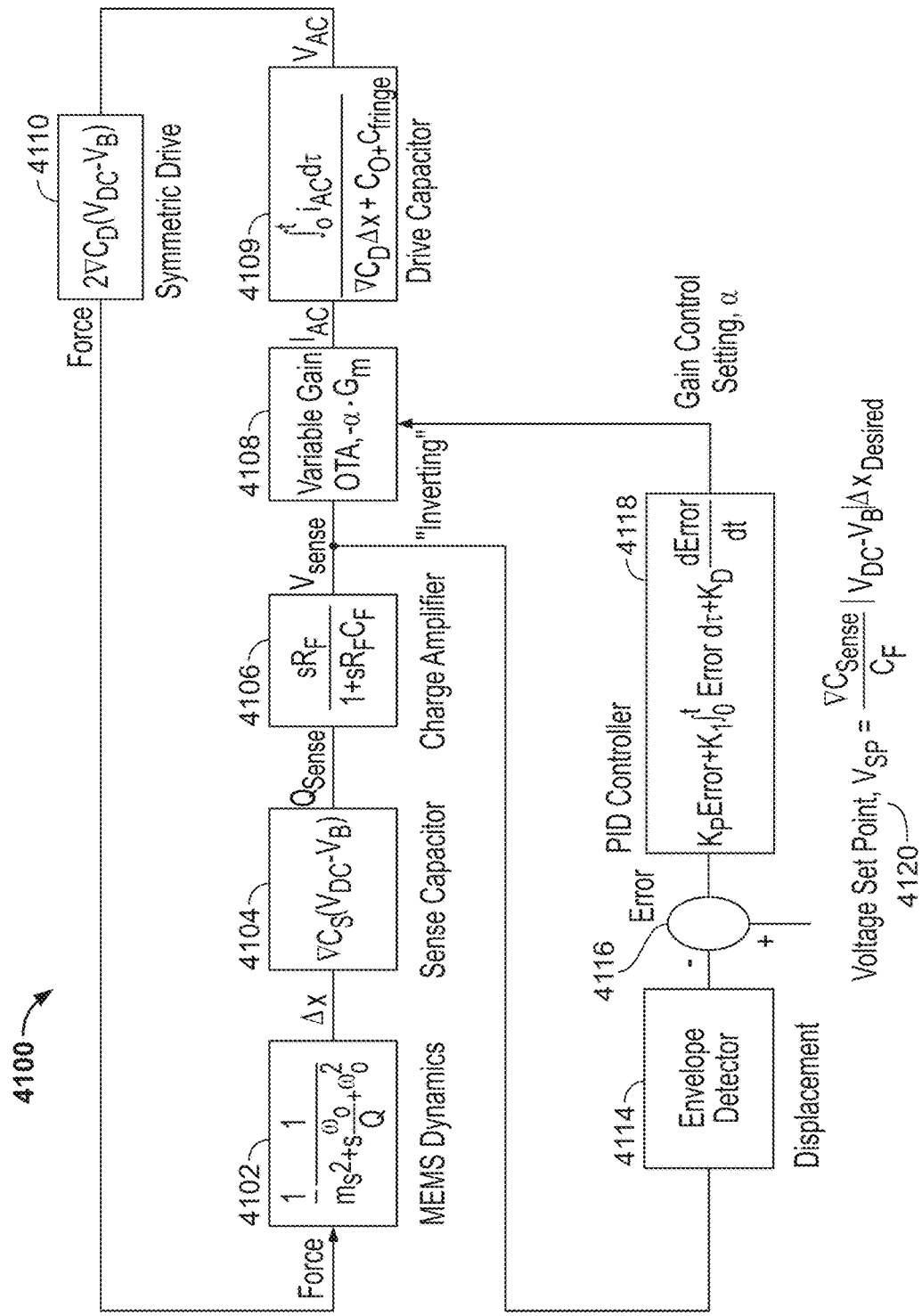
FIG. 41 depicts a block diagram representing the system depicted in FIG. 40, according to an illustrative implementation.

FIG. 41 depicts a block diagram 4100 representing the system 4000 using a charge amplifier. The block diagram 4100 includes a MEMS dynamics block 4102, which transforms a force into a displacement. The displacement is transformed by a sense capacitor 4104 into a sense charge. The sense charge is transformed by a charge amplifier 4106 into a sense voltage. The sense voltage is transformed by a variable gain amplifier 4108 into an AC current. The AC current is transformed by a drive capacitor 4109 into an AC voltage. The AC voltage is transformed by a symmetric drive 310 into the force which is fed back into the MEMS dynamics block 4102.

The closed-loop control is implemented in part by an envelope detector 4114 which uses the sense voltage from the charge amplifier 4106 to determine displacement amplitude. The envelope detector 4114 produced a voltage corresponding to the determined displacement amplitude. A summing element 4116 subtracts the voltage from the envelope detector 4114 from a voltage set point 4120 given by Equation 46. The summing element 4116 outputs an error signal to a PID controller 4118. The PID controller 4118 produced a gain control setting which is fed back into the variable gain amplifier 4108 to close the feedback loop. The gain setting required to satisfy the Barkhausen stability criteria and stabilize the drive loop is given by Equation 47.

$$\alpha \approx \frac{\text{mass}\omega_o^3 C_F(C_o + C_{Fringe})}{2QG_m \nabla C_S \nabla C_D (V_{DC} - V_B)^2} \qquad (47)$$

Figure 42:
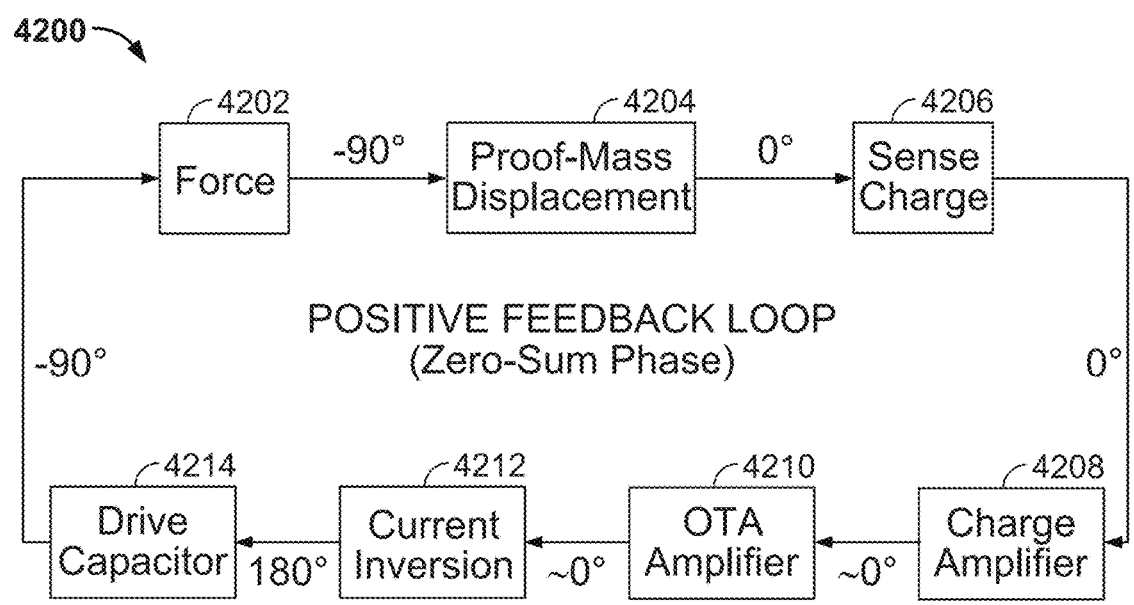
FIG. 42 depicts a positive feedback loop representing phase shifts occurring in the system depicted in FIG. 40, according to an illustrative implementation.

FIG. 42 depicts a positive feedback loop 4200 representing phase shifts occurring in the system 4000. The positive feedback loop 4200 includes a drive capacitor 4214, which produces a driving force 4202. The force 4202 has a phase offset of −90° from a current of the drive capacitor 4214. The force 4202 results in a proof mass displacement 4204 that has a phase offset of −90° from the force 4202. The proof mass displacement 4204 produces a sense charge 4206 that is in phase with the proof mass displacement 4204. The sense charge is measured by a charge amplifier 4208, which produces a voltage which is in phase with the sense charge 4206. The voltage produced by the charge amplifier 4208 is amplified into a current by an operational transconductance amplifier 4210. The current produced by the operational transconductance amplifier 4210 is in phase with the voltage produced by the charge amplifier 4208. A current inversion element 4212 inverts the current produced by the operational transconductance amplifier 4210, resulting in a phase shift of 180°. The current produced by the current inversion element 4212 is provided to the drive capacitor 4214 to complete the feedback loop. By maintaining appropriate phase shifts throughout the feedback loop 4200, motion of the proof mass can be regulated.

Figure 43:
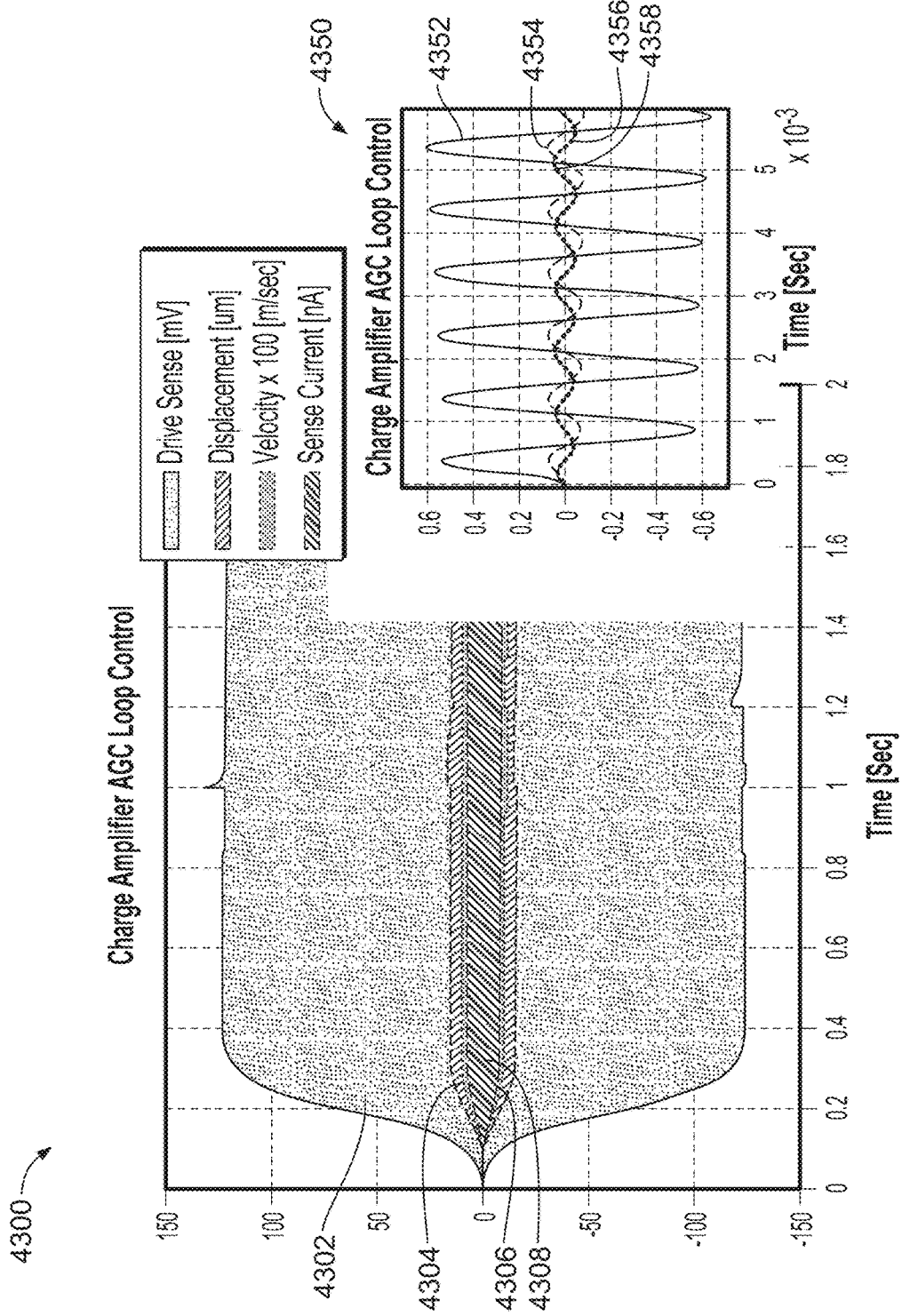
FIG. 43 depicts two graphs showing signals of the system depicted in FIG. 40, according to an illustrative implementation.

FIG. 43 depicts two graphs 4300 and 4350 showing signals of the system 4000. The graph 4300 includes a drive sense curve 4302 corresponding to a voltage produced by the amplifier subsystem 4012. The graph 4300 also includes a displacement curve 4304 corresponding to oscillator displacement and a velocity curve 4306 corresponding to oscillator velocity. The graph 4300 also includes a sense current 4308, corresponding to a current of the sense capacitors 4017.

The graph 4350 depicts an enlarged view of a portion of the graph 4300. The graph 4350 includes a drive sense curve 4352, a displacement curve 4354, a velocity curve 4356, and a sense current curve 4358, corresponding to portions of the curves 4302, 4304, 4306, and 4308, respectively. Phase shifts of the feedback loop 4200 are visible in the graph 4350. For example, the displacement curve 4354 and the drive sense curve 4352 are in phase with each other, but phase-shifted from the velocity curve 4356 and the sense current curve 4358.

Figure 44:
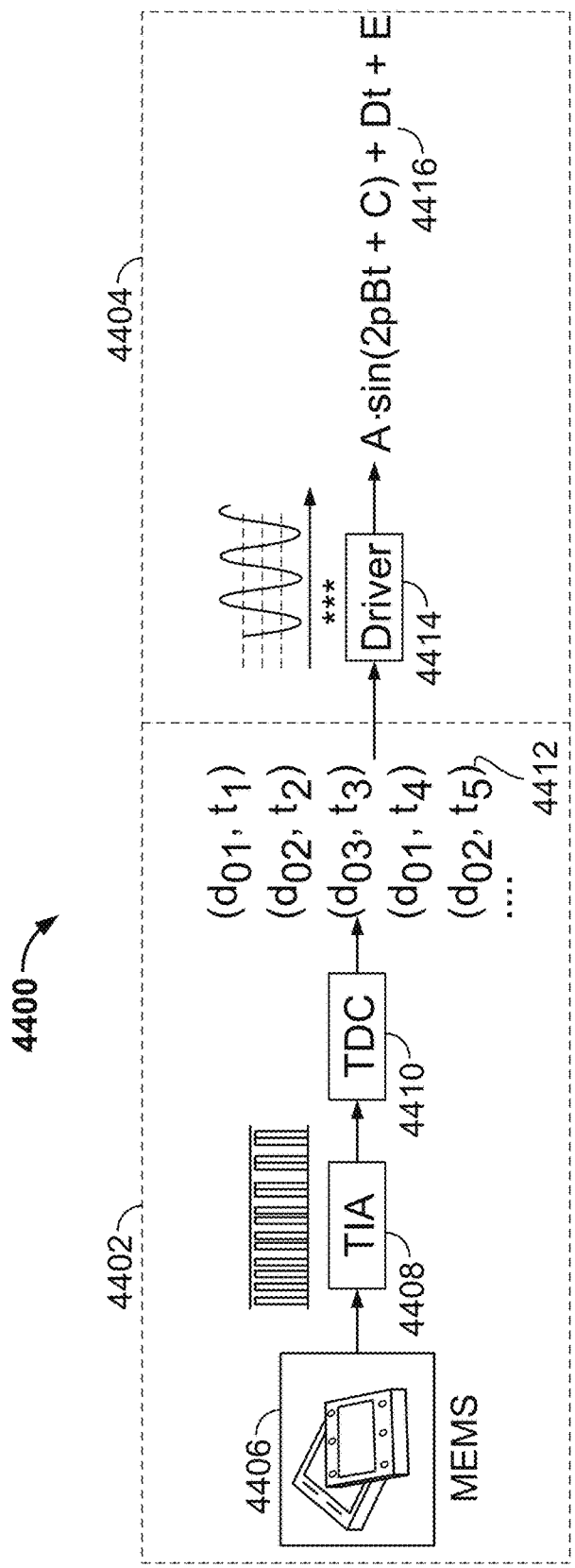
FIG. 44 depicts a schematic representing signal flows for determining oscillator parameters, according to an illustrative implementation.

FIG. 44 depicts a schematic 4400 representing signal flows for determining oscillator parameters. The schematic 4400 includes a sensor portion 4402 and a balance-ofsystem portion 4404. The sensor portion 4402 includes a MEMS element 4406 which provides an analog signal to an amplifier 4408 such as a transimpedance amplifier. The amplifier 4408 provides an output to a TDC 4410, which produces a set of times 4412 of threshold crossings. A driver 4414 performs a fit to the times 4412 to determine parameters of the oscillator's motion given by Equation 4416.

Figure 45:
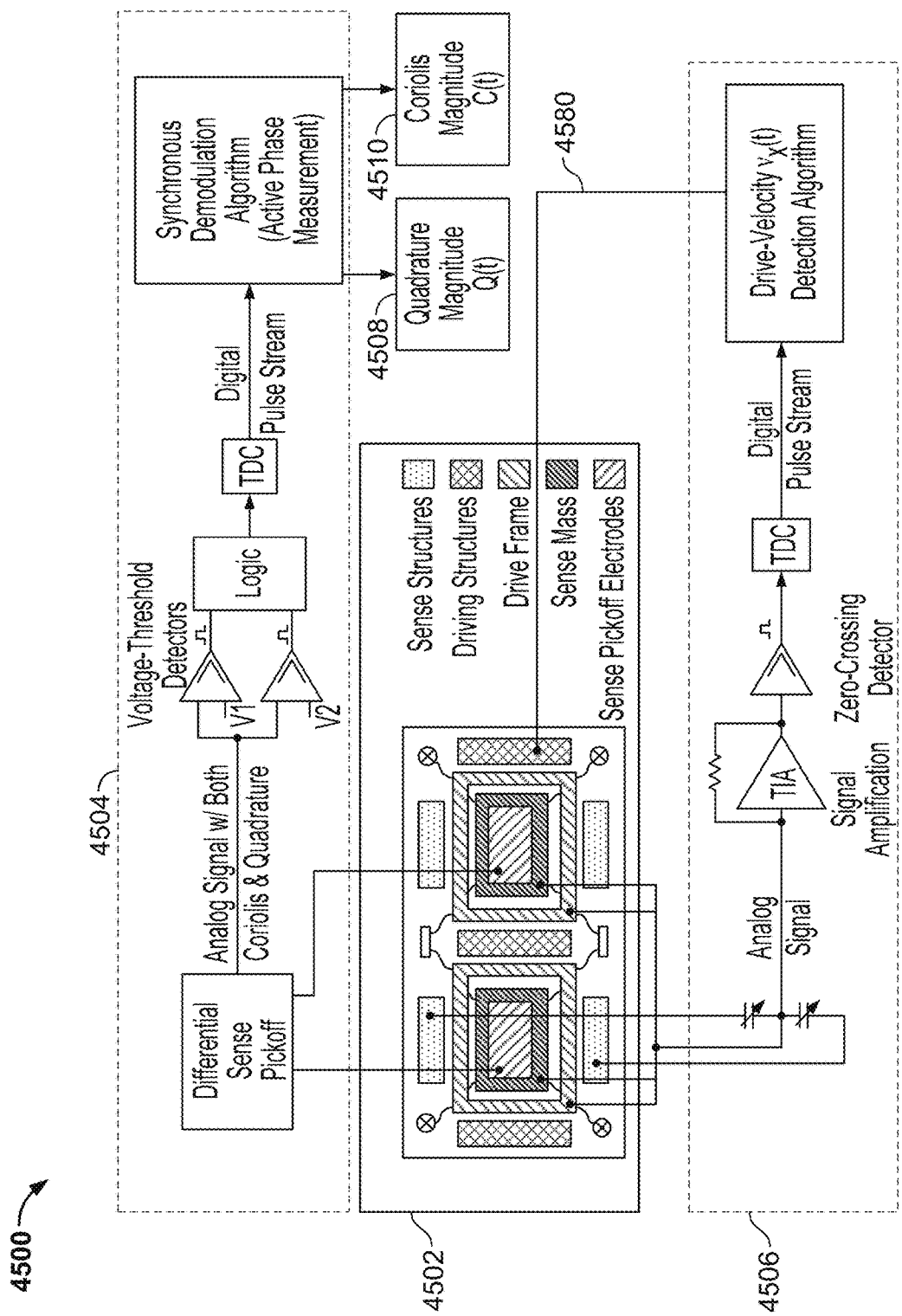
FIG. 45 depicts a system for performing closed-loop control of oscillator drive velocity, according to an illustrative implementation.

FIG. 45 depicts a system 4500 for performing closed-loop control of oscillator drive velocity. The system 4500 includes an oscillating structure 4502, a demodulation subsystem 4504, and a drive sense subsystem 4506, corresponding to the subsystems 102, 104, and 106 of the system 100. The demodulation module 4504 produces a quadrature magnitude signal 4506 and a Coriolis magnitude signal 4510. The drive sense subsystem 4506 produces a drive velocity signal 4580 that is used to control drive voltage of driving structures of the oscillating structure 4502. This regulation can control one or more of amplitude, frequency, and phase of the drive frame. This closed-loop feedback control regulates the velocity of drive frames of the oscillating structure 4502.

Figure 46:
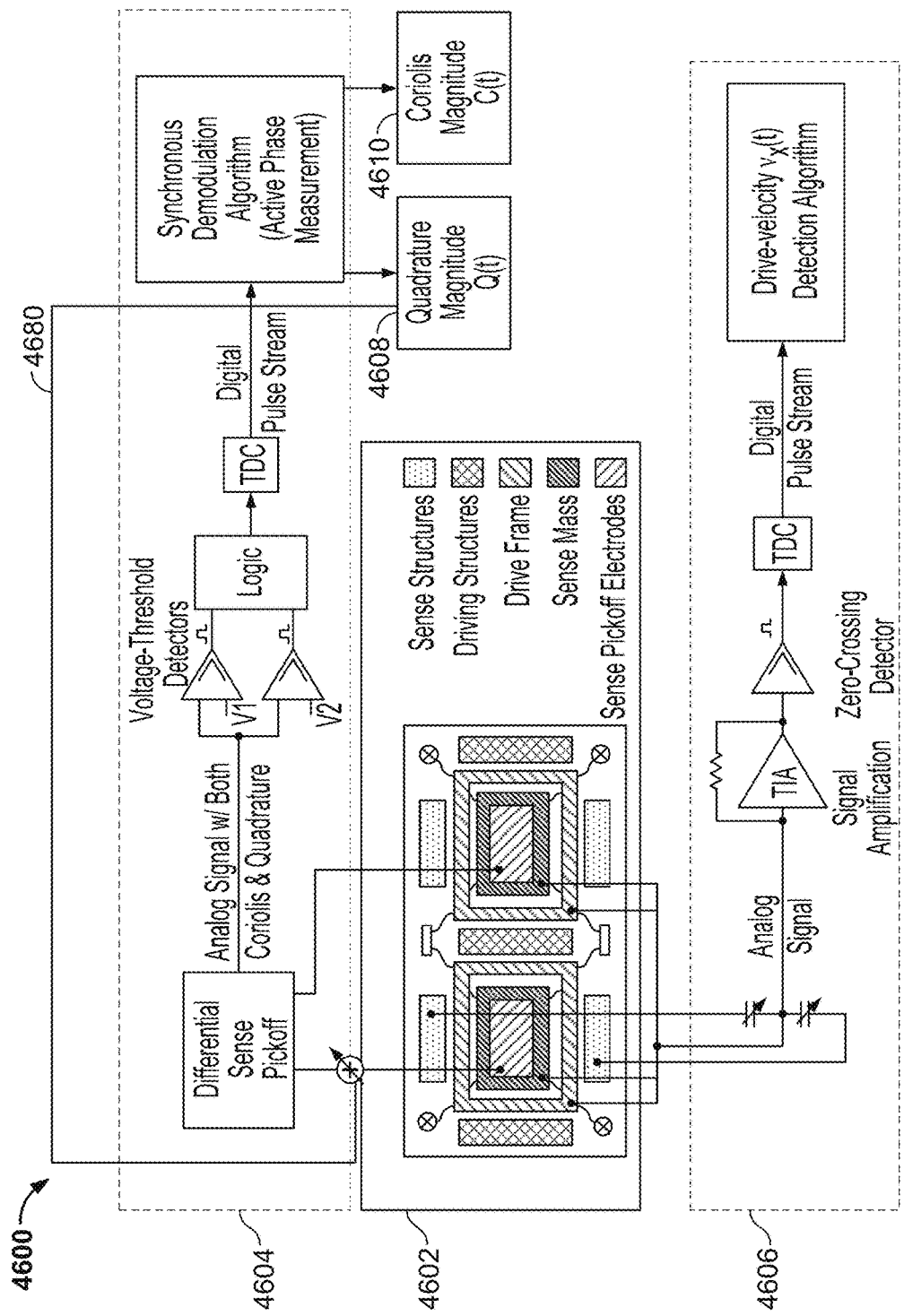
FIG. 46 depicts a system in which a calculated quadrature signal is used to partially remove a quadrature component at an upstream stage of the signal flow, according to an illustrative implementation.

FIG. 46 depicts a system 4600 in which a calculated quadrature signal is used to partially remove a quadrature component at an upstream stage of the signal flow. The system 4600 includes an oscillating structure 4602, a demodulation subsystem 4604, and a drive sense subsystem 4606, corresponding to the subsystem 4502, 4504, and 4506 respectively. The demodulation subsystem 4604 produces a quadrature signal 4608, and a Coriolis signal 4610. The quadrature signal 4608 is fed via the signal path 4680 into an input of a differential sense pickoff and the demodulation subsystem 4604. By combining the quadrature signal at the output of the oscillating structure 4602, at least a portion of the quadrature component can be removed prior to analog processing and the demodulation subsystem 4680. This can improve the signal to noise ratio for the Coriolis component 4610. In some examples, the signal path 4680 combines the quadrature component 4608 with an output of the differential sense pickoff of the demodulation subsystem 4604. By reducing the quadrature component of the output of the oscillating structure 4602, the signal to noise ratio of the system is improved.

Figure 47:
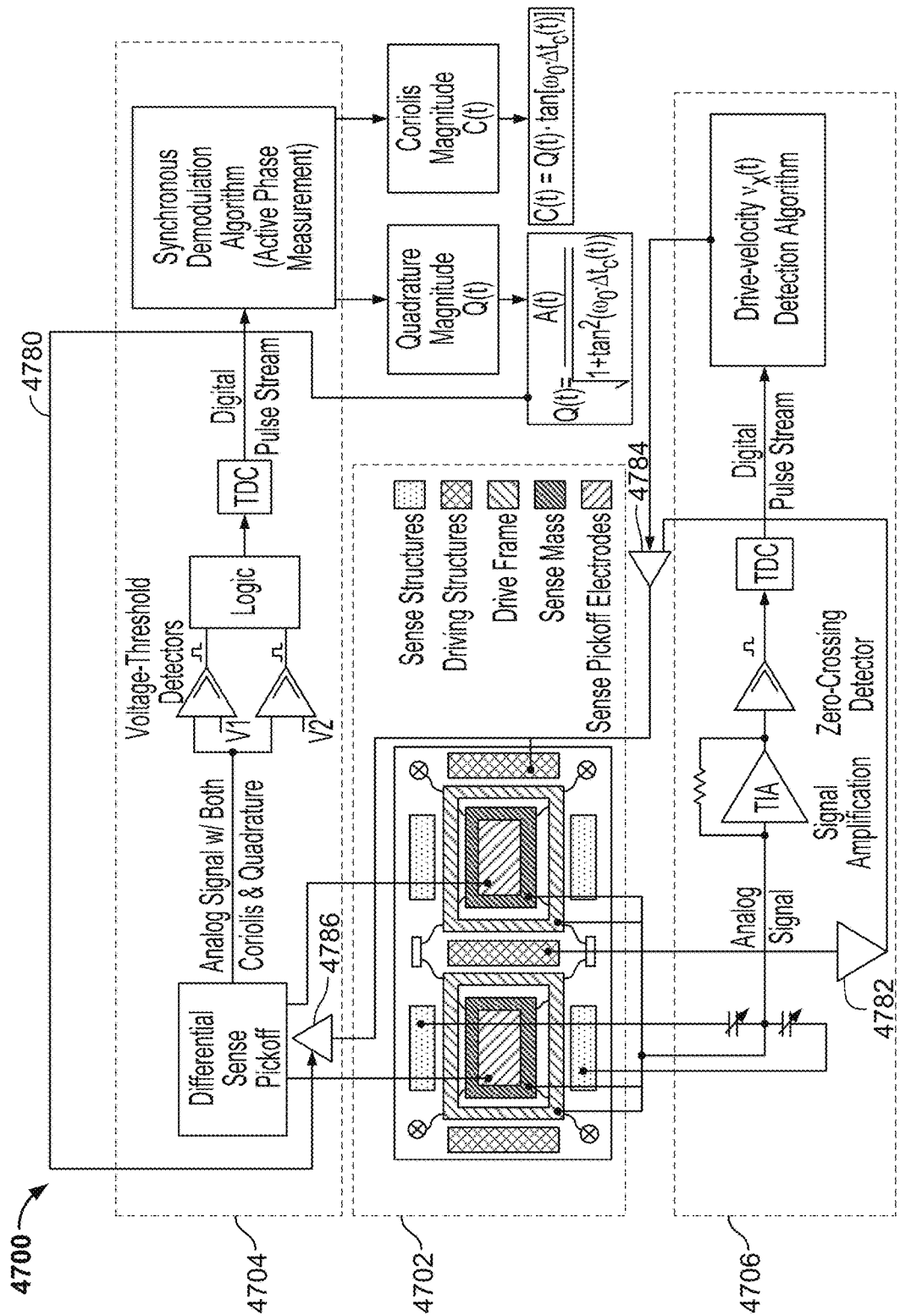
FIG. 47 depicts a system which performs closed-loop feedback of oscillator drive velocity and reduces a quadrature component of the oscillator signal, according to an illustrative implementation.

FIG. 47 depicts a system 4700 which performs closed-loop feedback of oscillator drive velocity and reduces a quadrature component of the oscillator signal. The system 4700 includes an oscillating structure 4702, a demodulation subsystem 4704, and a drive velocity subsystem 4706, corresponding to the subsystems 4502, 4504, and 4506 respectively. The demodulation subsystem 4704 determines a Coriolis component and a quadrature component of the sensed signal. The system 4700 includes a signal path 4780, which communicates the quadrature component to an amplifier 4786. The amplifier 4786 adjusts the analog signal from the oscillating structure 4702 based on the quadrature signal received via the communication path 4780. In this way, the amplifier 4786 reduces the quadrature component of the output of the oscillating structure 4702. By reducing the quadrature component, the demodulation electronics subsystem 4704 can process the analog input with an improved signal to noise ratio and dynamic range.

The system 4700 also includes amplifiers 4782 and 4784. The amplifier 4782 receives a signal from a driving structure of the oscillating structure 4702 and provides an input signal based on this drive structure signal to the amplifier 4784. The amplifier 4784 adjusts drive signals powering the driving structures of the oscillating structure 4702. The output of the amplifier 4784 is also provided to the amplifier 4786 as an input, since the quadrature signal that the amplifier 4786 is designed to remove is in phase with the drive voltage. By reducing the quadrature component and performing feedback control of the drive structure, displacements due to the Coriolis effect can be determined accurately.

Figure 48:
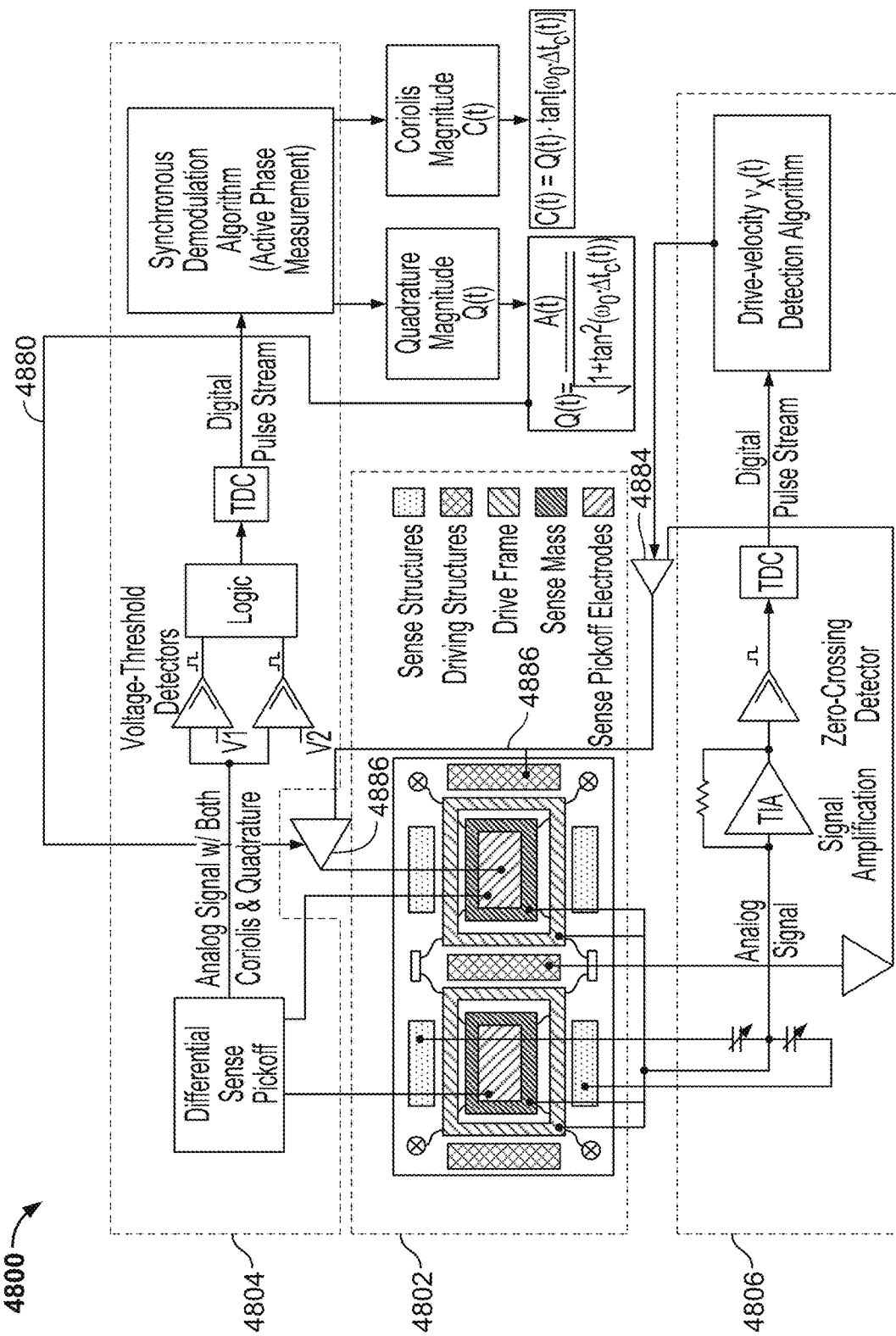
FIG. 48 depicts a system for performing feedback control of an oscillating structure while physically controlling quadrature, according to an illustrative implementation.

FIG. 48 depicts a system 4800 for performing feedback control of an oscillating structure while physically controlling quadrature. The system 4800 includes an oscillating structure 4802, a demodulation electronics subsystem 4804, and a drive sense subsystem 4806, corresponding to the subsystems 4502, 4504, and 4506 respectively. The demodulation subsystem 4804 produces a quadrature signal that is communicated via a communication path 4880 to an amplifier 4886. The amplifier 4886 controls a voltage applied to sense pickoff electrodes of the oscillating structure 4802. By applying the voltage to the sense pickoff electrodes, the amplifier 4886 controls an attractive or repulsive force offset of the sense pickoff electrodes. This affects the extent to which the sense mass displaces in the sense direction. Quadrature can be accentuated or diminished by the amplifier 4886. In some situations, accentuating the quadrature is desirable because the quadrature acts as a carrier signal for the Coriolis signal. However, in some situations, the quadrature can cause saturation of the analog electronics. In these situations, it is desirable to diminish the quadrature.

The system 4800 also includes amplifiers 4882 and 4884. The amplifiers 4882 and 4884 correspond to the amplifiers 4782 and 4784, respectively, and operate in a similar manner. By actively controlling quadrature and performing feedback control on the drive structures, the system 4800 can accurately measure displacement due to the Coriolis effect.

Figure 49:
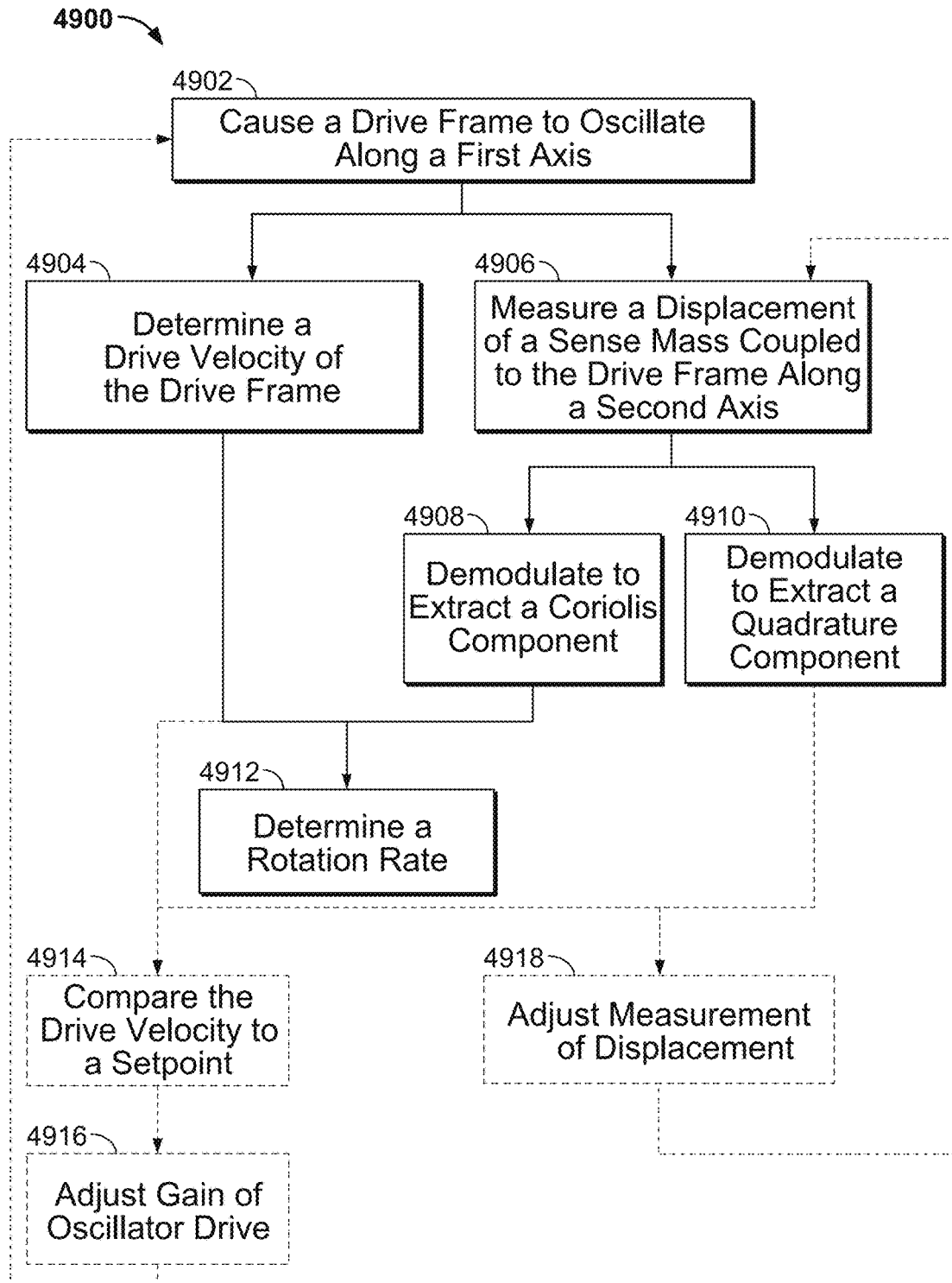
FIG. 49 depicts a flow chart of a method for determining a rotation rate of an inertial device, according to an illustrative implementation.

FIG. 49 depicts a flow chart of a method 4900 for determining a rotation rate of an inertial device. At 4902, a drive frame is driven to oscillate along a first axis. Examples of such drive frames are the drive frames 120.

At 4904, a drive velocity of the drive frame is determined. The drive velocity may be determined using periodic non-linear capacitor structures such as the sense structures 122 and other sense structures described herein. The drive velocity may be determined by determining times at which the drive frame is aligned with reference positions and using the cosine method to determine parameters of the drive frame oscillation based on these times.

At 4906, displacement of a sense mass along a second axis is determined. The sense mass is coupled to the drive frame, and examples of the sense mass include the sense masses 122. The second axis is orthogonal to the first axis.

At 4908, the displacement is demodulated to extract a Coriolis component. The Coriolis component of the displacement is due to the Coriolis effect. In some examples, the demodulation is performed by the demodulation subsystem 104 using the synchronous demodulation algorithm 142.

At 4910, the displacement is demodulated to extract a quadrature component. In some examples the demodulation is performed by the demodulation subsystem 104 using the synchronous demodulation algorithm 142. In some examples, the step 4910 occurs before the step 4908, and the quadrature component is used in part to determine the Coriolis component.

At 4912, a rotation rate is determined using the drive velocity and the Coriolis component. In some examples, the rotation rate is determined by dividing the Coriolis component by the drive velocity and multiplying by a scale factor as given by the relationship 146. Because the drive velocity is determined in real time, the rotation rate can be accurately determined.

At optional step 4914, the drive velocity is compared to a set point. At 4916, a gain of the oscillator drive is adjusted based on the comparison to the set point and the method returns to the 4902 to close the feedback loop. The steps 4914 and 4916 can be performed using digital systems and methods such as those described with respect to FIG. 43, or analog systems and methods such as those described with respect to FIG. 36. By forming closed-loop feedback control of the oscillator drive, the oscillator drive velocity can be accurately regulated.

At 4918, the measurement of displacement is adjusted based on the determined drive velocity and extracted quadrature component. The measurement of displacement can be adjusted as described with respect to any of FIGS. 46-48. In some examples, the measurement of displacement is adjusted by combining the quadrature component with an analog signal from a sense pick off electrode. In these examples, the quadrature component of the analog signal is reduced using signal processing methods at the circuit level. In some examples, the quadrature is physically adjusted by adjusting a bias voltage of the sense pickoff electrodes used to measure the displacement. In these examples, the electrostatic force resulting from the bias voltage adjusts the displacement due to quadrature, thus controlling quadrature at the physical level. In some examples, quadrature is reduced, such as to accommodate a dynamic range of the demodulation electronics. In some examples, the quadrature is increased, such as to provide a carrier signal for the Coriolis component. By controlling the measurement of displacement based on quadrature and drive velocity, the displacement can be accurately measured.

Figure 50:
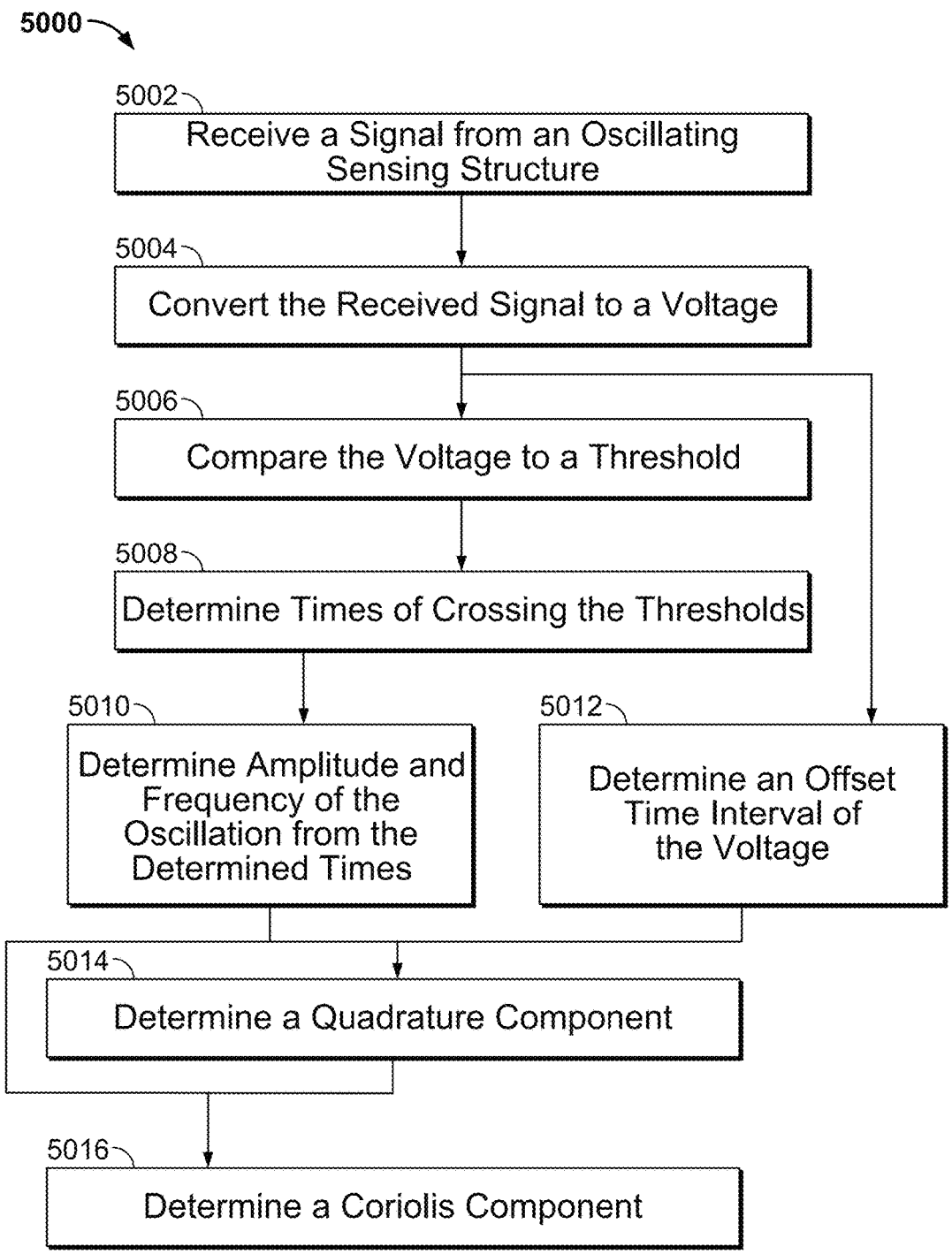
FIG. 50 depicts a flowchart of a method for determining quadrature and Coriolis components from a signal from an oscillating sensing structure, according to an illustrative implementation.

FIG. 50 depicts a flowchart of a method 5000 for determining quadrature and Coriolis components from a signal from an oscillating sensing structure. At 5002, a signal is received from an oscillating sensing structure. The oscillating sensing structure can be a drive frame such as one of the drive frames 120. The signal can be a current, a capacitance, a charge, or another analog signal related to motion of the oscillating structure.

At 5004, the signal is converted to a voltage. The signal can be converted by an analog from end such as a transimpendence amplifier or a charge amplifier.

At 5006 the voltage is compared to a threshold. The voltage can be compared using analog or digital systems or methods. The voltage can be compared using threshold detectors such as the threshold detectors 134. In some examples a comparator is used to make this comparison.

At 5008, times of threshold crossings are determined. These threshold crossings correspond to times at which the voltage crosses the threshold used in the comparison of step 5006. In some examples, the times may be determined using a TDC such as the TDC 138. In some examples, the times are determined using digital systems and methods. The determined times can be represented by a digital pulse stream that transitions between values at times corresponding to threshold crossing times.

At 5010, amplitude and frequency of the oscillation are in determined based on the determined threshold crossing times. The amplitude and frequency can be determined using the cosine method described herein.

At 5012, an offset time interval is determined based on the voltage. The offset time interval may be a time interval between a local maximum and the voltage and a reference time period. The reference time may be determined based on an input to the oscillating structure. The offset time interval can be determined using the systems and methods described with respect to FIG. 16.

At 5014, a quadrature component is determined. The quadrature component can be determined using the amplitude and frequency determined at step S010 and the offset time interval determined at 5012. In some examples, the quadrature can be calculated using Equation 6.

At step S016, a Coriolis component is determined. The Coriolis component can be determined using the frequency determined at step S010, the offset time interval determined at step S012, and the quadrature component determined at step S014. In some examples, the Coriolis component can be calculated using Equation 7.

The method 5000 can be used to implement a portion of the method 4900, including the steps 4906, 4908, and 4910. By using threshold crossing times to determine parameters of motion of an oscillating-sensing structure, Coriolis and quadrature components of the structure's motion can be accurately determined.

Figure 51:
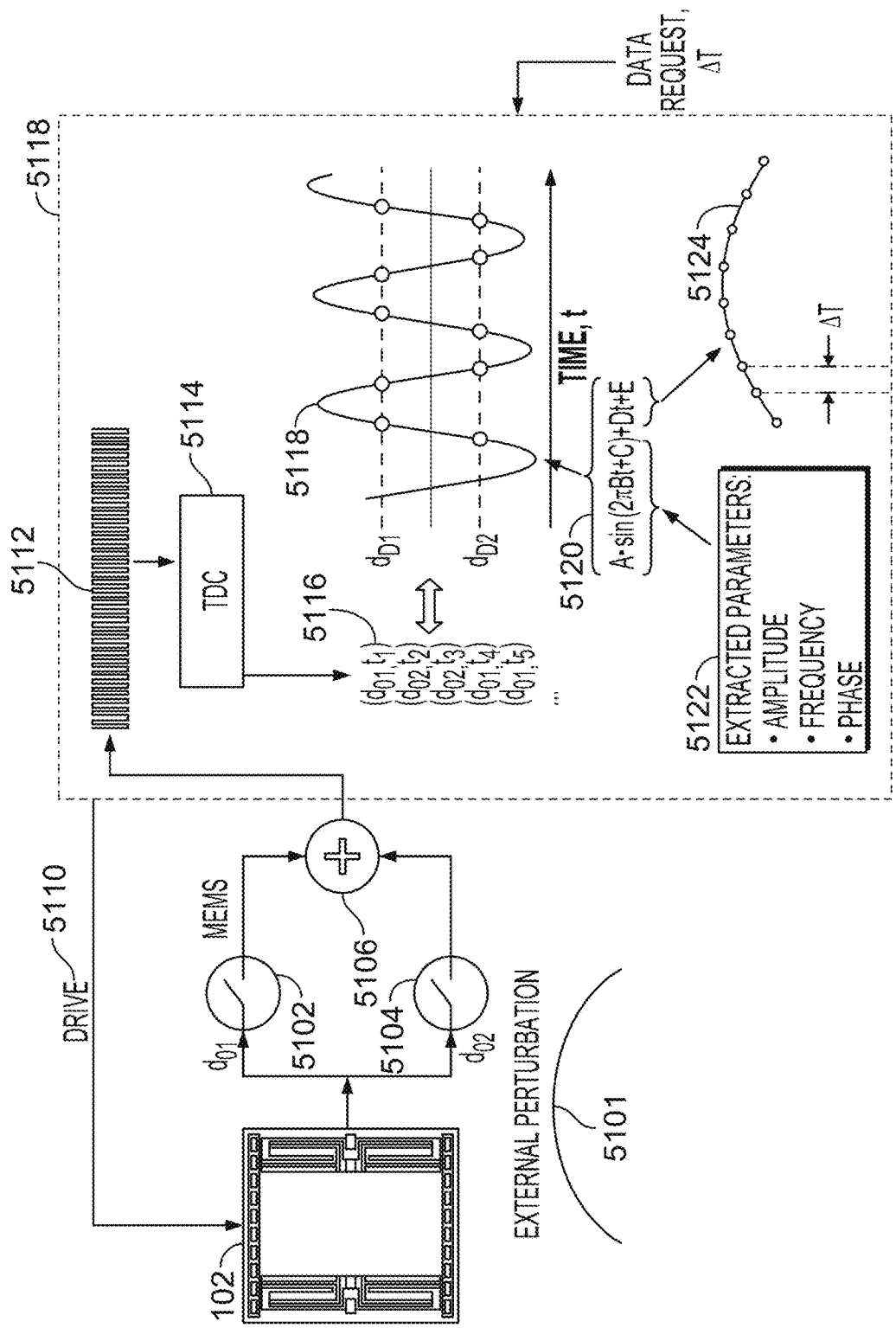
FIG. 51 schematically depicts an exemplary process used to extract inertial information from an inertial sensor with periodic geometry, according to an illustrative implementation.

FIG. 51 schematically depicts an exemplary process used to extract inertial information from an inertial sensor with periodic geometry. FIG. 51 includes an oscillating structure 102 which experiences an external perturbation 5101. A drive signal 5110 causes a movable portion of the oscillating structure 102 to oscillate. Zero-crossings of an output signal from the oscillating structure 102 are generated at 5102 and 5104 and combined at 5106 into a combined signal. A signal processing module 5108 processes the combined analog signal to determine inertial information. One or more processes can invert the analog signal into a rectangular waveform 5112. This can be accomplished using a comparator, by amplifying the analog signal to the rails, or by other methods. A time-to-digital converter (TDC) 5114 is used to determine rising and falling edges of the rectangular signal 5112. These rising and falling edges are associated with zero-crossings of the combined signal. The TDC 5114 outputs the series of zero-crossing times 5116 associated with zero-crossings. These zero-crossing times 5116 can be part of a periodic waveform 5118 that can be approximated by a periodic function 5120. By fitting the zero-crossing times 5116 to the periodic function 5120, inertial parameters 5122 can be extracted from the fit to the periodic function 5120. The extracted parameters 5122 are related to the external perturbation 5101 acting on the oscillating structure 102. Time intervals 5124 can also be extracted from the fit to the periodic function 5120. Because the zero-crossings are associated with specific physical locations of movable portions of the oscillating structure 102, displacement information can be reliably determined independent of drift, creep and other factors which tend to degrade performance of inertial sensors.

Figure 52:
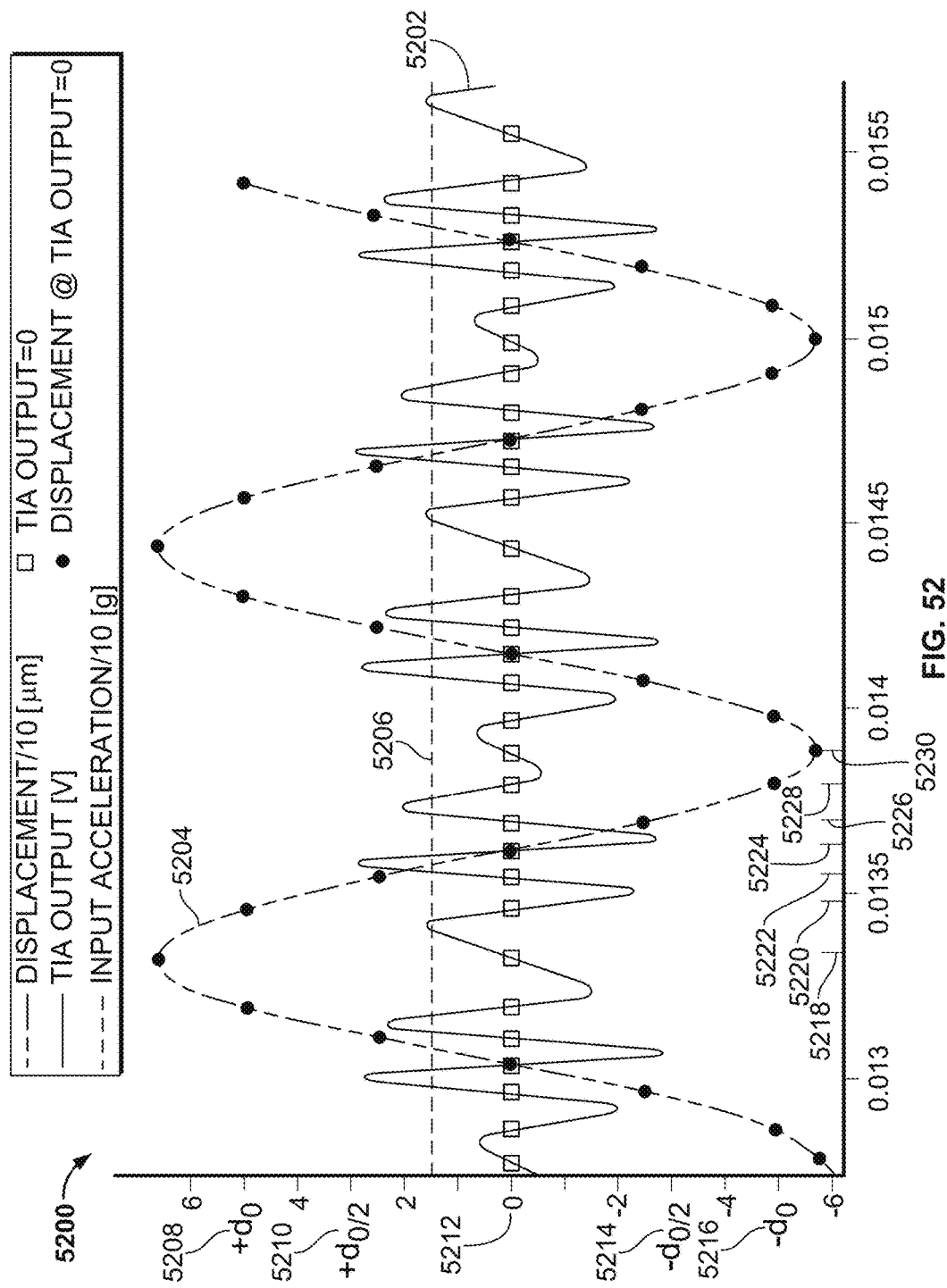
FIG. 52 depicts a graph which represents the association of analog signals derived from an inertial sensor with zero-crossing times and displacements of the inertial sensor, according to an illustrative implementation.

FIG. 52 depicts a graph 5200 which represents the association of analog signals derived from the inertial sensor with zero-crossing times and displacements of the inertial sensor. The graph 5200 represents signals derived from an oscillator in which opposing teeth are aligned at the rest position. The graph 5200 includes curves 5202, 5204 and 5206. The curve 5202 represents an output of an analog front end such as a TIA. Since a TIA outputs a signal proportional to its input current, the curve 5202 represents a capacitive current measured between movable and fixed elements of an inertial device such as the oscillating structure 102. The curve 5206 represents an input acceleration that is applied to the oscillating structure 102. The input acceleration represented by the curve 5206 is a 15 G acceleration at 20 Hz. The curve 5204 represents displacement of the movable element of the oscillating structure 102 as it oscillates. FIG. 52 includes square symbols indicating points on the curve 5202 at which the curve 5202 crosses the zero level. These zero-crossings in the current represent local maxima or minima (extrema) of capacitance between the movable element and the fixed element of the inertial device, because capacitive current is proportional to the first derivative of capacitance. FIG. 52 includes circular symbols indicating points on the curve 5204 corresponding to times at which the curve 5202 crosses zero. The circular symbols indicate the correlation between physical position of a movable element of the oscillator and zero-crossing times of the outputs of signal 5202.

At the time 5218, the curve 2002 crosses zero because the displacement of the movable element of the oscillator is at a maximum and the oscillator is at rest, as indicated by the displacement curve 5204. Here, capacitance reaches a local extremum because the movable element has a velocity of zero, not necessarily because teeth or beams of the oscillator are aligned with opposing teeth or beams. At time 5220, the TIA output curve 5202 crosses zero because the oscillator displacement reaches the +$d_0$ location 5208. The +$d_0$ location 5208 corresponds to a displacement in a position direction equal to the pitch distance and is a point at which opposing teeth or beams are aligned to produce maximum capacitance. At time 5222, the TIA output curve 5202 crosses zero because the movable element of the oscillator is at a position at which the teeth are anti-aligned. This occurs when the teeth of the movable element are aligned with the centers of gaps between teeth of the fixed element, resulting in a minimum in capacitance. This minimum in capacitance occurs at a location of +$d_0$/2 5210, corresponding to a displacement to one-half the pitch distance in the positive direction.

At time 5224, the TIA output curve 5202 crosses zero because teeth of the movable element are aligned with teeth of the fixed element, producing a maximum in capacitance. The time 5224 corresponds to a time at which the movable element is at the rest position, indicated by the zero displacement 5212 on the curve 5204. At time 5226, the TIA output 2202 crosses zero because teeth of the movable element are anti-aligned with teeth of the fixed element, producing a local minimum in capacitance. This anti-alignment occurs at a displacement of −$d_0$/2 5214, corresponding to a displacement of one-half the pitch distance in the negative direction. At time 5228, the TIA output 5202 crosses zero because the teeth of the movable element are aligned with the teeth of the fixed element, creating a local maximum in capacitance. This local maximum in capacitance occurs at a displacement of −$d_0$ 5216, corresponding to a displacement equal to such distance in the negative direction. At time 5230, the TIA output curve 5202 crosses zero because the movable element has a velocity of zero as it reverses direction. This direction reversal is illustrated by the displacement curve 5204. As at time 5218, when the movable element has a velocity of zero, capacitance is not changing with time and thus the current and TIA output (which are proportional to the first derivative of capacitance) are zero.

Figure 53:
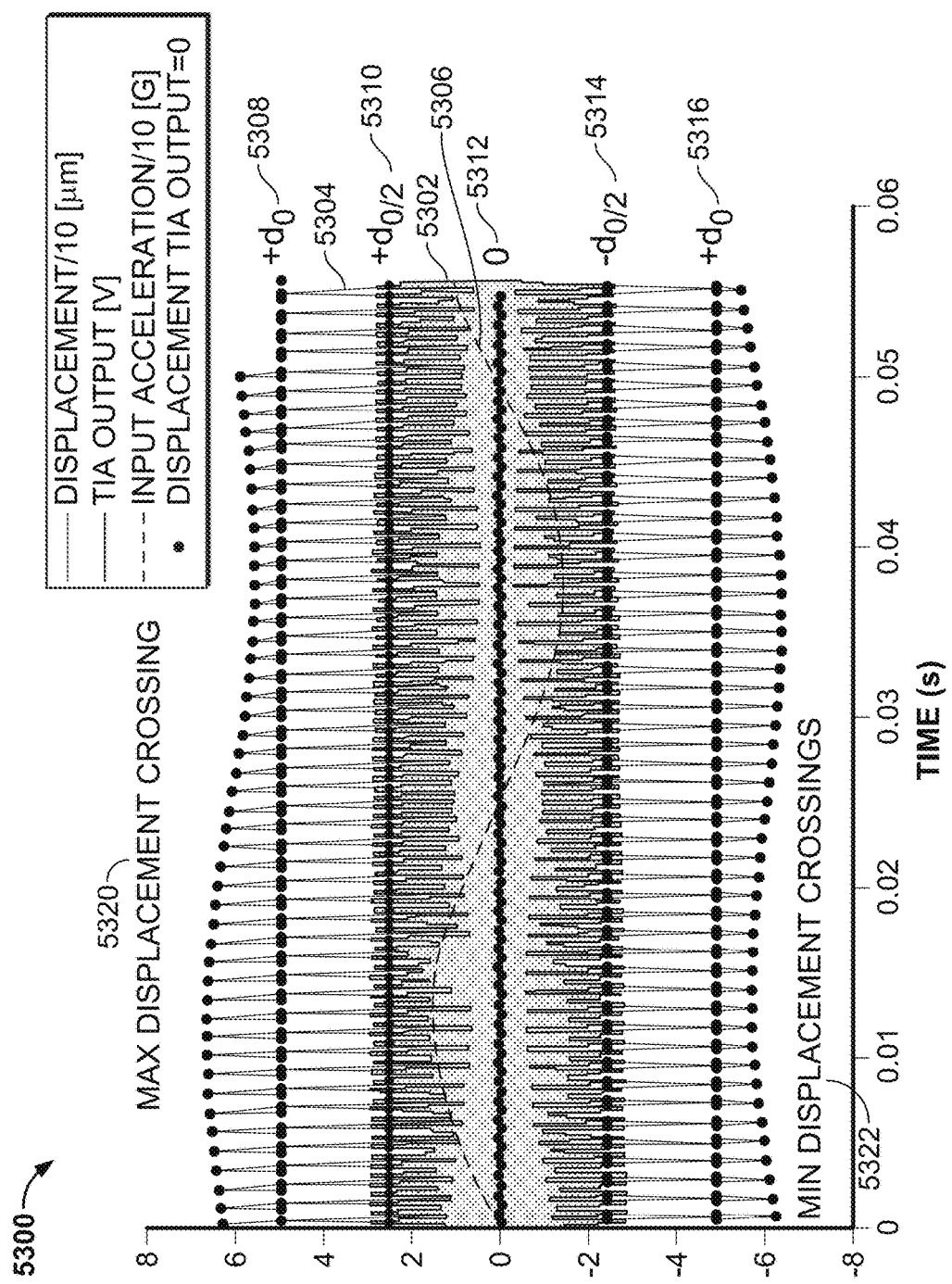
FIG. 53 depicts a graph showing the effect of an external perturbation on input and output signals of the inertial sensors described herein, according to an illustrative implementation.

FIG. 53 depicts a graph 5300 showing the effect of an external perturbation on input and output signals of the inertial sensors described herein. The graph 5300 includes the TIA output curve 5202, the displacement curve 5204, and the input acceleration curve 5206. The graph 5300 depicts the same signals depicted in the graph 5200, and the only difference is that the graph 5300 represents a longer duration of time then the graph 5200. With a longer duration of time displayed in the graph 5300, the periodicity of the input acceleration curve 5206 is more easily discerned. In addition, maximum displacement crossings 5320 and minimum displacement crossings 5322 can be discerned in the graph 5300 to experience a similar periodicity. In contrast to the maximum displacement crossings 5320 and the minimum displacement crossings 5322, the amplitude of which varies with time, zero-crossings of the TIA output signal 5202 triggered by alignment or anti-alignment of teeth of the fixed and movable elements and at the locations +$d_0$/2 5208, 0 5212, −$d_0$/2 5214, and −$d_0$ 5216 are stable with time. These reference crossings, the amplitude of which are stable with time, provide stable, drift-independent indications of oscillator displacement and can be used to extract inertial parameters such as velocity and acceleration.

Figure 54:
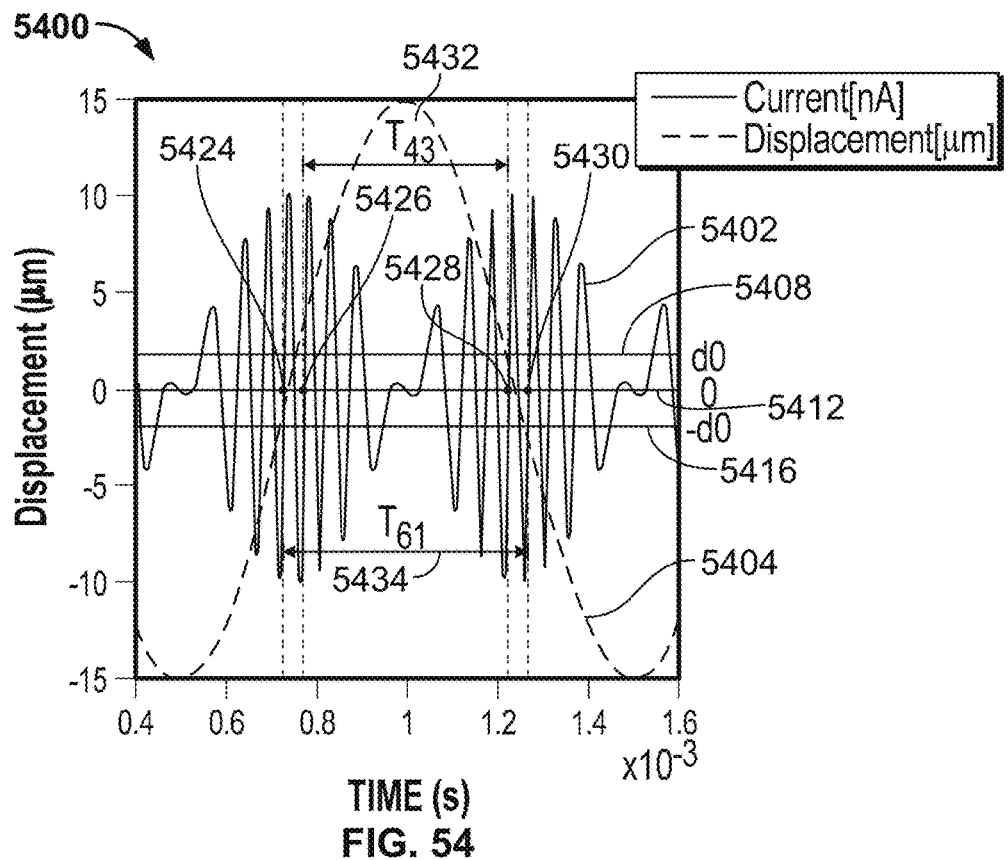
FIG. 54 depicts a graph that illustrates the response of a current to an oscillator displacement, according to an illustrative implementation.

FIG. 54 depicts a graph 5400 that illustrates the response of a current to an oscillator displacement. The graph 5400 includes a current curve 5402 and a displacement curve 5404. The current curve 5402 represents an input signal for a TIA. The TIA may produce an output signal such as the TIA output curve 5202 in response. The current curve 5402 is a capacitive current between the fixed element and the movable element in response to displacement of the movable element according to the displacement curve 5404. The current curve 5402 crosses zero at numerous times, including times 5424, 5426, 5428, and 5430. At the times 5424 and 5430, the movable element has a displacement of −$d_0$, as shown in the graph 5400. At the times 5426 and 5428, the movable element has a displacement of +$d_0$, shown on the graph 5400. The graph 5400 includes two time intervals $T_{43}$ 5432 and $T_{61}$ 5434. The time interval $T_{43}$ 5432 corresponds to the difference in time between time 5426 and time 5428. The time interval $T_{61}$ 5434 corresponds to the time difference between times 5424 and 5430. Thus, time interval $T_{61}$ 5434 corresponds to the time between subsequent crossings of the −$d_0$ 5416 level, and the time interval $T_{43}$ 5432 corresponds to the time interval between subsequent crossings of the +$d_0$ 5408 level. The methods used to determine the time intervals $T_{43}$ 5432 and $T_{61}$ 5434 can be used to determine other time intervals, such as between a crossings of the +$d_0$ 5408 and the next subsequent crossing of the −$d_0$ 5416, between a time interval between a crossing of the −$d_0$ 5416 and the next crossing of the +$d_0$ 5408, between the time 5430 and the next crossing of the +$d_0$ 5408, between crossings of the zero 5412, between zero-crossings due to a maximum or minimum of displacement, or between any other combination of zero-crossings of the current curve 2002 or a TIA output signal corresponding to the current curve 5402.

Figure 55:
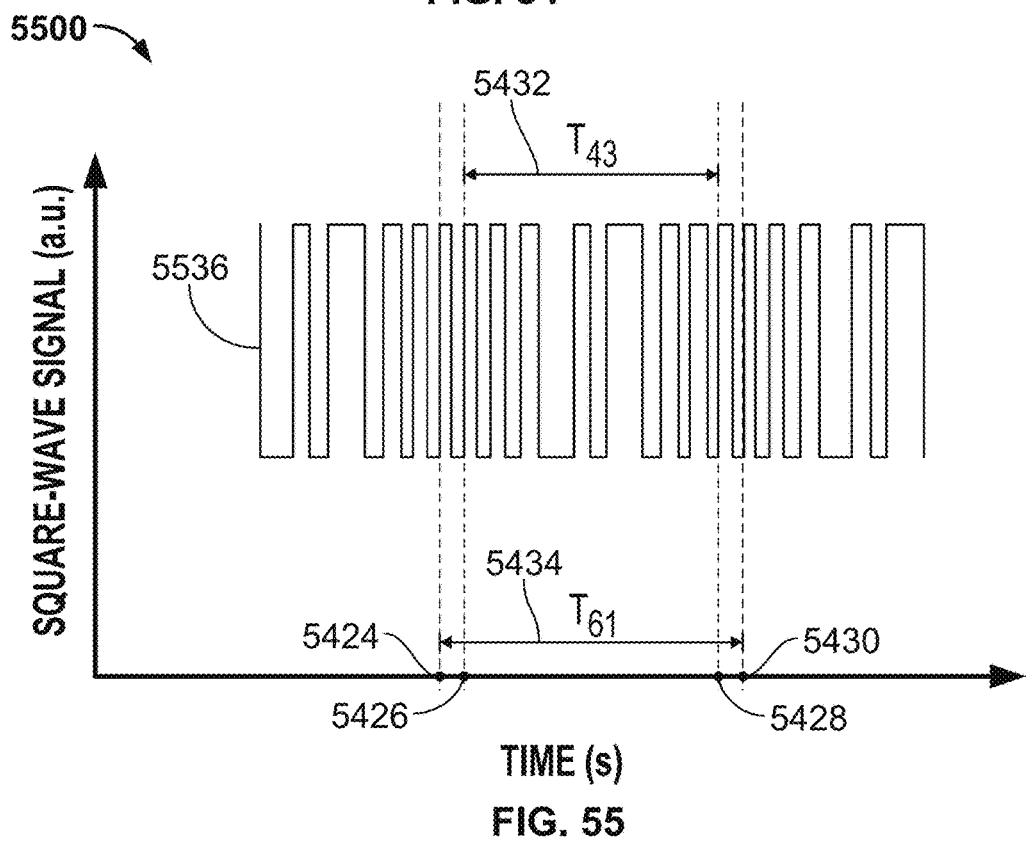
FIG. 55 depicts a graph showing a square-wave signal representing zero-crossing times of a current signal, according to an illustrative implementation.

FIG. 55 depicts a graph 5500 showing a square-wave signal representing zero-crossing times of the current signal 5402. The graph 5500 includes a square-wave curve 5536. The square-wave 5536 has substantially two values: a high value and a low value. While the square-wave curve 5536 may have intermediate values as it transitions between the high and low values, the time spent at intermediate values is far less than the combined time spent at the high and low values. The square-wave signal 5536 can be produced by a variety of methods, including using a comparator to detect changes in an input signal, by amplifying an input signal to the limits of an amplifier so as to saturate the amplifier (amplifying to the rails), by using an analog-to-digital converter, and the like. One way to produce the square-wave curve 5536 from the current curve 5402 is to use a comparator to detect zero-crossings of the current curve 5402. When the current curve 5402 has a value greater than a reference level (such as zero), the comparator outputs a high value, and when the current curve 5402 has a value less than the reference level (such as zero), the comparator has a low value. The comparator's output transitions from low to high when the current curve 5402 transitions from a negative value to a positive value, and the comparator's output transitions from high to low when the current curve 5402 transitions from a positive value to a negative value. Thus, times of rising edges of the square-wave signal 5536 correspond to times of negative-to-positive zero-crossings of the current curve 5404, and falling edges of the square-wave signal 5536 correspond to positive-to-negative zero-crossings of the current curve 5402. The square-wave signal 5536 includes the same time intervals 5432 and 5434 as the current curve 5402. One benefit of converting the current curve 5402 to a square-wave signal such as the square-wave signal 5536 is that in a square-wave signal, rising and falling edges are steeper. Steep rising and falling edges provide more accurate resolution of the timing of the edges and lower timing uncertainty. Another benefit is that square-wave signals are amenable to digital processing.

FIG. 56 depicts a graph 5600 which illustrates additional time intervals of displacement curve 5404. In addition to the times depicted in the graph 5400, the graph 5600 includes times 5636 and 5638. In addition to the time intervals depicted in the graph 5400, the graph 5600 includes the time interval $T_{94}$ 5640 and the time interval $T_{76}$ 5642. The time interval $T_{94}$ 5640 corresponds to the time interval between times 5438 and 5638, both crossings of the $d_0$ 5408 level. The time interval $T_{76}$ 5642 corresponds to the time interval between times 5430 and 5636, both crossings of the $-d_0$ 5416 level. As can be seen in FIG. 53, the oscillator displacement as shown by the displacement curve 5204 experiences an offset that is correlated with input acceleration as indicated by the acceleration curve 5206. Thus, one way to detect shifts of the displacement curve 5404 and thus input acceleration is to compare relative positions of zero-crossing times. For example, a sum of the time intervals $T_{43}$ 5432 and $T_{94}$ 5640 represents a period of oscillation as does a sum of the periods $T_{61}$ 5434 and $T_{36}$ 5642. In comparing a subset of the period, such as comparing the time interval $T_{43}$ 5432 with the sum of $T_{43}$ 5432 and $T_{94}$ 5640 represents the proportion of time that the oscillator spends at a displacement greater than $+d_0$ 5408. An increase in this proportion from a reference proportion indicates a greater acceleration in a positive direction than the reference. Likewise, a decrease in this proportion from the reference indicates a greater acceleration in the negative direction. Other time intervals can be used to calculate other proportions and changes in acceleration. Displacement of oscillator can be determined from the time intervals depicted in FIG. 56 using equations 48, 49, and 50.

$$d = \frac{2d_0 \cos\left(\pi \frac{T_{61}}{P_{m1}}\right)}{\cos\left(\pi \frac{T_{61}}{P_{m1}}\right) - \cos\left(\pi \frac{T_{43}}{P_{m2}}\right)} - d_0 \quad (48)$$

$$P_{m1} = T_{61} + T_{76} \quad (49)$$

$$P_{m2} = T_{43} + T_{94} \quad (50)$$

Displacement of the oscillator can be converted to an acceleration using Hooke's Law. Displacement of the oscillator can be calculated recursively for each half cycle of the oscillator. Using this information, the displacement of the oscillator can be recorded as a function of time. This allows the calculation of external perturbations with zero drift and lower broadband noise.

In some implementations, a sensor includes a fixed comb-like structure with teeth periodically spaced at a pitch. This fixed comb-like structure is initially aligned with a nearby and identical structure which is attached to a proof mass that is mobile in a direction parallel to pitch direction. The capacitance between the mobile and fixed structures varies nonlinearly and non-monotonically as a function of x(t), which represents the relative lateral displacement between the moveable and fixed structures. Additionally, this non-linear capacitance variation between the moveable and fixed structures is known, repeatable, and periodic (having degenerate values). The capacitance can be modeled as shown in equation 51.

$$S_{MAP}(t) = C_0 + C_1 \cdot \sin\left[\frac{2\pi}{P} \cdot x(t)\right] \quad (51)$$

$$= C_o + C_1 \cdot \sin\left[\frac{2\pi}{P} \cdot (A\sin(\omega_d t) + \Delta)\right]$$

In equation 51, the motion of the proof mass is sinusoidal as shown in equation 52.

$$x(t) = A \sin(\omega_d t) + \Delta \quad (52)$$

Performing calculations using the capacitance, and electrical signals resulting therefrom, can produce the amplitude, frequency, and offset of the motion the proof mass. These parameters are A, $\omega_d$, and $\Delta$, respectively. By repeatedly solving for these variables, the amplitude, frequency and offset of the motion of the proof mass can be determined with respect to time. The offset is proportional to an external acceleration acting on the sensor.

To obtain these parameters, the times at which the sensor has predetermined values of capacitance are measured. At these times, the proof mass is known to be at a position that is given by Equation 53, where n takes on integral values.

$$\frac{2\pi}{P} \cdot x(t) = n \cdot \pi \quad (53)$$

The oscillator is known to be at a displacement that is a multiple of P/2 by tracking the number of times at which the capacitance equals the predetermined capacitance. The number of times at which the oscillator crosses displacements of P/2 can be tracked to overcome issues of degeneracy in capacitance. In particular, successive times at which the oscillator displacement equals +P/2 and -P/2 ($\delta t$ and $\delta t-$, respectively) are measured and used to solve for A, $\omega_d$, and $\Delta$. Equation 54 shows the calculation of $\omega_d$ as a function of the time intervals.

$$\omega_d = \frac{2\pi}{\text{Period}} = 2\pi \frac{2}{(\delta t_1^+ + \delta t_2^+ + \delta t_1^- + \delta t_2^-)} \quad (54)$$

Exploiting the similarity of the measured time intervals combined with the fact that all time measurements were taken at points at which the capacitance equaled known values of capacitance and the oscillator displacement equaled integral multiples of P/2, the system of equations 55 and 56 can be obtained.

$$x(t) = +\frac{P}{2} = A \cdot \cos\left(\omega_d \frac{\delta t_1^+}{2}\right) + \Delta \quad (55)$$

$$x(t) = -\frac{P}{2} = A \cdot \cos\left(\omega_d \frac{\delta t_1^-}{2}\right) + \Delta \quad (56)$$

The difference of equations 55 and 56 allows A to be determined as in equation 57.

$$A = \frac{P}{\cos\left(\omega_d \frac{\delta t_1^+}{2}\right) - \cos\left(\omega_d \frac{\delta t_1^-}{2}\right)} \quad (57)$$

The sum of the equations 55 and 56 allows $\Delta$ to be determined as in equation 58.

$$\Delta = -\frac{A}{2} \cdot \left[\cos\left(\omega_d \frac{\delta t_1^+}{2}\right) + \cos\left(\omega_d \frac{\delta t_1^-}{2}\right)\right] \quad (58)$$

In some examples, the non-monotonic property produced by monotonic motion of the movable element is a non-monotonically, nonlinearly, and spatially varying capacitance. In some examples, the signal is a non-monotonically, nonlinearly, and spatially varying magnetic, optical, or piezoelectric signal. In some examples, a nonlinear signal is applied to structures other than MEMS devices. In some examples, a nonlinear signal is applied to MEMS structures such as rotational or linearly translated MEMS structures.

In some examples, a nonlinear signal is transformed into a time varying nonlinear signal via spatial oscillation of one movable component with respect to another. For example, one movable capacitive plate can oscillate with respect with another fixed capacitive plate. In some examples, the oscillations are due to an input forcing function, such as an electrostatic, magnetic, or physical drive that causes motion of the movable capacitive plate. The movable plate can oscillate a resonant frequency of the structure, or the moveable plate can oscillate at a frequency that is off resonance. In some examples, the movable plate oscillates due to a perturbing force such as an acceleration force. The perturbing force can act orthogonal to a drive velocity, which creates a time-varying periodic signal on an output axis at the same frequency, or harmonics thereof, as the drive velocity signal.

In some examples, an excitation field itself is varied with time. For example one or more of the components is attached to a compliant structure but is not actively driven into oscillation. Instead, the time varying signal is generated by varied by varying, for example, voltage between the components. External perturbations will act on the compliant component, causing modulation of the time-varying nonlinear signal produced by the component.

In some examples, creation of nonlinear periodic signals is performed at the sensor level. In some examples, creation of these nonlinear periodic signals is performed within electronics that interface with this sensor. Nonlinear, time varying, periodic signals can be created with arbitrary phase by varying physical structures of the sensor. For example, the structure on the movable portion can be offset from alignment with structures on the fixed portion by an arbitrary fraction of the pitch.

Nonlinear, non-monotonic, time varying signals can be generated with a fixed set of electrically decoupled structures with which a nonlinear time-varying force of variable phase is generated. The time-varying force may be caused by the application of voltages of equal magnitude and different phase to each of the set of structures. This generates signals at phases determined by the phase difference of the applied voltages.

Sets of nonlinear signals with identical or differing phases can be combined to form mathematical transforms between measured output signals and system variables such as amplitude, offset, temperature, and frequency. Combinations of nonlinear signals with identical or differing phases can be included to minimize or eliminate a time varying force imparted on a physical system that results from measurement of the nonlinear signal. For example, two separate signals can be included within the system at 0° and 180° of phase, such that each signal is the inverse of the other. An example set of signals of this nature are the signals $+A*\sin(\omega t)$ and $-A*\sin(\omega t)$ for phases of 0° and 180° respectively.

Mathematical relationships between the periodic nonlinear signals and external perturbations can be applied to extract inertial information. For example, mathematical relationships can be applied in a continuous fashion based on bandwidth and data rates of the system. In some examples, mathematical relationships can be applied in a periodic sampled fashion. Mathematical relationships can be applied in the time or the frequency domains. Harmonics generated by the sensor can be utilized mathematically to shift frequency content to enable filtering and removal of lower frequency, drift-inducing noise. Harmonics can also be used to render the sensor insensitive or immune to these drift-inducing noise sources by applying one or more mathematical relationships to decouple the inertial signal from other system variables.

Physical structures can result in a nonlinear, non-monotonic, time-varying capacitive signal. For sensing along the x and y axes (in the plane of the wafer), a self-aligned in-plane structure may be used. Teeth of this type of structure can be straight, square, rounded, triangular, sawtooth, or another shape. A shape can be chosen to meet requirements of the application, the associated electronics or a mathematical transform used to analyze the signal, and can be chosen to maximize a capacitance, a change in capacitance, a first derivative of capacitance, a second derivative of capacitance, or other similar quantities. In some of the implementations, parallel, periodic structures are formed in the top surface of one or more plates of a capacitor.

In some implementations, assist structures uniquely identify when external perturbations cause an offset in the physical structure of the device. Offsets can be integral or non-integral multiples of a pitch of tooth spacing. These assist structures are electrically isolated from one another and from the main nonlinear periodic signal.

To sense external perturbations in the z axis, normal to the plane of the wafer, corrugations may be formed on one or more surface of the sensor. In some examples, corrugated comb figures are formed with height differences. In some examples, vertically corrugated teeth are formed in a self-aligned in-plane structure used for x or y axis sensing. In some examples, vertical corrugations are added to one or more plates of a capacitor.

In some examples, materials used to form the device may be varied spatially to result in a time-varying component of capacitance resulting from device motion. For example, oxides, other dielectrics, metals, and other semiconductors can be deposited or patterned with spatial variations. These spatial variations in dielectric constant will result in time variations of capacitance when components of the sensor are moved relative to each other. In some examples, both top and bottom surfaces of silicon used to form a proof mass include vertical corrugations. In some examples, both top and bottom cap wafers surrounding the device layer of silicon include vertical corrugations. In some examples, one or more of spatial variations in material, corrugation of the top of the device layer of silicon, corrugation of the bottom device layer of silicon, corrugation of the top cap wafer, and corrugation of the bottom cap wafer are used to form the sensor. In some examples, a vernier capacitor structure is used to form the sensor.

Signals output by the systems and methods described herein can include acceleration forces, rotational forces, rotational accelerations, changes in pressure, changes in system temperature, and magnetic forces. In some examples, the output signal is a measure of the variation or stability of the amplitude of a periodic signal, such as the oscillator displacement. In some examples, the output signal is a measurement in the variation or stability of the frequency of the periodic signal. In some examples, the output is a measurement of the variation or stability of the phase of the periodic signal. In some examples, the output signal includes a measurement of time derivatives of acceleration, such as jerk, snap, crackle, and pop, which are the first, second, third, and fourth time derivatives of acceleration, respectively.

In some examples, periodicity in physical structures is utilized to detect relative translation of one of the structures by tracking rising and falling edges caused by local extrema of capacitance, these local extrema of capacitance corresponding to translation of multiples of one half-pitch of the structure periodicity. The number of edges counted can be translated into an external acceleration. In some examples, an oscillation is applied to the physical structure, and in other examples, no oscillation force is applied to the physical structure.

A nonlinear least-squares curve fit, such as the Levenburg Marquardt curve fit, can be used to fit the periodic signal to a periodic equation such as equation 59.

$$A \sin(Bt+C)+Dt+E \qquad (59)$$

In equation 59, A represents amplitude, B represents frequency, C represents phase, E represents the offset of an external acceleration force, and D represents the first derivative of the external acceleration force, or the time-varying component of acceleration of the measurement. The measurement period is one-half of the oscillation cycle. Additionally, higher-order polynomial terms can be included for the acceleration as shown in equation 60.

$$A \sin(Bt+C)+Dt^3+Et^2+Ft+G+\ldots \qquad (60)$$

In some examples, the input perturbing acceleration force can be modeled as a cosine function as shown in equation 61, in which D and E represent the amplitude and frequency of the perturbing acceleration force, respectably.

$$A \sin(Bt+C)+D \cos(Et) \qquad (61)$$

If the external perturbing acceleration is small in comparison to the internal acceleration of the oscillator itself, a linear approximation may be used to model the perturbing acceleration. In this case, the offset modulation is taken to be small in comparison to the overall amplitude of the generated periodic signal. By doing so, a measurement of a single time period can be taken to be linearly proportional to the external perturbing force. In some examples, multiple time periods may be linearly converted into acceleration and then averaged together to obtain lower noise floors and higher resolution.

In some examples, analysis in the frequency domain may be performed based on the periodic nature of the nonlinear signals being generated, as well as their respective phases. Frequency domain analysis can be used to reject common-mode noise. Additionally, the non-zero periodic rate of the signal can be used to filter out low frequency noise or to high-pass or band-pass the signal itself to mitigate low-frequency drift.

Some examples of the systems and methods described herein employ real-time estimation of drive velocity to mitigate drift in rotation rate measurements. In some examples, the drive velocity is estimated using nonlinear periodic signals. Physical switching points can be generated during fabrication to impart a periodic nonlinearity to the signals, and can be used to localize the position of the drive at a given time. In some examples, frequency domain information can be used to compute the drive mass velocity. In some examples, independent, spatially-phase shifted periodic nonlinear signals can be used in either the time or frequency domains to estimate the drive velocity. In some examples, the cosine method described herein can be used to estimate drive parameters from the measured times.

In some examples, a linear drive sense capacitor is used to measure physical displacement of the drive mass. For example, the linear drive sense capacitor can output a displacement current or charge that is amplified and compared to a fixed reference. Crossings of this reference can be used to determine specific switching events with associated timing. The amplified signal can be compared to more than one voltage level, and the digital outputs of each comparison can be combined such that the rising and falling edges of each digital signal are preserved in a combined digital signal. In some examples, a differential output is compared to a signal voltage level, generating two distinct time intervals used to estimate drive velocity. In some examples, the output of the drive sense capacitor is rectified and compared to a single voltage level, generating two distinct time intervals used to estimate drive velocity. In some examples, the cosine method described herein can be used to determine drive parameters from time intervals.

In some examples, quadrature can be used as a periodic and nonlinear carrier signal to obtain information about forces acting on the inertial device or to obtain information about the inertial device itself. The Coriolis force can act as a perturbation to the quadrature carrier signal in the form of an amplitude modulation or a phase modulation. In some examples, the acceleration forces can result in an offset modulation of the measured signal.

The Coriolis force can be estimated using a linear sense capacitor to measure quantities indicative of the physical displacement of a drive mass orthogonal to the drive direction. For example, the current or charge generated by the sense capacitor is amplified and compared to a fixed reference voltage to determine times of threshold crossing. In some examples, the amplified signals are compared to the plurality of voltage levels using a comparator and the digital outputs of each comparator are combined such that the rising and falling edges of each digital signal are preserved in the combined digital signal. In some examples, the outputs of the amplified signals are differential, and comparison of the differential signal to a single voltage level generates two distinct time intervals or estimating Coriolis force.

The acceleration normal to the drive mode of a gyroscope can be estimated using periodic nonlinear signals. In some examples, physical switching points generated by a fabrication of the device that can be used to localize the position of the drive at any moment in time. Frequency domain information can be used in some examples to compute the relative velocity of the drive mass. In some examples, independent, spatially phased shifted, periodic nonlinear signals can be used in either the time or frequency domain to estimate the applied acceleration normal to the drive direction. The applied external acceleration can be measured using a linear drive sense capacitor to measure physical displacement of the drive mass. A current or charge generated can be amplified and compared to a fixed reference voltage to determine threshold crossing times. The amplified signal can be compared to more than one voltage level and digital outputs and comparators used for the comparison can be combined such that the rising and falling edges of each digital signal are preserved in the combined signal. In some examples, the amplified signal is a differential signal and is compared to a single voltage level to generate two distinct time intervals used to estimate applied acceleration. In some examples, the output of the amplified signal is rectified and compared to a single voltage level to generate two distinct time intervals used in estimating applied acceleration.

A gyroscope to determine Coriolis force of nonlinear periodic signals can be created by creating nonlinear capacitors for estimating drive velocity and Coriolis force. In some examples, the gyroscope is created to include multiple masses with nonlinear capacitors.

A rotational gyroscope can be created with one or more sense axes and configured to sense rotation rate in one or more orthogonal directions to the drive. Rotation in the one or more directions results in a linear displacement of one or more sense electrodes. In some examples, the rotation rate of the drive is converted to equivalent orthogonal components for the purposes of estimating inertial rotational rates applied to the system. The rotational rate can be converted to equivalent orthogonal components using a nonlinear transducer, a nonlinear capacitor, or other like methods. In the examples using nonlinear capacitors, a plurality of nonlinear capacitors that are spatially phased shifted can be fabricated. A linear capacitor can be used to decompose the rotational rate of the gyro into orthogonal components. In these examples, the current generated by the linear capacitors is a nonlinear periodic signal due to the nonlinear periodic displacement of the drive with time. In some examples, the sense electrodes are linearly displaced for the purposes of eliminating a net differential velocity across the sense electrodes, which would otherwise create centripetal force acting on the sense electrode at twice the drive frequency.

In some examples, a nonlinear current output is used to determine a resonant frequency of this system, which can be used to extract information about the temperature of the system. The resonant frequency can be measured by determining time intervals between successive threshold crossings of the nonlinear signal. The threshold crossings can correspond to a fixed physical displacement that results in a zero current condition. In some examples, the time interval is the average of two or more time intervals, each corresponding to a different physical displacement. The extracted temperature can be a linear scalar of the measured frequency or a polynomial of the measured frequency.

In some examples, the time intervals correspond to intervals between successive threshold crossings of the nonlinear signal with respect to a fixed voltage. The measured time intervals can be the average of two or more intervals, each interval corresponding to a different fixed voltage level. In these examples also, the extracted temperature can be a linear scalar or a polynomial of the measured frequency.

Demodulating the in-phase and quadrature components can be performed by using threshold crossing times. The threshold crossing times, corresponding to either physical or voltage threshold crossings, can be used to determine quadrature. A time of maximum amplitude can be determined by determining a mid-point between threshold crossing times. A time interval between the peak amplitude and a fixed reference can then be determined. The time offset, together with the peak amplitude estimated using the cosine method, can be used to extract quadrature and in-phase components.

In some examples, quadrature can be controlled to optimize a signal-to-noise ratio of a device. In some examples, the quadrature is controlled by injecting a variable amplitude component of the drive signal into the Coriolis signal path. The amplitude can be controlled by first mathematically calculating the quadrature component, and then performing feedback control to regulate the quadrature amplitude. A variable amplitude component of a quadrature can be injected using fabricated capacitive structures to capacitively adjust the quadrature component. The gain can be controlled by first calculating quadrature component, and then using a feedback control loop to regulate the amount of additional quadrature injected.

In some examples, the measured offset time is used to determine phase of the Coriolis and quadrature components. This determined phase can reduce the need for an analog loop closure to control phase.

In some examples, a gyroscope is configured to measure drive velocity and a combined Coriolis and quadrature signal. The gyroscope is configured to decouple the Coriolis and quadrature signals and determine a ratio between the Coriolis signal and measured drive velocity. The gyroscope is configured to determine a rotation rate of the gyroscope from the ratio.

An acceleration-insensitive clock can be configured to determine timing using periodic nonlinear signals. The periodic nonlinear signals can be generated by a periodic capacitive array. The structure can be driven into resonance and threshold crossings can be used to determine periodicity of the signal. The threshold crossings can be referenced to reference voltages or physical positions. In some examples, two oscillating structures are driven into resonance synchronously and with opposite velocities. The difference in measured time intervals for each oscillating mass can be determined and differentiated. In some examples, the relative time differences of two oscillating structures can be measured using differential measurements. The nonlinear periodic signals produced by the combination of a linear capacitor and a nonlinear harmonic oscillator can be compared to one or more reference voltages for the purposes of determining relative time intervals or periodicity of the two oscillators. In some examples, the change in phase due to acceleration between two oscillating structures can be cancelled, resulting in a differential measurement of oscillating frequency.

In some examples, the counter oscillating structures can contain periodic nonlinear capacitive structures generating periodic nonlinear signals. The periodic nonlinear signals can be processed in the time or frequency domain to extract system parameters such as acceleration, frequency, temperature, oscillating structure rotational rate, mechanical quality factor (Q), internal pressure, or differential pressure between the oscillator environment and an external environment.

The nonlinear signal can be produced by a linear capacitor and nonlinear harmonic motion of the oscillator. The nonlinear signal can be compared to one or more voltage levels to determine timing characteristics related to the system properties.

A method of estimating of input acceleration normal to the oscillation direction of a resonator can include using periodic nonlinear signals. Physical switching points generated by device fabrication can be used to localize the position of the resonator as a function of time. Frequency domain information can be used to compute the relative velocity of the resonator. Independent, spatially phase shifted, periodic nonlinear signals can be used in either the time or the frequency domain to estimate acceleration or velocity applied normal to the oscillation direction. System parameters estimated using this method can include oscillator frequency, oscillator amplitude, oscillator velocity, oscillator temperature, applied inertial acceleration, and pressure differentials between the oscillator environment and external environment.

Applied acceleration normal to the direction of oscillation can be estimated using a linear drive sense capacitor. The linear drive sense capacitor can measure physical displacement of the oscillator by generating a current or charge. The generated current or charge can be amplified and compared to a fixed reference voltage to determine threshold crossing times. While the current of the capacitor may be linear with respect to displacement of the oscillator, the motion of the oscillator itself is nonlinear, producing an overall current that is nonlinear. The amplified signal can be compared to more than one voltage level and digital outputs of comparators performing the comparisons can be combined. The combined signal can include the rising and falling edges of each digital signal. In some examples, the output of the amplified signal is differential and is compared to a single voltage level. This generates two distinct time intervals used to estimate applied acceleration. In some examples, the output of the applied signal is rectified and is compared to a single voltage level. This also generates two distinct time intervals used to estimate an applied acceleration.

The zero force of a nonlinear periodic capacitor can be adjusted by the addition of two or more nonlinear capacitors. Parameters of the nonlinear capacitors which can be adjusted to adjust the zero force point include a scaling of the relative peak capacitive amplitudes, the relative nonlinearity, or a fixed offset capacitance.

The zero force point can be used to create a reference timing event for the purposes of estimating frequency, amplitude, applied inertial forces, velocity, and/or temperature of an oscillatory system.

The time-varying output of a gyroscope's sense mode can be compared to one or more fixed reference levels to determine threshold crossing times. Using the determined threshold crossing times, the inertial, Coriolis, and quadrature components can be decoupled. The quadrature signal can be used as a carrier. Demodulation of the signal can include calculation of changes in the carrier signal's amplitude, phase, or frequency.

By actively measuring the peak drive velocity, the measurement of rotation rate can be actively corrected for variations in drive mode velocity. The drive velocity can be implicitly measured by measuring peak amplitude and frequency of the drive mode velocity, because the velocity corresponds to a product of amplitude and frequency. By using the cosine method, the peak amplitude and frequency of the drive mode oscillator can be accurately measured to provide an accurate real time velocity estimate. By estimating the velocity accurately and in real time, the gyroscope's scale factor can be dynamically varied to provide an accurate estimation of rotation rate.

In some examples, automatic gain control (AGC) of a gyroscopic apparatus can be performed by calculating oscillator amplitude and performing feedback control to regulate the oscillator amplitude. The oscillator amplitude can be calculated in a driver or external processor. A control signal for a variable gain stage can be used to regulate the oscillator amplitude.

Oscillator amplitude can be calculated using a periodic nonlinear sense capacitor and one or more fit equations such as the cosine method. The oscillator amplitude can be calculated using a number of zero crossings from a periodic nonlinear capacitor output. A drive sense output can be directly digitized and peak amplitude detection can be performed subsequently. Based on calculation of amplitude, a DC offset level of an amplifier and a feedback loop can be adjusted. Gain of one or more amplifier stages in a feedback loop can be adjusted. These adjustments can regulate oscillator drive amplitude.

A sensor system can convert from time or frequency to inertial domain using a hardware driver, a driver kernel, one or more system processors, a motion processor unit, a sensor fusion processor, a micro-controller, a digital signal processor (DSP) and a remote device such as a cloud device. Conversion of output times, time intervals, or frequency content to the inertial domain can be based on the availability of an encryption key or another security measure that is supplied by the system or applied to the system. In some examples, the encryption key is a GPS encryption key supplied by the system.

High fidelity sensor output such as time, time intervals or frequency signals, can be based on the ability of an encryption key supplied by the system. In some examples, the high fidelity sensor output is available for a finite period of time. In some examples, the high fidelity sensor output is available for a finite period of time after expiration of the last high fidelity sensor output.

In some examples, the high fidelity output signal is restricted when the sensor system measures a persistent large dynamic signal indicative of improper use. The large dynamic signal can be experienced over a predetermined and fixed length of time to trigger restriction of the high fidelity output signal. The large dynamic signal can include a force above a critical threshold. In some examples, the critical force amplitude is fixed at the system level, and in some examples, the critical force amplitude is adjustable. In some examples, the high fidelity output signal is restricted when the critical amplitude is surpassed for a fixed or predetermined period of time. In some examples, the period of time is variable and determined by the system.

In some examples, only low fidelity sensor output is available when the encryption key is not enabled. In some examples, power to the sensor is disconnected when the encryption key is not enabled. In some examples, only low fidelity output is available when the critical input force level is surpassed for a critical interval period. In some examples, power to the sensor is disconnected when the critical input force level is surpassed for a critical interval period. In some examples, power to the sensor is disconnected when a net zero force condition is detected over the length of time that exceeds a critical interval period.

In some examples, conversion from the time or frequency domain to inertial domain is performed at the system level (such as using a driver, system processor, motion processor, or the like). The performance of the system can be based on an algorithm that is upgradeable through a software update or download of a better driver.

In some examples, calculation of oscillator amplitude is performed external to the chip, such as using one or more of a driver, kernel, application layer, processor core, DSP, and the like). The calculated oscillator amplitude is used to control the on-chip programmable gain to form a feedback control loop for regulating oscillator amplitude. An external PID control loop can be used to regulate oscillator amplitude through an on-chip programmable gain stage.

Closed-loop regulation of drive oscillation amplitude can be implemented using analog circuitry or digital processing, or a combination of both. The analog circuitry can be external and discrete or an on-chip application specific integrated circuit (ASIC). The analog circuitry can perform envelope detection of the drive sense signal or a periodic nonlinear pickoff signal. The analog circuitry can perform PID control to provide a correction signal to a programmable gain stage. This forms a closed feedback loop to maintain overall oscillator amplitude at the desired level.

A digital processor can determine amplitude information using time data from a TDC. A digital regulator such as a discrete time PID controller implemented in either hardware or software and employ the amplitude data to provide discrete updates to a programmable gain stage. This forms a closed feedback loop to maintain overall oscillator amplitude at the desired level.

The calculated oscillator amplitude or velocity can be used to regulate the gyroscope drive of a Coriolis gyroscope system. The calculation of amplitude or velocity can be performed off-chip by a system resource, such as a processor, DSP, microcontroller, fusion processor, or by a cloud computing resource.

A Coriolis gyroscope system can determine quadrature and regulate and maintain the quadrature within a predetermined range. The quadrature can be controlled by summing the output sense signal (which includes both Coriolis and quadrature components) with a predetermined scaled version of the drive signal. The amplitude of the scaled version of the drive signal is based on the estimated quadrature signal.

In some examples, the quadrature can be controlled by applying an appropriate electrostatic force to a capacitive control electrode. The electrostatic force is in phase with the drive signal and has an amplitude based on an estimation of the quadrature signal.

In some examples, one or more of the quadrature and rotation rate can be determined off-chip by a system resource such as a processor, DSP, microcontroller, fusion processor, and a cloud computing resource. In some examples, curve fit or analysis is performed external to the chip. This analysis can be performed using a driver, kernel, and/or an application running externally to the chip. The driver, kernel, or algorithm can be selectively changed or replaced such that the performance of the device changes.

It will be apparent that aspects of the systems and methods described herein may be implemented in many different forms of software, firmware, and hardware in the implementations illustrated in the drawings. The actual software code or hardware configurations used to implement aspects consistent with the principles of the systems and method described herein is not limiting. Thus, the operation and behavior of the aspects of the systems and methods were described without reference to the specific software or hardware configurations—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A gyroscope for determining a rotation rate, the gyroscope comprising:
    a drive frame springedly coupled to a base of the gyroscope, wherein:
        the drive frame comprises a first plurality of equally spaced teeth, and
        the base comprises a second plurality of equally spaced teeth;
    a drive structure configured for causing the drive frame to oscillate with respect to a first axis;
    a sense mass springedly coupled to the drive frame;
    a sense mass sense structure configured for measuring a displacement of the sense mass along a second axis orthogonal to the first axis; and
    measurement circuitry configured for:
        measuring an analog signal corresponding to a displacement of the drive frame, wherein monotonic motion of the first plurality of equally spaced teeth relative to the second plurality of equally spaced teeth causes a non-monotonic change in the analog signal,
        converting the analog signal to a voltage,
        determining time intervals between times at which the voltage crosses a threshold, wherein:
            the times are associated with specific physical locations of the drive frame, and
            the time intervals are based on motion of the first plurality of equally spaced teeth past an aligned position with the second plurality of equally spaced teeth, determining, based on the time intervals, a drive velocity of the drive frame, extracting a Coriolis component from the measured displacement, and
        determining, based on the determined drive velocity and the extracted Coriolis component, the rotation rate.

2. The gyroscope of claim 1, wherein the drive frame oscillates along the first axis.

3. The gyroscope of claim 1, wherein the drive frame oscillates rotationally about the first axis.

4. The gyroscope of claim 1, wherein the sense mass is springedly coupled to the base.

5. The gyroscope of claim 1, wherein the measurement circuitry is further configured for extracting a quadrature component from the measured displacement.

6. The gyroscope of claim 5, wherein the measurement circuitry is configured for extracting the Coriolis component based on the extracted quadrature component.

7. The gyroscope of claim 6, wherein the measurement circuitry is further configured for extracting the Coriolis component based on a phase of the measured displacement with respect to the velocity of the drive frame.

8. The gyroscope of claim 5, wherein the measurement circuitry is further configured for adjusting the measuring a displacement based on the extracted quadrature component.

9. The gyroscope of claim 8, wherein the measurement circuitry is further configured for adjusting the measuring a displacement by:
    measuring an analog signal corresponding to the displacement of the sense mass;
    determining an additional quadrature component based on the extracted quadrature component; and
    combining the analog signal with the additional quadrature component to generate the measured displacement.

10. The gyroscope of claim 8, wherein the measurement circuitry is further configured for adjusting the measuring a displacement by adjusting, based on the extracted quadrature component, a bias voltage of a capacitor coupled to the sense mass.

11. The gyroscope of claim 1, wherein the measurement circuitry is further configured for measuring the displacement by:
   receiving a signal from the sense mass;
   converting the received signal to a voltage;
   comparing the voltage to a threshold;
   determining time intervals between times at which the voltage crosses the threshold; and
   determining, based on the time intervals, an amplitude and a frequency of oscillation of the sense mass.

12. The gyroscope of claim 11, wherein the measurement circuitry is further configured for extracting the Coriolis component by:
   determining, based on the amplitude and the frequency, a quadrature component; and
   determining, based on the frequency and the quadrature component, the Coriolis component.

13. The gyroscope of claim 12, wherein the measurement circuitry is further configured for extracting the Coriolis component by:
   determining a phase of the measured displacement with respect to the velocity of the drive frame; and
   determining, based on the frequency, the quadrature component, and the phase, the Coriolis component.

14. The gyroscope of claim 11, wherein the received signal is a capacitive signal.

15. The gyroscope of claim 1, wherein the measurement circuitry is further configured for determining, based on the times, the velocity by:
   determining, based on the time intervals, an amplitude and a frequency of the drive frame; and
   determining, based on the amplitude and the frequency, the velocity.

16. A method for determining a rotation rate of an inertial sensor, the method comprising:
   causing a drive frame to oscillate with respect to a first axis, wherein:
      the drive frame is springedly coupled to a base of the gyroscope,
      the drive frame comprises a first plurality of equally spaced teeth, and
      the base comprises a second plurality of equally spaced teeth;
   measuring an analog signal corresponding to a displacement of the drive frame, wherein monotonic motion of the first plurality of equally spaced teeth relative to the second plurality of equally spaced teeth causes a non-monotonic change in the analog signal;
   converting the analog signal to a voltage;
   determining time intervals between times at which the voltage crosses a threshold, wherein:
      the times are associated with specific physical locations of the drive frame, and
      the time intervals are based on motion of the first plurality of equally spaced teeth past an aligned position with the second plurality of equally spaced teeth;
   determining, based on the time intervals, a drive velocity of the drive frame;
   measuring a displacement of a sense mass springedly coupled to the drive frame, the displacement being along a second axis orthogonal to the first axis;
   extracting a Coriolis component from the measured displacement; and
   determining, based on the determined drive velocity and the extracted Coriolis component, the rotation rate of the inertial sensor.

17. The method of claim 16, wherein the drive frame oscillates along the first axis.

18. The method of claim 16, wherein the drive frame oscillates rotationally about the first axis.

19. The method of claim 16, wherein the sense mass is coupled to a base of the inertial sensor.

20. The method of claim 16, further comprising extracting a quadrature component from the measured displacement.

21. The method of claim 20, wherein the extracting the Coriolis component comprises extracting the Coriolis component based on the extracted quadrature component.

22. The method of claim 21, wherein the extracting the Coriolis component further comprises extracting the Coriolis component based on a phase of the measured displacement with respect to the velocity of the drive frame.

23. The method of claim 20, further comprising adjusting the measuring a displacement based on the extracted quadrature component.

24. The method of claim 23, wherein the adjusting the measuring a displacement comprises:
   measuring an analog signal corresponding to the displacement of the sense mass;
   determining an additional quadrature component based on the extracted quadrature component; and
   combining the analog signal with the additional quadrature component to generate the measured displacement.

25. The method of claim 16, wherein the measuring a displacement comprises:
   receiving a signal from the sense mass;
   converting the received signal to a voltage;
   comparing the voltage to a threshold;
   determining time intervals between times at which the voltage crosses the threshold; and
   determining, based on the time intervals, an amplitude and a frequency of oscillation of the sense mass.

26. The method of claim 25, wherein the extracting the Coriolis component comprises:
   determining, based on the amplitude and the frequency, a quadrature component; and
   determining, based on the frequency and the quadrature component, the Coriolis component.

27. The method of claim 26, wherein the extracting the Coriolis component further comprises:
   determining a phase of the measured displacement with respect to the velocity of the drive frame; and
   determining, based on the frequency, the quadrature component, and the phase, the Coriolis component.

28. The method of claim 16, wherein the determining, based on the time intervals, the velocity comprises:
   determining, based on the time intervals, an amplitude and a frequency of the drive frame; and
   determining, based on the amplitude and the frequency, the velocity.

* * * * *